United States Patent [19]
Henderson

[11] Patent Number: 5,712,990
[45] Date of Patent: Jan. 27, 1998

[54] ECONOMICAL AUTOMATED PROCESS FOR AVERTING PHYSICAL DANGERS TO PEOPLE, WILDLIFE OR ENVIRONMENT DUE TO HAZARDOUS WASTE

[75] Inventor: Don J. Henderson, Danville, Calif.

[73] Assignee: International Technology Corporation of California, Torrance, Calif.

[21] Appl. No.: 771,395

[22] Filed: Oct. 3, 1991

[51] Int. Cl.[6] .................. G06F 15/00; G06F 19/00; G06G 7/66; G06G 7/64

[52] U.S. Cl. .................. 395/228; 364/468; 395/229

[58] Field of Search .................. 364/401, 403, 364/468; 395/201, 228, 229

[56] References Cited

U.S. PATENT DOCUMENTS

| | | | |
|---|---|---|---|
| 3,688,087 | 8/1972 | Howard et al. | 235/383 |
| 4,336,589 | 6/1982 | Danevicz et al. | 364/403 |
| 4,419,734 | 12/1983 | Wolfson et al. | 364/567 |
| 4,509,123 | 4/1985 | Vereen | 364/403 |
| 4,563,739 | 1/1986 | Gerpheide et al. | 364/403 |
| 4,646,238 | 2/1987 | Carlson, Jr. et al. | 364/403 |
| 4,656,591 | 4/1987 | Goldberg | 364/478 |
| 4,737,910 | 4/1988 | Kimbrow | 364/403 |
| 4,766,542 | 8/1988 | Pilarczyk | 364/413.01 |
| 4,783,740 | 11/1988 | Ishizawa et al. | 364/403 |
| 4,807,177 | 2/1989 | Ward | 395/117 |
| 4,812,985 | 3/1989 | Hambrick et al. | 364/478 |
| 4,843,546 | 6/1989 | Yoshida et al. | 364/403 |
| 4,866,255 | 9/1989 | Sing | 235/385 |
| 4,878,771 | 11/1989 | Nishida | 400/70 |
| 4,958,280 | 9/1990 | Pauly et al. | 364/403 |
| 4,961,533 | 10/1990 | Teller et al. | 177/25.19 |
| 4,972,318 | 11/1990 | Brown et al. | 364/403 |
| 5,005,125 | 4/1991 | Farrar et al. | 364/403 |
| 5,025,140 | 6/1991 | Varley | 235/385 |
| 5,117,354 | 5/1992 | Long et al. | 364/401 |

OTHER PUBLICATIONS

Dialog Accession No. 01332691, Software description: "Hazwaste 2.0", Creative Management Systems Release Date Oct. 1991.

Datapro Directory of Software, Copyright 1991, McGraw-Hill, Inc., pp. D95-200-010, D60-950-001 to D60-950-005, D70-950-001 to D70-950-005.

Data Sources, Computer Associates International, Inc., Copyright 1989, 1990 Edition, vol. 2, pp. J-312 to J-313.

*Primary Examiner*—Gail O. Hayes
*Assistant Examiner*—Stephen R. Tkacs
*Attorney, Agent, or Firm*—Ashen & Lippman

[57] ABSTRACT

Very costly professional-level judgments needed to comply with scientific and statutory restrictions on hazardous-waste segregation, shipment and disposal are collected cumulatively in a database for a very large number of hazardous waste materials. Many of these materials are statutorily designated or scientifically recognized, or both, as posing a significant physical danger to humans, other organisms, or the ecosphere generally. Later many consignments of particular materials are received (or identified before receipt, in a batch mode of operation) and classified very inexpensively—using nonprofessional-level personnel—by reference to the computerized database. Reversion to professional-level judgments occurs only if a material not previously encountered is received. Each consignment of each material is classified and handled consistently with all other consignments of like material, and in accordance with the professional-level judgments embodied in the database. The system automatically establishes subsequent routing and handling, and generates all labels, regulatory reports and inventories; and also makes possible detailed tracing, tabulation of hazard characteristics by specific areas within storage facilities, and even retrieval if desired for recycling or reconfiguration.

37 Claims, 24 Drawing Sheets

International
Technology
Corporation

Pack[IT]™ CONTAINER INVENTORY

8/16/91

| | | |
|---|---|---|
| PSN: Waste Alkaline liquid, n.o.s. | Pack Type: Lab Pack | Generator: United States Geological Survey |
| Tech Name: AERO FROTH [FATTY ORGANIC NITROGEN MATERIAL] | Drum Size (gal): 30 | Address: 345 Middlefield Road |
| Description: Corrosive Liquid Base | Drum Type: Poly | Job Number: 142817 |
| Hazard Class: Corrosive | Manifest No.: | EPA ID No.: CA2700090364 |
| UN/NA No.: NA 1719 | Profile No.: | Date Opened: 8/13/91 |
| EPA Codes: D002 | Cal. Waste Code: 561 | Date Closed: 8/13/91 |
| TSD Facility: ENSCO | Drum No. MP 2 | TSDF Approved |

CORROSIVE

Physical State: Liquid    Organic/Inorg: Organic

| Line Item | IT No. | Chemical/Material Description | Div. | Item Qant. (ml) | No. of Items | Waste Codes | IH | Cal EH | RQ (lb) | Total Weight (lb) |
|---|---|---|---|---|---|---|---|---|---|---|
| 76 | 163 | AERO FROTH [FATTY ORGANIC NITROGEN MATERIAL] | | 200 | 1 | D002 | | | | 0.44 |
| 77 | 163 | AERO PROMOTERS [FATTY ORGANIC NITROGEN MATERIAL] | | 200 | 1 | D002 | | | | 0.44 |
| 78 | 1708 | AGFA RAPID DEVELOPER [CONTAINS POTASSIUM HYDROXIDE] | | ? | 1 | D002 | | | | 44.05 |
| 79 | 4590 | BLEACH (> 7% SODIUM HYPOCHLORITE) | | 1500 | 1 | D002 | | EH | 100 | 3.30 |
| 80 | 1734 | EPOXY HARDENER, PART B [MIXES AMINES] | | 150 | 1 | D002 | | | | 0.33 |
| 81 | 1734 | EPOXY HARDENER d AMINES | | 200 | 1 | D002 | | | | 0.44 |
| 82 | 1752 | ETHANOLAMINE [2-AMINOETHANOL] | W-O | 200 | 1 | D002 | | | | 0.44 |
| 83 | 321 | HYSOL CASTING COMPOUND, PART A | | 600 | 1 | D002 | | | | 1.32 |
| 84 | 321 | HYSOL CASTING COMPOUND, PART B | | 600 | 1 | D002 | | | | 1.32 |
| 85 | 219 | LEROY CLEANING SOLUTION (CONTAINS SODIUM HYDROXIDE) | | 1000 | 1 | D002 | | EH | 100 | 2.20 |
| 86 | 219 | SODIUM POTASSIUM TARTRATE IN SODIUM HYDROXIDE SOLUTION | | 2000 | 1 | D002 | | EH | 100 | 4.41 |
| 87 | 1734 | TEFLON BONDING KIT [MIXES AMINES] | | 150 | 1 | D002 | | | | 0.33 |

Total Number of Items 12

Total Chemical Weight (lbs)
Total Drum Wt. (lbs)

Container closed by (signature) _____

*FIG. 7a*

```
Drum No. 1381
```

HAZARDOUS WASTE

STATE AND FEDERAL LAW PROHIBITS IMPROPER DISPOSAL
IF FOUND, CONTACT THE NEAREST POLICE, OR PUBLIC SAFETY
AUTHORITY, OR THE U.S. ENVIRONMENTAL PROTECTION AGENCY
OR THE CALIFORNIA DEPARTMENT OF HEALTH SERVICES

GENERATOR INFORMATION:
NAME University of California at Berkeley
ADDRESS 2223 Fulton Street 4th Floor
CITY Berkeley     STATE California  ZIP 94720     PHONE (415) 642-3073

EPA / MANIFEST
ID NO. / DOCUMENT NO.

EPA WAST NO. [D002 D001]   CA WAST NO. [551]   ACCUMULATION START DATE [9/4/90]

| CONTENTS/COMPOSITON | Lab Pack | Waste flammable liquid, corrosive, n.o.s. |

PHYSICAL STATE: Liquid
HAZARDOUS PROPERTIES: [Yes] FLAMMABLE  [Yes] CORROSIVE  [No] REACTIVE  [No] TOXIC
[ ] OTHER Acid        Flammable Liquid
Corrosive
SEBACOYL CHLORIDE TETRACHLORETHYLENE

D.O.T. PROPER SHIPPING NAME AND UN OR NA NO. WITH PREFIX

HANDLE WITH CARE!

FIG 7b

```
1484..............18890.........  ..........
    Organic ORM-E Solid         HM
            LEAD ACETATE
    D008      U144 HM 5000 EH 1369..............18890...............C4
    Organic Poison B Liquid
    CIBACHROME BLEACH (2-ETHOXYETHANOL)
                F005
```

FIG. 7c

Date printed: September 25, 1990    OPEN DRUM LIST    Total 65 Page:1

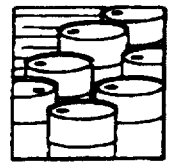

| Status | Drum No. | | Age (Days) | Loc. | Size | HAZARD PROFILE |
|---|---|---|---|---|---|---|
| Open | 1404 | | 20 | F10 | 5 | Flammable Gas Halogenated |
| Open | 1472 | | 6 | | 5 | Inorganic Corrosive Gas |
| Open | 1447 | | 13 | A1 | 30 | Inorganic Corrosive Liquid Acid |
| Open | 1389 | | 25 | J8 | 5 | Inorganic Corrosive Liquid Acid HM |
| Open | 1370 | | 33 | B4 | 30 | Inorganic Corrosive Liquid Acid BDT |
| Open | 1413 | | 13 | A3 | 30 | Inorganic Corrosive Liquid Acid SSI |
| Open | 1410 | | 20 | J9 | 5 | Inorganic Corrosive Liquid Acid Poison B HM |
| Open | 1426 | | 14 | K2 | 5 | Inorganic Corrosive Liquid Base |
| Open | 1463 | | 7 | A2 | 30 | Inorganic Corrosive Liquid Base SSI |
| Open | 1388 | | 20 | C1 | 30 | Inorganic Corrosive Liquid Base Poison B Cyanide |
| Open | 1401 | | 21 | J10 | 5 | Inorganic Corrosive Solid Acid |
| Open | 1452 | | 12 | J1 | 5 | Inorganic Corrosive Solid Acid Water react |
| Open | 1448 | | 12 | J2 | 5 | Inorganic Corrosive Solid Acid Water react Forms Toxic |
| Open | 1405 | | 20 | K3 | 5 | Inorganic Corrosive Solid Base |
| Open | 1406 | | 19 | F9 | 5 | Inorganic Flammable Solid Water react Fire Risk |
| Open | 1458 | | 8 | D1 | 30 | Inorganic Non-RCRA Solid |
| Open | 1374 | | 32 | F2 | 5 | Inorganic ORM-A Liquid HM |
| Open | 675 | | 39 | F5 | 5 | Inorganic ORM-A Solid |
| Open | 1418 | | 18 | F3 | 5 | Inorganic ORM-A Solid HM |
| Open | 1387 | | 25 | 81 | 55 | Inorganic ORM-B Liquid Mercury HM |
| Open | 1451 | | 12 | G4 | 5 | Inorganic ORM-B Solid |
| Open | 1422 | | 15 | B3 | 30 | Inorganic ORM-E Liquid |
| Open | 1278 | ⇨ | 48 | G1 | 5 | Inorganic ORM-E Liquid HM |
| Open | 1390 | | 25 | B2 | 30 | Inorganic ORM-E Solid |
| Open | 1279 | ⇨ | 48 | H1 | | Inorganic Oxidizer Liquid Acid Corrosive Nitric Acid |
| Open | 1385 | | 25 | H6 | 30 | Inorganic Oxidizer Solid |
| Open | 1382 | | 26 | H3 | 5 | Inorganic Oxidizer Solid HM |
| Open | 1465 | | 7 | H4 | 5 | Inorganic Oxidizer Solid Water react Fire Risk |
| Open | 1462 | | 7 | I5 | 5 | Inorganic Poison B Liquid |
| Open | 1464 | | 7 | I7 | 5 | Inorganic Poison B Liquid Cyanide |
| Open | 1461 | | 8 | I4 | 5 | Inorganic Poison B Solid Cyanide |
| Open | 615 | | 27 | I3 | 5 | Inorganic Poison B Solid Sodium Azide |
| Open | 1395 | | 21 | G7 | 5 | Nonflamm Gas |
| Open | 1466 | | 7 | H | 20 | Organic Bulk Flamm Liquid Halogenated |
| Open | 1471 | | 6 | n | 20 | Organic Bulk Flamm Liquid Non-Halogenated |
| Open | 1470 | | 7 | d | 55 | Organic Bulk ORM-E Solid |
| Open | 1218 | | 6 | J7 | 5 | Organic Corrosive Liquid Acid Poison B |

*FIG. 7d*

OPEN DRUMS OVER 45 DAYS OLD

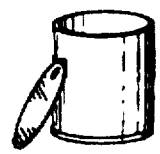

DATE May 23, 1991

| Status | Current Age (Days) | Drum No. | Drum Size (gal) | TSD | Drum Location |
|---|---|---|---|---|---|
| Open | 148 | 83 | 5 | ENSCO | Acid House |
| Open | 148 | 86 | 5 | ENSCO | Acid House |
| Open | 148 | 87 | 5 | ENSCO | Acid House |
| Open | 147 | 97 | 5 | ENSCO | Acid House |
| Open | 109 | 99 | 5 | USPCI | Acid House |
| Open | 147 | 101 | 5 | ENSCO | Acid House |
| Open | 147 | 104 | 5 | ENSCO | Acid House |
| Open | 147 | 106 | 5 | ENSCO | Acid House |
| Open | 147 | 110 | 5 | ENSCO | Acid House |
| Open | 146 | 114 | 55 | ENSCO | Acid House |
| Open | 146 | 115 | 5 | ENSCO | Acid House |
| Open | 145 | 118 | 5 | ENSCO | Acid House |
| Open | 145 | 119 | 5 | ENSCO | Acid House |
| Open | 145 | 120 | 5 | ENSCO | Acid House |
| Open | 145 | 121 | 5 | ENSCO | Acid House |
| Open | 145 | 126 | 5 | SSI | Acid House |
| Open | 144 | 135 | 30 | ENSCO | Acid House |
| Open | 144 | 138 | 5 | ENSCO | Acid House |
| Open | 144 | 139 | 5 | ENSCO | Acid House |
| Open | 144 | 146 | 5 | ENSCO | Acid House |
| Open | 144 | 149 | 5 | ENSCO | Acid House |
| Open | 144 | 150 | 5 | ENSCO | Acid House |
| Open | 143 | 154 | 30 | ENSCO | Acid House |
| Open | 143 | 161 | 5 | USPCI | Acid House |
| Open | 143 | 166 | 5 | ENSCO | Acid House |
| Open | 139 | 169 | 5 | ENSCO | Acid House |
| Open | 141 | 171 | 5 | ENSCO | Acid House |

CLOSED DRUMS

Date Printed: May 23, 1991                                   Total Drums 240

| Drum No. | Drum Profile/Description | Drum Size | Drum Type | Drum Locatn | Date Opened | Date Closed | Age Days | TSDF | Ship Appv | Date Ship | WMOS Profile No. | Manifest Number | Comments |
|---|---|---|---|---|---|---|---|---|---|---|---|---|---|
| CHM 1 | Inorganic Poison B Solid | 30 | 37A | Acid House | 12/13/90 | 12/28/90 | 161 | Ensco | ✓ | | 127328 | AR453203 | Ship Appv column |
| CHM 2 | Organic Poison B Liquid | 30 | 17H | Acid House | 12/8/90 | 12/21/90 | 166 | Ensco | ✓ | | 127328 | AR453203 | |
| CHM 3 | Organic ORM A Liquid | 5 | 37A | shipped | 12/8/90 | 12/28/90 | 0 | Ensco | ⇑ | 12/31/90 | 124802 | AR453198 | |
| CHM 4 | Organic Poison B Solid | 30 | 17H | shipped | 12/8/90 | 12/14/90 | 0 | Ensco | ⇑ | 1/22/91 | 124802 | AR482720 | |
| CHM 5 | Organic Flammable Liquid | 30 | 17H | shipped | 12/8/90 | 12/12/90 | 0 | Ensco | ⇑ | 1/22/91 | 124802 | AR482720 | |
| CHM 6 | Organic Flammable Liquid Poison B Cyanide | 5 | 37A | shipped | 12/8/90 | 12/27/90 | 0 | Ensco | ✓ | 12/31/90 | 124802 | AR453198 | |
| CHM 7 | Organic Poison B Liquid Cyanide | 5 | 37A | Acid House | 12/5/90 | 1/30/91 | 148 | ENSCO | ✓ | | 127330 | AR453203 | |
| CHM 8 | Inorganic Flammable Solid Water react Fire | 5 | 37A | Acid House | 12/7/90 | 1/28/91 | 167 | Ensco | ✓ | | 127327 | AR453203 | |
| CHM 9 | Inorganic Oxidizer Solid Water react | 5 | 37A | Acid House | 12/10/90 | 1/30/91 | 164 | Ensco | ✓ | | 127330 | AR453203 | |
| CHM 10 | Organic ORM-E Solid | 30 | 17H | Acid House | 1/28/91 | 2/8/91 | 115 | ENSCO | | | | | |
| CHM 11 | Inorganic Corrosive Liquid Acid Bromine | 5 | 37A | Acid House | 12/7/90 | 1/30/91 | 167 | Ensco | ✓ | | 127330 | AR453203 | |
| CHM 12 | Organic Flammable Liquid Fire Risk | 5 | 37A | shipped | 12/10/90 | 12/12/90 | 0 | Ensco | ⇑ | 12/31/90 | 124802 | AR453198 | |
| CHM 13 | Inorganic Flammable Liquid Sulfide | 5 | 37A | Acid House | 12/10/90 | 1/30/91 | 164 | Ensco | | | 127327 | AR453203 | |
| CHM 14 | Organic Poison B Solid Sulfide | 5 | 37A | Acid House | 12/10/90 | 1/30/91 | 164 | ENSCO | | | 127330 | AR453203 | |
| CHM 15 | Inorganic Flammable Solid Water | 5 | 37A | shipped | 12/10/90 | 12/17/90 | 0 | Ensco | ✓ | 12/31/90 | 124802 | AR453198 | |
| CHM 16 | Organic Corrosive Liquid Acid Water react | 5 | 37A | Acid House | 12/10/90 | 1/30/91 | 164 | ENSCO | ⇑ | | 127330 | AR453203 | |
| CHM 17 | Organic Peroxide Liquid Organic peroxide | 5 | 37A | Acid House | 12/10/90 | 1/30/91 | 164 | ENSCO | ✓ | | 127330 | AR453203 | |
| CHM 18 | Organic Bulk ORM-E Solid | 55 | 17H | Acid House | 12/11/90 | 1/30/91 | 163 | ESI | ✓ | | 839-E | | |
| CHM 19 | Inorganic Oxidizer Solid | 5 | 37A | shipped | 12/11/90 | 12/17/90 | 0 | Ensco | ⇑ | 1/22/91 | 124802 | AR482720 | |
| CHM 20 | Inorganic Non-RCRA Solid | 30 | 17H | shipped | 12/11/90 | 12/11/90 | 0 | Ensco | ⇑ | 12/31/90 | 124802 | AR453198 | |
| CHM 21 | Inorganic Corrosive Liquid Acid Poison B High | 5 | 37A | shipped | 12/11/90 | 12/11/90 | 0 | Ensco | ⇑ | 1/22/91 | 124802 | AR482720 | |
| CHM 22 | Organic Corrosive Liquid Acid | 5 | 37A | shipped | 12/12/90 | 12/29/90 | 0 | Ensco | ⇑ | 1/22/91 | 124802 | AR453198 | |
| CHM 23 | Inorganic ORM E Solid | 5 | 17A | shipped | 12/11/90 | 12/18/90 | 0 | Ensco | ⇑ | 1/22/91 | 124802 | AR453198 | |
| CHM 24 | Inorganic Corrosive Solid Base | 5 | 37A | shipped | 12/11/90 | 12/12/90 | 0 | Ensco | ⇑ | 12/31/90 | 124802 | AR453198 | |
| CHM 25 | Organic Poison B Solid Cyanide | 30 | 37A | Acid House | 12/11/90 | 1/30/91 | 163 | ENSCO | ✓ | 12/31/90 | 124802 | AR453203 | |
| CHM 26 | Organic Non-RCRA Solid | 5 | 37A | shipped | 12/11/90 | 12/17/90 | 0 | Ensco | ⇑ | | 127330 | AR453198 | |
| CHM 27 | Organic Flammable Liquid Peroxidisable ether | 5 | 37A | shipped | 12/11/90 | 12/28/90 | 0 | Ensco | ⇑ | 12/31/90 | 124802 | AR453198 | |
| CHM 28 | Organic Poison B Liquid | 30 | 17H | shipped | 12/11/90 | 12/31/90 | 0 | Ensco | ⇑ | 12/31/90 | 124802 | AR453198 | |
| CHM 29 | Organic ORM A Solid | 5 | 37A | shipped | 12/11/90 | 12/28/90 | 0 | Ensco | ✓ | 1/22/91 | 124802 | AR482720 | |
| CHM 30 | Inorganic Corrosive Liquid Acid SS | 5 | 37A | shipped | 12/11/90 | 12/29/90 | 0 | Ensco | ✓ | 1/22/91 | 124802 | AR482720 | |
| CHM 31 | Inorganic Non-RCRA Liquid | 30 | 17H | Acid House | 12/11/90 | 2/8/91 | 163 | ENSCO | | 12/31/90 | 127328 | AR453203 | Man not on drum |
| CHM 32 | Inorganic Poison B Solid Cyanide | 5 | 37A | Acid House | 12/11/90 | 12/17/90 | 163 | Ensco | | | 127327 | AR453203 | |
| CHM 33 | | 5 | 37A | shipped | 12/11/90 | 12/31/90 | 0 | Ensco | ⇑ | 1/22/91 | 124802 | AR482770 | |

MATERIALS PACKING LIST

Name R. Steiner   Dept Chemistry   Packing List No. 1   Date ___
Material Location B8, Latimer   Notes ___   Phone 2-6599

| Drum No. | Chemical/Material | Disposal | No. of Pkgs | Physical State | Total Chem Wt. (lb) | Allocated Cost |
|---|---|---|---|---|---|---|
| 834 | COMPRESSED GAS, N.O.S | Ensco | 1 | Gas | 0.00 | $0.00 |
| 1079 | SODIUM CYANIDE | Ensco | 1 | Solid | 0.00 | $0.00 |
| 1166 | ACETIC ANHYDRIDE | Ensco | 1 | Liquid | 0.00 | $0.00 |
| 1225 | ETHIDIUM BROMIDE | Ensco | 16 | Liquid | 82.90 | $264.53 |
| 1035 | BATTERY, LITHIUM 6 VOLT, G E | EnvPac | 1 | Solid | 0.00 | $0.00 |
| 1338 | CORROSIVE LIQUID, N.O.S. | Ensco | 1 | Liquid | 0.00 | $0.00 |
| 1338 | CORROSIVE LIQUID, N.O.S | Ensco | 1 | Liquid | 0.10 | $0.32 |
| 1338 | CORROSIVE LIQUID, N.O.S | Ensco | 1 | Liquid | 0.00 | $0.00 |
| 1035 | BATTERY, LITHIUM 6 VOLT, G E | EnvPac | 1 | Solid | 0.00 | $0.00 |
| 1336 | CORROSIVE LIQUID, N.O.S | Ensco | 11 | Liquid | 120.10 | $383.23 |
| 1041 | BATTERIES, LEAD - ACID, WET | EnvPac | 1 | Liquid | 0.00 | $0.00 |
| 1039 | BATTERIES, WET ALKALI | EnvPac | 1 | Liquid | 50.00 | $159.55 |
| 1036 | BATTERIES, MERCURY | EnvPac | 1 | Liquid | 0.00 | $0.00 |
| 1192 | GRAPHITE | Ensco | 12 | Solid | 9.30 | $29.68 |
| 1021 | ALUMINUM METALLIC, POWDER | Ensco | 5 | Solid | 2.30 | $7.34 |
| 974 | CADMIUM POWDER | Ensco | 1 | Solid | 1.10 | $3.51 |
| 1003 | ACETYL CHLORIDE | Ensco | 3 | Liquid | 0.00 | $0.00 |
| 1017 | BARIUM | Ensco | 7 | Solid | 0.60 | $1.91 |
| 1025 | BATTERIES, DRY CELL | EnvPac | 1 | Solid | 47.60 | $151.89 |
| 1257 | OXIDIZER, CORROSIVE, LIQUID, N.O.S. | Ensco | 1 | Liquid | 0.00 | $0.00 |
| 1086 | N,N,N',N'-TETRAMETHYLETHYLENEDIAMINE | Ensco | 17 | Liquid | 20.40 | $65.09 |
| 969 | MERCURY | QS | 50 | Liquid | 0.00 | $0.00 |
| 1018 | QUINOLINE | Ensco | 1 | Liquid | 0.00 | $0.00 |
| 1011 | BARIUM OXIDE | Ensco | 1 | Solid | 0.00 | $0.00 |
| 1027 | BENZOYL CHLORIDE | Ensco | 1 | Liquid | 0.00 | $0.00 |
| 1009 | HYDRIODIC ACID | SSI | 1 | Liquid | 0.00 | $0.00 |
| 1029 | SODIUM SULFIDE, HYDRATED (>30% WATER) | | 1 | Liquid | 0.00 | $0.00 |
| 1012 | WAST CYANOGEN BROMIDE PLUS SODIUM | Ensco | 1 | Liquid | 1.50 | $4.79 |
| 1010 | BASIC FUSCHIN | Ensco | 1 | Solid | 0.00 | $0.00 |
| 1059 | BORIC ACID | Ensco | 1 | Solid | 7.50 | $23.93 |
| 599 | CALCIUM HYDROXIDE | Ensco | 1 | Solid | 0.00 | $0.00 |
| 1008 | FLUOBORIC ACID | SSI | 1 | Liquid | 0.00 | $0.00 |

FIG. 7g

CONTAINER SHIPPING SUMMARY

FIG. 7h

| SUMMARY CONTAINER COUNT | | |
|---|---|---|
| 55 gal: 0 | 5 gal: 28 | Total Ctn Count |
| 30 gal: 8 | Wood Box: 0 | 38 |
| 20 gal: 0 | Other: 2 | |

Manifest No.: AR21534
TSD Facility: Ensco
Gross Shipment Weight (lbs): 1,506
Date Printed: September 25, 1990

| TSDF | Ship Appr | Manifest Line No. | Ctn. No. | Proper Shipping Name | Ctn. Size (gal) | Ctn Type | Ctn Mat. | Profile | Cal Waste Code | RCRA Codes | Accumln Date | Age (days) | Gross Ctn Wt (lbs) |
|---|---|---|---|---|---|---|---|---|---|---|---|---|---|
| Ensco | ✓ | | UCB 1018 | Hazardous waste, liquid, n.o.s. | 5 | 37A | Metal | | 551 | | 6/10/90 | 107 | 20.0 |
| | | | | | | | | | | | Total Weight: | | 20 |
| Ensco | ✓ | | UCB 1093 | Hazardous waste, solid, n.o.s. | 5 | 37A | Metal | | 551 | D005 | 7/9/90 | 78 | 10.0 |
| Ensco | ✓ | | UCB 1266 | Hazardous waste, solid, n.o.s. | 30 | 17H | Metal | | 551 | | 8/6/90 | 50 | 124.1 |
| | | | | | | | | | | | Total Weight: | | 134 |
| Ensco | ✓ | | UCB 834 | Waste compressed gas, n.o.s. | 25 | cyl | Metal | | 551 | D001 | 5/14/90 | 134 | 10.0 |
| Ensco | ✓ | | UCB 836 | Waste compressed gas, n.o.s. | 25 | cyl | Metal | | 551 | | 5/14/90 | 134 | 10.0 |
| | | | | | | | | | | | Total Weight: | | 20 |
| Ensco | ✓ | | UCB 1029 | Waste corrosive liquid, base, n.o.s. | 5 | 37A | Metal | | 551 | D002, D003 | 6/22/90 | 107 | 20.0 |
| | | | | | | | | | | | Total Weight: | | 20 |
| Ensco | ✓ | | UCB 1166 | Waste corrosive liquid, n.o.s. | 5 | 17H | Metal | | 551 | D002 | 7/19/90 | 68 | 20.0 |
| Ensco | ✓ | | UCB 1243 | Waste corrosive liquid, n.o.s. | 30 | 17H | Metal | | 551 | D008 | 8/1/90 | 55 | 176.4 |
| Ensco | ✓ | | UCB 13-6 | Waste corrosive liquid, n.o.s. | 5 | 37A | Metal | | 551 | D002 | 7/10/90 | 46 | 140.1 |
| Ensco | ✓ | | UCB 1338 | Waste corrosive liquid, n.o.s. | 5 | 17H | Metal | | 551 | D002 | 8/10/90 | 46 | 20.1 |
| | | | | | | | | | | | Total Weight: | | 357 |
| Ensco | ✓ | | UCB 1004 | Waste corrosive liquid, poisonous, n.o.s. | 5 | 37A | Metal | | 551 | U008 | 6/19/90 | 98 | 20.7 |
| Ensco | ✓ | | UCB 1012 | Waste corrosive liquid, poisonous, n.o.s. | 5 | 37A | Metal | | 551 | D002 | 6/20/90 | 97 | 21.5 |
| Ensco | ✓ | | UCB 1027 | Waste corrosive liquid, poisonous, n.o.s. | 5 | 37A | Metal | | 551 | D003 | 6/22/90 | 95 | 20.0 |
| | | | | | | | | | | | Total Weight: | | 62 |

MANIFEST SUMMARY

FIG.7i

| | PSN | AR21534 | Ensco | |
|---|---|---|---|---|
| | | | Total No. of Items | Wt Sorted by PSN |
| ✓ | Hazardous waste, liquid, n.o.s. | | ORM-E Liquid | 1 | 20 |
| ✓ | Hazardous waste, solid, n.o.s. | | ORM-E Solid | 2 | 134 |
| ✓ | Waste compressed gas, n.o.s. | | Nonflamm Gas | 2 | 20 |
| ✓ | Waste corrosive liquid, base, n.o.s. | | Corrosive Liquid | 1 | 20 |
| ✓ | Waste corrosive liquid, n.o.s. | | Corrosive Liquid | 4 | 357 |
| ✓ | Waste corrosive liquid, poisonous | | Corrosive Liquid | 3 | 62 |
| ✓ | Waste corrosive solid, n.o.s. | | Corrosive Solid | 4 | 48 |
| ✓ | Waste cyanide mixture, dry | | Poison B Solid | 1 | 10 |
| ✓ | Waste flammable liquid, corrosive | | Flammable Liquid | 2 | 140 |
| ✓ | Waste flammable liquid, n.o.s. | | Flammable Liquid | 1 | 25 |
| ✓ | Waste flammable liquid, poisonous | | Flammable Liquid | 2 | 203 |
| ✓ | Waste flammable solid, n.o.s. | | Flammable Liquid | 4 | 178 |
| ✓ | Waste flammable solid, water | | Flammable Solid | 1 | 11 |
| ✓ | Waste Hydrazine, aqueous solution | | Corrosive Liquid | 1 | 20 |

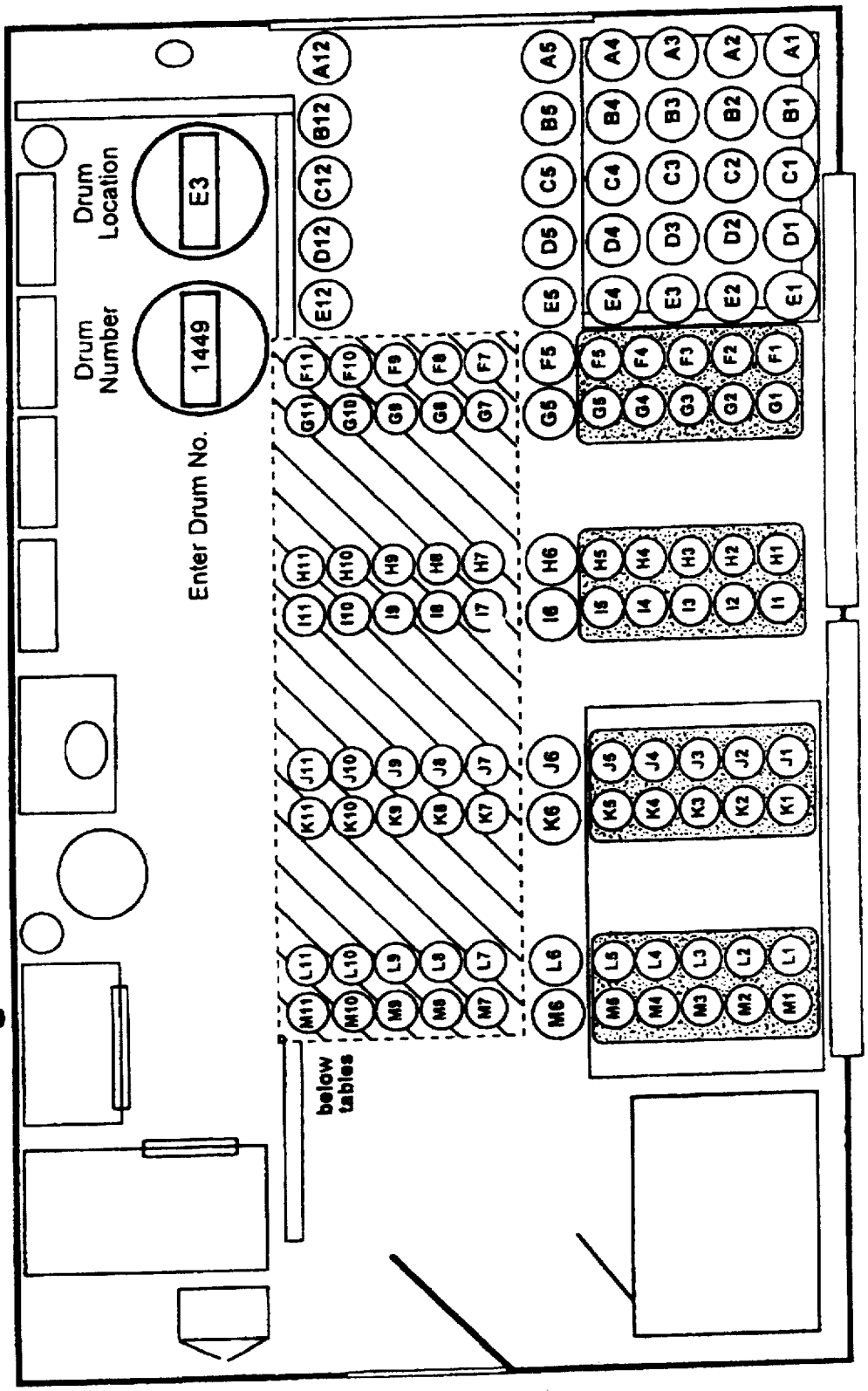

"DOGHOUSE" HAZARD DISTRIBUTION designated container(s): H2-H3     sector(s): south central

| HAZARD PROFILE(S) IN: | containers | size (gal.) | pack type | sealed | aggreg. wt. (lb.) |
|---|---|---|---|---|---|
| - designated sector | | | | | |
| organic bulk flamm liquid nonhalogenated | H1-H4 | 5 | pour | no | 68 |
| inorganic nonRCRA solid | H5 | 20 | lab | no | 110 |
| inorganic corrosive liquid base | H6 | 55 | bulk | no | 320 |
| nonflamm gas | I1-I5 | 5 | bulk | no | 195 |
| inorganic ORM-B solid | I6 | 55 | lab | no | 237 |
| - facing sector (partial) | | | | | |
| inorganic ORM-E solid | G1-G4 | 20 | lab | no | 413 |
| - west-door approach | | | | | |
| nonflamm gas | M6, L6 | 55 | lab | no | 571 |
| inorganic nonRCRA solid | K6, J6 | 55 | pour | no | 359 |
| - east-door approach | | | | | |
| inorganic flammable solid water react. fire risk | A5-C5 | 55 | bulk | YES | 805 |
| inorganic corrosive liquid base poison B cyanide | D5, E5 | 55 | lab | YES | 712 |
| inorganic ORM-A solid | F5, G5 | 55 | bulk | no | 379 |
| inorganic ORM-E solid | F7, G7 | 55 | lab | no | 214 |

FIG. 9

ECONOMICAL AUTOMATED PROCESS FOR AVERTING PHYSICAL DANGERS TO PEOPLE, WILDLIFE OR ENVIRONMENT DUE TO HAZARDOUS WASTE

BACKGROUND

1. Field of the Invention

This invention relates generally to hazardous-waste segregation, packaging, shipment and disposal; and more particularly to a way of introducing major improvements in reliability and consistency of those processes while markedly reducing their cost.

2. Prior Art

My invention addresses a major problem of modern society: how to dispose of the extremely complex and diverse wastes that are generated in industrial processes, military and medical facilities, and high-technology research activities.

Until only a few years ago, both scientists and legislators considered it appropriate to simply require burial of all such materials. Not many decades before that, waste materials were discharged willy-nilly into rivers and oceans, and even onto the surfaces of whatever land sites happened to be convenient to the generator of the wastes.

Several well-known ecological catastrophes, thrust prominently into the public awareness, demonstrated that such casual treatment of industrial and research wastes—even when limited to relatively small areas on the surface of the earth—actually posed severe physical dangers both to people and to other creatures throughout the world. Indeed, it is now generally recognized that such offhand habits of dealing with waste products literally endanger the stability and integrity of the entire planetary ecology.

These dawning realizations, not only about toxic and explosive materials but others that damage the atmosphere itself, have constituted a major shock to the more-highly-developed nations. Technological challenges generally had been thought to relate to the processes of producing and creating bountiful new consumer goods, new medications and other useful substances, and beneficial new services.

Abruptly it became crucial to meet a different kind of technological challenge. That was the challenge of dealing with the inevitable and even more copious accumulation of a new kind of bounty: hazardous wastes arising from disposal of those same consumer goods, medications and other compounds, and the byproducts of their manufacture—as well as the physical by-products of those same beneficial new services.

To their credit, starting primarily in the mid 1960s, scientists and legislators alike have answered that challenge. Both groups were stimulated to undertake intensive activity—research and legislative efforts—to define proper limits for and to regulate heavily the generation, segregation, shipment and disposal (or other storage) of these many hundreds of potentially destructive substances.

Now in the early 1990s these developments have continued to such an extent as to generate still a third kind of challenge: so much is known now about these dangers of wastes that almost every common solvent or insulator seems to threaten physical danger to someone or something, somehow. Far from being limited to carcinogens, cumulative poisons and fetal sensitivities, the list of new syndromes and diseases seems to propagate endlessly and vigorously—and the legislative response continues to keep pace.

To business people, the complexity of the resulting statutory structure of regulatory requirements is staggering. A major and severe problem of the last decade of the Twentieth Century accordingly has materialized as a trend toward obstruction of many business activities previously considered ordinary and necessary.

This situation is particularly problematic for new businesses and particularly for medium-small operators. For such people the cost of proper disposal may be monumental and prohibitive, but even the cost of determining what proper disposal is—and of predicting what soon-to-be-drafted new laws will declare it to have been—is even more fearsome.

No longer can the line be drawn at some simplistic point that separates the willful polluter from, for example, the good industrial citizen. What makes these determinations prohibitive is the combination of two characteristics of industrial, military, medical and research wastes:

(1) the specific materials that make up such wastes are overwhelmingly diverse and numerous; and (2) determining the proper disposition of each one of these diverse materials requires careful consideration and seasoned judgment by high-level professionals.

Even for larger institutions the costs are a major concern. One single campus of a major university, for example, last year spent well over a million dollars in disposal of laboratory wastes.

A newly important service industry has developed to provide the specialized decision-making and physical procedures needed for proper segregation, shipment and disposal. In reputable, responsible firms providing those services, the current state of the art is generally to assign an advance-degreed chemist or like professional scientist to personally supervise and participate in the process.

In my opinion, minimum requirements for a competent laboratory packer include a bachelor's degree in chemistry plus about two years of on-the-job experience in dealing with hazardous wastes. Alternatively a qualified person may typically hold a doctoral degree in chemistry and have perhaps one year of experience.

Such an individual is actually stationed at an institution's loading dock or similar facility where waste chemicals ape brought for classification and dispatch. She or he personally examines virtually every bottle or other package of material brought to that dispatch area, and personally decides how that item should be labelled, package grouped with other items, and shipped—and to what disposal site.

As a matter of course, such individuals must have frequent recourse to reference materials such as chemical tables, specialized books, computerized so-called "chemical dictionaries", and statutory summaries. In such reference materials can be found legally recognized hazard types, applicable regulations, compatibilities with other materials, and identifications of particular disposal facilities—all with reference to each different kind of waste.

None of these references has all the needed information. Each source only provides a small part of the picture, and the advance-degreed professional must mentally integrate the picture to decide what to do with each item.

Not infrequently the professional must actually resort to a quick chemical test to establish compatibilities with other materials also present for disposal at the same time. The professional generally concludes work on each item by writing on its container label, and giving very specific oral or written directions to a disposal technician for labelling, packaging, routing, etc.

There are actually two factors that lead to a need for highly educated and trained personnel to segregate and pack hazardous wastes. The first, which has already been introduced implicitly, is the need for understanding of the related chemical problems—together with the overlay of legal requirements.

The second factor is that the mental task of determining a segregation regimen for packaging, shipment and disposal must be performed on a free-form basis for each consignment of material encountered. In other words, no integrated protocol or formulaic approach has been developed to satisfy the requirements for (1) proper physical segregation based on chemistry, (2) proper physical separation based on law, and (3) proper routing based on the acceptance permits of specific available disposal sites.

These three groups of requirements—each with its own separate subdivisions for short-term storage, packaging, shipping, long-term storage, and destruction respectively—are sometimes at odds with one another. Legal requirements, for example, often have been introduced without regard for chemical realities.

Accordingly the segregation and routing process is a multidimensional problem, with no closed-form solution. Each professional chemist in this field accordingly must somehow integrate all the necessary considerations afresh, virtually applying first principles on an ad hoc basis, for each bottle of waste material that appears.

As will be apparent from what has been said already, the amount of high-level professional time required to deal with perhaps a fraction of a liter of material can be extremely time-consuming and expensive. A pervasive aggravation in this regard is the constant recognition that the same high-level decisions are being made over and over again—and that there is enormous inefficiency in that repetitive decision-making for the same materials.

Remarkably enough, however, those are not the only major problems with such a system. They may not even be most important major problems; another problem that can be even more important is the problem of inconsistency or variability.

Different high-professional-level workers, or even the same workers on different occasions, when faced with a substance that is not routinely encountered will classify and therefore sort that material differently. To anyone not familiar with hazardous-waste management restrictions, the variability thus introduced might seem harmless, but it is not at all so under the severe regulatory and reporting requirements of the present day.

In addition such problems can become particularly onerous when, for instance, many different consignments of some particular material have been shipped to disposal sites in accordance with a statutory requirement (or an accepted understanding of such a requirement) which then changes. The various consignments of that particular material must then be retrieved, sometimes repackaged, and sometimes shipped to a different site.

If consistency was not observed in the original pass through these same processes, then as will be understood the problems of locating all the consignments in their respective disposal sites, or in diverse forms of packaging, are compounded drastically. In extreme instances a particular material may have been initially bulk-packed (e. g., poured) with other, supposedly compatible, materials—and the identity of the particular material in that bulk package may not even have been maintained.

It will be clear that such problems can easily mushroom into corrective efforts that are absurdly beyond any rational proportionality to the value of the original chemical or other substance, even in its previous use as new material. This last point leads to the crux of the primary modern problem of waste management: the regulatory schemes advance relentlessly, virtually without relief for the fact that what is being carefully managed is nominally without value and, in fact, is waste!

Another approach to appreciating the ironic, even bizarre, implications of the current state of affairs in the hazardous-waste management field is to consider the societal cost of the professional time expended—as described above—in classifying waste materials for disposal. It is surely astonishing to recognize that, in our modern society, entire careers of talented, competent degreed scientists may be dissipated in the detailed physical process of segregating waste products.

As will be seen, some present-day objectives encompass recycling. As a practical matter, however, recycling will never (or at least not in any short-term framework) account for a major fraction of hazardous wastes. Thus the disproportionalities and incongruities of regulatory demands remain largely unmitigated by recycling programs.

Still other kinds of problems can arise. A regulatory agency, for example, may permit particular groups of materials to be shipped to a certain disposal facility indiscriminately as to organic or inorganic status, but one or the other may not be accepted by equipment at that facility (e. g. an incinerator).

Many regulations require that cumulating drums or containers of certain substances cannot remain open for longer than a specified time period. That period varies with the type of permit held by the generator of the waste, or by the service entity that manages its classification and shipment, or by the disposal facility.

Furthermore, regulations are not merely a maze, but a dynamically shifting, constantly changing maze. The professional-level decisions must shift to track regulatory revisions.

In addition to the major problems already discussed, many regulations superimpose a parallel burden that is nearly overwhelming in its own right—a massive paperwork system designed to track practically every individual item of hazardous waste. Dealing with these reports, labels and shipping manifests occupies an inordinate amount of the time logged by the professional personnel discussed earlier.

Still another class of problems is recognized by some professionals though not fully embodied, at this writing, into regulations. That is the difficulty of dealing with diverse items of waste that have been stored in a common facility, when emergency conditions later arise.

In such situations—typically fires or explosions, spills, earthquakes, and combinations of these occurrences—emergency personnel such as firemen are called upon to control what is occurring. Very often the detailed nature of the response by these personnel should be formulated on the basis of exact and full details about the type of material stored in each portion of the facility, respectively.

For example, a response that is suited to corrosive liquids stored in one corner of a storage site is likely to be entirely inappropriate to explosive gases stored under high pressure in another corner of the same site. Even much less dramatic differences between the properties of waste chemicals stored in different portions of a single facility can be important, and if not taken into account can give rise to serious damage or injury.

Accordingly it is extremely desirable to be able to supply emergency personnel with a current description of the hazardous properties of materials stored in each different part of such a storage site, respectively. As a practical matter, however, quite commonly the distribution of materials in such sites changes rapidly from day to day, even hour to hour; and prevailing procedures among even reputable and responsible disposal-management firms are heretofore entirely inadequate to provide a fully up-to-date analysis.

In fact, with a typical disposal staging area having perhaps a thousand different chemicals in various phases of storage and removal, maintaining a usable current inventory heretofore would be physically impractical if not impossible. Constructing a listing by actually taking inventory would be clearly impossible under emergency circumstances, and it is well known that attempts to keep running totals accurate usually diverge quickly from the actual storage.

The topic of taking inventory leads naturally to consideration of computerized inventory systems, and I shall now digress to discuss some known computerized inventory systems and computerized systems for tracking merchandise in process—i. e., dynamic inventory of items during manufacture. It is essential to recognize at the outset, however, that a mere inventory system addresses only a small fraction of the myriad aspects of the hazardous-waste management labyrinth that has been discussed above.

Similarly the electronic so-called "chemical dictionaries" mentioned earlier are directed to only a narrow slice of the overall problem. In fact, as far as I am aware, heretofore no effort to get the entire hazardous-waste handling process fully under control has been undertaken.

A few automated inventory systems have been developed for, or applied to, hazardous wastes. One of these is in use at the Lawrence Livermore National Laboratories.

In that system, computer-readable bar codes are placed on each package or other item of waste, and other bar codes are posted in association with each storage area. The system entails use of automatic bar-code readers that scan both the package and the storage-area codes whenever waste is moved into or out of any area.

The Livermore system performs no significant segregation or categorization function related to hazard parameters. Rather it is used solely to track or trace materials through the facility complex, so that each waste package or item is localized.

Such a system tends to prevent personnel from actually losing or forgetting about waste materials—and this function is of course potentially quite valuable, especially for materials that are hazardous. The system accordingly fails to resolve the prior-art problems described above.

Another automated inventory system which in part is used to track waste materials is now being installed at the University of California. The automated system was developed in response to a legal requirement that institutions operate a system for tracking chemicals on a so-called "cradle to the grave" basis.

This designation means that chemicals are entered into the tracking system when they are purchased, and their location on campus is updated as the materials are routed to a lab for use—and then later as the same substances (which may have been contaminated, degraded or otherwise used, or in many cases are simply residual) are routed to a staging area for disposal. This system too is substantially limited to localizing materials, to prevent loss (and, as to new materials, theft); no significant component of the system addresses the special needs of hazardous-waste handling.

Based upon a search, I have found no other inventory system and no other computerized management system designed for waste materials, and certainly none for hazardous waste materials. Even more emphatically I have found no inventory system aiming to bring under control the management of hazardous-waste materials on a come-one/come-all basis—that is to say, the necessary basis that no disposable material can be rejected from the system.

(In the preceding sentence I have inserted the word "disposable" because some substances do exist that cannot legally be discarded, destroyed, shipped out of the country or in any other way subjected to disposal—or retained for any protracted time period. Dioxins, and dioxin precursors, are the only such materials of which I am now aware. This paradoxical state of affairs seems to represent a temporary anomaly in the statutory scheme for dealing with wastes, and may be expected to undergo corrective action soon; however, for the present those few materials are simply rejected by any disposal service.)

Declining to accept disposable hazardous wastes, or any particular type of disposable hazardous wastes, is permissible and commonplace—even required—with respect to individual facilities. As to any comprehensive waste-management system, however, it is axiomatic that no such luxury would be allowed.

Three patents have been located by search which are of interest in that, to some lesser or greater extent, they do provide classification and recognition of materials or items by characteristics, as distinct from mere identification codes. It will be understood that the vast majority of inventory systems simply accept unique item identifying numbers or other codes—often listed in input paperwork or read by optical bar-code readers or the like from the products themselves.

The three patents most pertinent for present purposes, though in my view not at all close to the invention disclosed herein, all provide computerized sorting of materials by combinations of characteristics (but not hazard characteristics) or requirements, plus computerized generation of accompanying documentation. They are U.S. Pat. Nos. 4,648,238 to Carlson (sorting by integrated-circuit-chip quality), 4,509,123 to Vereen (by garment style and size), and 4,972,318 to Brown (by building-material rough-opening size).

Carlson's patent is the most sophisticated of these. It provides an analytical framework for classifying partially completed integrated-circuit chips on the basis of two primary characteristics: quality and electrical properties.

The Carlson invention also solves the mathematics needed to take into account the generation of byproducts, coproducts and downgrades. He thereby makes possible the ordering of materials, and fabrication of untasted, ungraded product, in suitable quantity to satisfy end needs in the market.

Yet Carlson never suggests that any of the principles he introduces might have any application in the realm of hazardous-waste management. Further, none of the parameters included in his analytical framework is related to safety, physical dangers in materials handling, or even unrestricted acceptance of all materials in an unstructured flow of items. Moreover the number of primary characteristics (two) on the basis of which his system segregates goods is very small.

Vereen and Brown are even more remote from having any application to the problems of classifying and separating hazardous wastes. Though Vereen does make use of labels (that associate a record identification code with individual garments and groupings in his stream of products in process), it is not clear whether the labels are prepared as part of his real-time computer operations or simply pre-printed.

These two patents both deal with a group of product parameters that is very small (two or three each) and very tightly defined and limited. Neither has any significant complicating overlay of competing requirements as described in this document for the waste-disposal problem.

Computerized generation of labels is of course a highly elaborated field of its own, and in many cases the labels generated are in turn read by computer-scanner combinations to keep track of merchandise or other items through various kinds of handling or processing. Representative of this field are U.S. Pat. No. 4,656,591 to Goldberg (bar-code prelabelling by consignee, and later automatic picking to and from a sorting conveyor); U.S. Pat. No. 4,878,771 to Nishida (multiple successive label generation, later applied to articles for "controlling a commodity location"); and U.S. Pat. No. 4,807,177 to Ward (date coding by a handheld printer that "communicates with a system processor for coordinated inventory control, market study or other functions").

Still others are U.S. Pat. No. 4,812,985 to Hambrick (applying and later reading a bar-code label on a car-key case, in an automatic device that stores and dispenses the keys); and U.S. Pat. No. 4,958,280 to Pauly (application of shipping labels to contact-lens prescriptions, and use of related databases to coordinate patients' eye care with manufacturer's and doctors' inventory control). None of these patents discloses any relationship to waste organizing or disposal.

Some few patents have been located that disclose software or computer systems which implicate health considerations, or other types of exigency. Examples are U.S. Pat. Nos. 4,766,542 to Pilarczyk, and 4,737,910 to Kimbrow.

The first of these discloses a computer-operated system for telephonic notifications to patients, by voice synthesis, when prescriptions are due to be refilled. Here the exigency involves potentially severe medical problems if medication doses are missed. This patent simply maintains a schedule based on "initial creation of refill notification records"; to complete the reminder calls the program pulls up the patient's medication pattern as well as information from a doctor file.

The second patent in this group, Kimbrow, is essentially a conventional inventory-tracking program. I include it here only because the patentee mentions some applications of his program that carry a degree of urgency—namely, hospital stocks and military supply, "where the depletion of inventory supplies can have catastrophic results."

Operationally, however, neither Kimbrow nor Pilarczyk suggests any connection with the physical dangers posed by hazardous-waste mishandling, or suggests any technique that would mitigate the waste-disposal problems discussed above.

Even much more remote are many patents on software inventory systems that aim to control exigencies such as theft by staff or by retail customers. These include U.S. Pat. Nos. 4,563,739 to Gerpheide; 4,961,533 to Teller; 4,419,734 to Wolfson; and 5,005,125 to Farrar.

Not even related by this thread of urgency to the present invention are other computerized inventory systems such as those disclosed in U.S. Pat. No. 3,688,087 to Howard; 4,336,589 to Smith; 4,783,740 to Ishizawa; and 4,843,546 to Yoshida. Computerized inventory-taking equipment and specialized storage-and-retrieval hardware are described in U.S. Pat. Nos. 4,025,766 to Ng; 4,866,255 to Sing; and 5,025,140 to Varley.

As will now be apparent, the previously outlined major societal problems associated with hazardous-waste management are not significantly addressed by either the procedures that are well known in the hazardous-waste management field, or any United States patent which I have been able to find. Thus the prior art has failed to provide critically needed economical, consistent techniques for averting the physical dangers of hazardous-waste segregation, shipment and disposal.

SUMMARY OF THE DISCLOSURE

My invention does address those major societal problems, and makes a major contribution to resolving them. Before setting forth specifics of my claimed procedure, I shall present a brief preview of a novel conceptual foundation upon which that procedure rests.

Inherent in my invention is the concept, which I believe I am first to recognize and use, of a hazardous-waste profile—or, more specifically, a hazardous-waste segregation, shipment and disposal profile. My invention proceeds according to the novel philosophy that wastes can be categorized or classified for shipment purposes based upon expression of the segregation, shipment and disposal needs in a standardized format.

It is this expression of waste requirements in standard form, for any given specimen or consignment of waste material, that is the hazardous-waste profile. Upon this concept as a foundation, my invention then builds a procedure for:

- assembling and maintaining sufficient information for rapid and consistent extraction of a profile for any waste material that can be identified;
- automatically using the extracted profile to generate packing, shipping and disposal instructions together with all the needed paperwork; and
- automatically keeping enough information in usable form, even after actual disposal has been effected, to permit immediate recall, analysis, tabulation and use of the information trail from an individual subfacility of a particular generator of waste to an individual termination point of a disposal facility.

With this introductory preview in mind, I shall now present a somewhat more rigorous definition or description. My invention has two major aspects, which I prefer to use together in a single procedure—although as will shortly be appreciated their primary thrusts are amenable to independent use.

In the first of these aspects, the invention is a process for segregation, shipment and disposal of hazardous waste. Some of the steps in the process are described as performed by preprogrammed computer steps; other steps are not so limited, and may be performed by people, or by people and computer functions in conjunction, or in some cases either by people or by equipment—for instance automatic equipment under computer control.

All these variants are within the scope of my invention. The process of my invention comprises at least the following steps.

(I have assigned a lower-case parenthesized letter designation to each step, merely for purposes of convenience in later cross-reference. Neither these letters nor the sequence in which the steps appears here is necessarily the actual sequence in which the steps are performed, except to the extent specifically indicated by words or phrases such as "then", "before steps . . . ", etc.)

Step (a) is maintaining a computerized database of hazardous waste materials. That database comprises, for each material in the database, at least one entry that includes sufficient information for synthesizing a hazardous-waste segregation, shipment and disposal profile for that material.

As will be recognized by readers skilled in the arts of computer programming, the word "database" as used in this document encompasses a database composed of a computer file—that is, a single file held or used in a computer—and also encompasses a database composed of a group of two or more such files. It is intended that within this document the sense in which the word is being used will be clear from the context.

Step (b) is identifying a specific consignment of a particular hazardous waste material that has been received, or is to be received, in a given quantity in a particular batch of hazardous waste materials. In this document I am using the terms "consignment" and "batch" in slightly special ways, which I shall now digress to explain.

I usually use the word "consignment" to refer to an individual item that is received or to be received. Each consignment thus may be a small bottle of solvent, or a package of powder, or a canister of compressed gas, or a basket or like container of solid metal or plastic pieces, etc. (Sometimes, however, a very small number of individual packages may be physically bound together and treated as an individual consignment.) A number of consignments—ordinarily a large number such as perhaps fifty to several hundred—thus makes up a batch of materials.

I employ the term "batch" in two different senses, in this document. As used in the above statement of step (b), "batch" simply means all the consignments that are received, or to be received, within some arbitrarily defined grouping.

Such a grouping may be, for example, all the waste items received during one day, or one hour, or one two-week period. Alternatively a "batch" may be all the waste items received under heading of a particular invoice or other paperwork designation; or in a particular truckload; etc.

In the second sense of the term "batch", that word will appear generally in association with, or as part of, the phrase "batch mode". This latter phrase refers to an embodiment of my invention that is particularly preferred when all the consignments in a batch (used in the first sense) can be identified at once—and usually, but not necessarily, in advance of actual receipt.

Thus "batch mode" refers to a situation in which, for example, a list of all the items or consignments in a batch is provided to the operator of my invention before physical transfer of the actual consignments. In this situation all the descriptions in the list can be preprocessed on a paperwork basis all at once; later when (or if) the physical transfer occurs, then the physical dispositions can all be effected at once, based upon that paperwork preprocessing.

Similarly all the items or consignments in a batch can be physically placed in a common area—such as a loading dock or other sorting and routing facility—and preprocessed at once on a paperwork basis before any of the consignment is removed. Then all the physical dispositions can be effected at once, based upon that preprocessing.

I thus use the term "batch mode" to distinguish a converse situation, which I call the "on-line mode", in which a batch is arriving at a staging area as, generally speaking, a continuous stream or sequence of incoming items—and similarly are being removed from that area as an outgoing continuous stream or sequence of items. Under these circumstances, the consignments are not all available at once.

Now I shall resume presentation of the other steps that are part of the above-mentioned first aspect of my invention.

Step (c) consists of then searching the database for a material entry which is substantially related to the particular material of the specific consignment identified in step (b). By the word "searching" I mean to encompass two different kinds of locating process.

The first of these is a simple lookup function in which a computer operator scrolls through the database as displayed on a monitor, or moves directly to a predetermined record by identifier or the like. The second is the type of locating process that is more commonly associated in computer jargon with the term "searching"—namely, engaging the power of the computer to scan through the database, usually seeking to match some pattern of characters supplied by the system operator.

In my invention, the operator most typically searches for an entry that includes the chemical name of the material of the specific consignment. Ordinarily the name appears on a label, or in other paperwork, accompanying the consignment; but very infrequently the material of the consignment must be identified in some other way.

At any rate, as will shortly be understood, such a substantially related entry will be found in the very great majority of instances, particularly after the database maintained according to step (a) has been in use for a few months. Nonetheless it will occasionally happen that the substantially related entry does not match exactly.

For instance, the entry may describe the specific consignment correctly in every regard except for physical state: the entry may be for the particular material in solid form, while the consignment is the same substance but liquid. This possibility, and the possibility that not even a substantially related entry is in the database, are addressed in step (d).

Step (d) consists of then performing just one of three possible functions.

If such a substantially related material entry is found in step (c), but it does not exactly match the consignment, then the function of step (d) is editing the information in the entry to create a customized material entry corresponding more precisely to the particular material identified in step (b). Such editing is the first of the three possible functions.

For instance—continuing a preceding example—suppose that the physical state does not match. The operator then in step (d) revises the material entry that has been found, so as to create a new entry which specifies the physical state of the consignment, but otherwise is exactly the same as the found entry. That is done only if necessary.

By contrast, if an entry is found in step (c) that does match exactly, then the step (d) function is a null function—i. e., nothing is done. This is the second of the three possible functions.

If, however, no such substantially related entry at all is found in step (c), then step (d) consists of creating a new material entry, for the particular material of the consignment, in the computerized database of step (a). This is the third of the three possible functions.

Step (e) is maintaining a multiplicity of computerized sets of container-information fields for a multiplicity of particular containers, respectively. By the phraseology "sets of . . . information fields" I mean to refer in a general way to either a record in a database, or to fields making up just part of such a record; the reason for using this generalized expression will become more clear shortly.

Each set of container-information fields includes a hazardous-waste segregation, shipment and disposal profile of materials placed or to be placed in one corresponding container of the multiplicity. In other words, in one form of my invention step (e) could be maintaining a database with multiple records, each record representing one container—such as, for example, one shipping drum.

The container, however, is also general and could instead be a box, a truck, or a rail car. It could also alternatively be a portion of a shelf or some other temporary storage area where consignments of waste may be placed for either recycling or later more-permanent disposal.

Step (f) is then extracting, by preprogrammed computer substeps, a hazardous-waste segregation, shipment and disposal profile from the information in the material entry found in step (c) or created in step (d). This extracting step may take a great variety of different forms, depending upon the form or format in which the profile information is maintained in step (a).

Thus for instance if the information is preformatted into the hazardous-waste profile, and no change is made in it at step (c) or step (d), then naturally the profile is simply read from the material entry. It is my preference, however, not to preformat the information into the profile in the database of step (a), but rather to store elements of the profile in independent fields.

One reason for storing the waste-profile elemental information in that way is to be able to most easily and efficiently—and with the greatest possible versatility—find, analyze, manipulate and revise the individual elements. Thus for instance when state or federal regulations change the approved language of, say, hazard classifications, those entries that employ the older language should be reflected in new entries using the newer language. Even the temporary or ad hoc revisions of step (d) above are significantly simplified and facilitated by storing the profile data in elemental rather than unitary form.

Depending on the exact circumstances it may be desirable to eliminate the older language; or instead it may be preferred to retain the older wording in the database while creating a duplicate record containing the newer language. This latter approach may be important if it is desired to retain the ability to retrace the processing of waste consignments processed previously, or if some new consignments may be expected to enter the system with the obsolete wording despite the change.

All these different possibilities depend upon easily locating the earlier entries that contain the older language, so that those entries can be either changed or duplicated, with changes (or partial changes) made only in the duplicated entries. It is also desirable to be able to easily analyze the profile information.

For instance, one may wish to isolate only those records in which a particular wording for one of the information elements (e. g., hazard class) occurs in conjunction with a particular type of entry for another one of the elements (e. g., physical state). Thus it may be desired to modify the hazard-class wording for only some hazard classes, and only for materials that are, say, acidic solids.

Such analysis is greatly facilitated by retaining the individual elements of information (in this example, class, acid/base, and physical state) separate in the database. The extraction process of step (f) may then require at least some form of combination of the individual elements to synthesize the profile.

As will be apparent to persons skilled in the art of computer programming, it may be preferred to employ also some type of coding or decoding—or to include various other kinds of manipulation for a variety of purposes—in the synthesis.

Step (g) is searching the computerized sets of container-information fields, by preprogrammed computer substeps, for a particular set of container-information fields that corresponds to a particular one container, of the multiplicity, in which to place the particular material identified in step (b). This container-information-field set searching step comprises searching for a particular set of container-information fields whose hazardous-waste segregation, shipment and disposal profile is compatible with that of the entry found in step (c) or created in step (d).

In physical terms this step corresponds to looking for a container that has been assigned to receive material with the hazard profile of interest, and which has not already been filled—or allocated enough material to be filled.

Step (h) is then, if no such particular set of container-information fields is found, creating a new one of the computerized sets of container-information fields for a new container to be added to the multiplicity. This step simply corresponds to starting a new container if none has previously been assigned to material with the hazard profile of interest (and remains unfilled).

Step (i) is then causing the found or created material entry, together with a representation of the particular quantity, to be associated, by preprogrammed computer substeps, with the particular set of container-information fields, found in step (g) or created in step (h), for the particular one container.

This association step can be performed in a great variety of ways. For a first example, if a relational-database system is used, the association can be effected by defining a relation using common fields in two or three different databases.

To visualize one such system using this first example, suppose that the container-information field sets of step (e) have the form of complete records, and one field in each of those records is a first identifying code number that uniquely identifies a container. Suppose also that one field in the waste-materials database of step (a) is similarly a second identifying code number that uniquely identifies one record in that database.

Then the container record and the material entry may be linked through a third database in which each record has just four fields—namely, the first and second code numbers, a third identifying code that uniquely identifies a specific consignment, and a quantity field. Each entry in the linking database then simply represents placement of one specific consignment, of a specified quantity, with a particular waste profile into an identified container.

All records in the linking database for a specified container may be maintained in sequence, i. e., kept contiguous, if desired. This is not necessary, however, since the computer can scan through such a narrow database quickly to find the records of interest with respect to any specified container.

If preferred, yet another database with the consignment information could be linked to provide the quantity, so that the quantity field could be omitted from the linking database. This approach would make that database even smaller and so further speed the scanning process.

As a second example of a way to effect the association, a database can be used that accepts a first group of fields identifying a particular container and the profile assigned to it—and that also accepts, following that first group of fields, one or more field sets identifying specific consignments. The pattern of consignment-identifying field sets can be repeated a large number of times within each record, so that a widely varying number of consignments can be associated with each container.

In principle the number of repetitions might be made indefinite; however, in the preferred embodiment that I have embodied by partially computerized processing a limit of ninety unique consignment records (i. e., field sets) is imposed by the computer hardware/software system. This limit is generally unobjectionable, inasmuch as most practically occurring combinations of consignment size and container size correspond to a practical maximum of roughly sixty or seventy consignments per container.

In practice the number of independent or unique consignment entries is restrained by physically grouping multiple consignments of like materials, and making one consignment entry for the group. Consignments can be physically grouped by practical means such as taping two or several consignment containers (i. e., the individual internal containers) together; any labelling for the consolidated consignment can then be applied to any (or for example to any two or three) of the consignment containers in the group.

This second example is the arrangement that I prefer. The necessary repeating-field-pattern capability is available in at least one commercially available database, as will be set forth fully in the "DETAILED DESCRIPTION" section of this document.

Still a third example of a way to effect the association is to use a database in which each record is of fixed length, but in which certain records represent specific containers while other records—accumulated following the container-representing records—represent specific consignments. This arrangement can be used if certain fields are used in one way in the container records but in a different way in the consignment records.

Thus for instance in each record that represents a container a special symbol (e. g., an asterisk "*") might be placed at the beginning of a certain field. The various fields in that record may identify the specific container and set forth its assigned hazard profile.

The special symbol and hazard profile would be omitted from records representing consignments, and the same fields in those latter records would carry different implications. Those would include identification of the consignment, its quantity, the date of association, the operator's identification and perhaps other special notes.

Yet a fourth example of a way to make the association, also using fixed-length records, is to make each record long enough for both the container information and the consignment information. In such a system the container information is simply repeated in every consignment record. In principle the consignment records in such a database need not be assembled contiguously, as the computer can scan for all the records having common container designations.

A fifth way of effecting an association, which may be more or less feasible depending upon the characteristics of the computer operating system employed, is to make a separate database file for each container. Individual records assembled in each file would then represent consignments placed (or to be placed) in the corresponding container.

The filespec (e. g., file name and extension) of each database would contain in coded form the container identification, a coded reference to the hazard profile assigned to that container, and the date when that container is started or "opened"; while the date and time stamp of the database file would represent the most recent consignment addition to (or removal from) that container. Even relatively short filespec formats would provide sufficient space for these informational elements, at least in operating systems allowing hexadecimal characters in some or all positions of the filespec.

Still a sixth example of a way to effect the association is to provide (1) a database with one record per container, containing all the data specifically pertaining to the container, and (2) a separate database containing one record for each consignment, containing all the data specifically pertaining to the consignment.

Each record in the second database also contains an unambiguous reference, such as a token name or a file pointer, to that record in the container database corresponding to the container in which the consignment is or will be located. By means of the unambiguous reference all data on the container for each consignment are accessible by indirect reference.

By means of searching in the consignment database all data on all consignments in a container is accessible, for each container. As is well known to those skilled in the art of computer programming, reference speed can be improved or memory requirements reduced by various alternative organizations of such unambiguous references—including chained structures, tree structures and various levels of indirection.

As can now be appreciated, the "associating" step may if desired include a copying function, in which some or all of the fields in the material entry of interest are copied into another database record. For purposes of discussion, however, in the remainder of this document I shall from time to time refer to various manipulations (e. g., revision) of the "material entry" after the associating step. Except to the extent otherwise indicated, these manipulations are to be understood as performed on the copy, rather than the original entry in the materials database.

The foregoing recitation of steps (a) through (i), with explanatory comments as just presented, may constitute a description or definition of the first aspect of my invention in its most broad or general form. Even in this form, to a person skilled in the field of hazardous-waste segregation, packing, shipment and disposal, my invention can be seen to resolve the many severe problems discussed in the preceding "PRIOR ART" section of this document.

In particular, my invention makes it possible to assign relatively low-level personnel to operate the computer system, with very greatly reduced possibility of misclassification or misrouting of individual consignments. The information stored in the hazardous-materials database of step (a) is used over and over to make the same sorting and routing decisions consistently, almost instantly, and of course—particularly in view of the novel capability to substitute entry-level personnel for advance-degreed chemists—very economically.

It will be understood that when a waste material is encountered that has not already been characterized in the materials database, a new entry must be prepared. Preferably this step is performed by higher-level personnel as before; however, even here the amount of time required is far smaller, and the consistency and rationality with which the new material is classified—in relation to all the other materials already in the database—are very greatly improved.

These latter advantages arise from the ability of the professional-level personnel to almost always find quickly and accurately a preexisting entry in the materials database for some closely related material. The advanced operator need make only those editorial changes, at step (d), required to distinguish the consignment material at hand from the closely related material entry found.

In many or even most instances the person performing this step should verify, e. g., the hazard class and certain other data, by reference to other information sources—as is done in the prior-art manual systems for a very large fraction of all consignments processed. Even this step, however, will proceed more quickly and with a greater degree of assurance, because the professional doing the work will know in advance the corresponding information for the closely related material—and, in event of doubt, can quickly check that information for several closely related materials.

Although this first aspect of my invention thus resolves to a very great extent the problems of the prior art, for fullest enjoyment of the benefits of the invention I prefer to practice the invention with certain other features and limitations.

For example, I prefer that the material-database maintaining step (a) comprise the substep of including within the information for each hazardous waste material at least these information elements:

(A) the physical state of the material, (B) a primary hazard class of that material, (c) an indication whether the material is organic or inorganic, and (D) if the material is corrosive, an indication whether the material is acidic or basic.

When these elements are present, I also prefer that the extracting step (f) comprises synthesizing the hazardous-waste segregation, shipment and disposal profile by combining, by means of the preprogrammed computer substeps of step (f), at least the information elements (A) through (D) in the above list. If the material has a secondary hazard class, I also prefer that the material-database maintaining step (a) further comprise the substep of also including that secondary class within the information for each hazardous waste material; and that the extracting step (f) further comprise also combining that secondary hazard class into the profile.

Furthermore I prefer that the material-database maintaining step (a) further comprise the substep of also including, within the information for each hazardous waste material, identification of one or more facilities, if any exist, that accept the material. I also prefer that the extracting step (f) further comprise also combining into the profile that at least one facility-related parameter.

In extracting the hazard profile, as has been seen, several different parameters are combined. I prefer to effect such combination simply by concatenation of the character strings in the several corresponding parameter fields, to produce a unitary string that can be matched to like strings that are associated with containers.

Several other approaches, however, could be used. For example, the character strings in the several parameter fields could be matched with like strings in several different container-associated fields independently—yielding exactly the same end result.

As other examples, individual codings of all the possible hazard parameters could be stored in a database file to identify them with the corresponding actual parameters. The individual codings then could be manipulated to develop a unitary or composite coding of the hazard-parameter profile.

In addition I prefer that the material-database maintaining step (a) further comprise the substep of including, with the information for each hazardous waste material, a special-handling designation if any is applicable. That special-handling designation is advantageously selected from the group consisting of:

ENSCO special handling
cyanide
sulfide
bromine
alkali metal
water reactive
batteries
pyrophoric
Class C carcinogen
stench
polymerizable
asbestos
wood box
cyanide—USPCI
USPCI
SSI
mercury
BDT
perchloric<50%
perchloric 50 –72%
PCB.

In this listing the acronyms "ENSCO", "USPCI" and "SSI" represent the names of disposal facilities that are well known to individuals familiar with hazardous-waste management, particularly in west-coast areas of the United States. Hence it will be understood that equivalents of these particular entries will be other disposal facilities—especially for segregation and shipment programs carried out in other parts of the country, or in other countries.

The special-handling entries listed here have been couched in such a way that no more than one entry need be associated with any consignment. Thus enough information is included in some entries (e. g., "cyanide—USPCI") to uniquely define all applicable handling requirements for all materials encountered to-date.

Naturally as other waste materials come to be recognized as needing special handling, persons practicing my invention are likely to find expansion of this list necessary. All such later-arising handling requirements are also to be regarded as equivalents of the particular entries presented above.

I have found that the elements (A) through (D), plus secondary hazard class when applicable and special-handling designations just enumerated, are sufficient to constitute a hazardous-waste segregation, shipment and disposal profile adequate to fully define all handling and routing for all waste materials which I have encountered. The number of such materials in my materials database, after about one year of full operation of my invention, is about 7,500.

In practice a database of that size typically enables handling of roughly 13,000 different material entry types. The reason for this expansion is that many materials in solid form have infrequently occurring liquid-form analogs, and conversely—and the infrequent occurrences of the analog forms can be conveniently handled by editing material entries on a temporary or ad hoc basis for the particular container being filled.

I prefer that approach to creating new database entries for those analogs, because database size is thereby restrained. The result is to keep search times and hardware requirements to a minimum.

For labelling purposes, however, strictly apart from the physical segregation, shipment and disposal functions, I prefer to practice my invention with yet another feature. Specifically, I prefer that the material-database maintaining step (a) also comprise incorporating within the information for each hazardous waste material additional information elements that are regulatorily required for labelling of hazardous waste.

Correspondingly I prefer that the procedure further include the additional steps of (1) using the additional elements, that are required for labelling, in computerized generation of one or more labels for the hazardous waste, and (2) applying the one or more labels thereto (i. e., to the containers holding the corresponding waste).

The additional elements required for labelling preferably comprise at least one of these added information elements:

(A) one or more so-called "RCRA codes" established under the Resources Conservation and Recovery Act, (B) California "EH" or "extremely hazardous" designation if applicable, (C) "RQ" or "reportable quantity" established under the Resources Conservation and Recovery Act, (D) reactivity, and (E) "IH" or "inhalation hazard" designation if applicable.

Information elements (C) and (E) are required by law to be incorporated into determination of a proper shipping name ("PSN") for each finished container, and the other elements are required for other purposes—typically inclusion in the paperwork that accompanies each container. I emphasize, however, that the inclusion of this information, and its use in labelling, are optional features with respect to practice of my invention.

In other words, the legal requirements for use of data elements (A) through (E) could be met by other means—such as manual selection of the PSN, or manual entry of RCRA codes etc. into the shipping papers—independent of my invention. Incorporating these functions into the procedure of my invention, however, speeds the work very significantly and I consider doing so extremely desirable.

The computer retrieves this information automatically once the material entry has been selected, so that generating the labels involves no significant effort by the system operator. Nevertheless these functions can be performed in conventional fashion, if preferred, while still retaining the great weight of the many benefits of the more-general forms of the invention.

My invention advantageously further comprises the additional step of physically placing the particular consignment in the particular container. In a preferred embodiment of my invention, when the container is a temporary depository for materials thereby made available for recycling, I also prefer to include the step of later selectively either:

removing the particular consignment from the container for recycling, and returning that consignment to active use; or disposing of that particular consignment.

Another optional, but extremely useful and valuable, additional feature which I prefer to include in the practice of my invention is directed to automatically documenting the details of each batch received from a generator of the waste materials. In accordance with this feature the procedure further comprises two additional steps.

The first of these steps is maintaining or creating a particular computerized set of batch-information fields for the particular batch mentioned in step (b). Here again, the concept of a "set of . . . information fields" is used to signify either a record, or a group of fields within a record, that represents a batch.

The second of the two additional steps is causing the found or created material entry, together with a representation of the particular quantity, to be associated with the particular set of batch-information fields, for the particular batch. This step, like the step of associating with the container record discussed earlier, is performed by preprogrammed computer substeps—i. e., automatically and without any added effort on the part of the person operating the system.

As will be recalled, my preferred approach to formatting and associating the container and material-entry information entails using a record format that has container-related fields first, and then a repeating pattern or series of material-entry fields. When this preferred format is combined with the additional batch-documentation feature discussed just above, then:

each set of container-information fields is in the form of a group of fields in a container-information record, into which one or more material entries can be inserted as before (for the "associating" function); and analogously, each set of batch-information fields is in the form of a group of fields in a batch-information record—but the association is preferably done differently, as for example by use of a "pointer".

In still another extremely useful feature which I consider highly desirable to incorporate into the practice of my invention, the material-database maintaining step (a) further comprises the substep of maintaining cost data. More specifically, this substep maintains in a computerized database sufficient information for associating with each particular material a parameter related to cost of receiving, handling, packing, storing, shipping and disposing of at least one representative quantity of that particular waste material.

To enjoy the benefits of this feature, the process further comprises the step of extending the cost, from the just-mentioned computerized database, for the given quantity of the particular material in the specific consignment. I prefer that the procedure further comprise the additional step of determining from extended costs for all material consignments in each particular batch a total cost of receiving, handling, packing, storing, shipping and disposing of that particular batch.

Naturally this added feature greatly simplifies the process of billing a generator of wastes (i. e., customer of a waste-handling service) for packing and disposal services rendered. More interesting, however, is a somewhat different use of the costing feature.

Specifically, carrying the process to the extent just described makes possible the additional step of formulating an advance price quotation for receiving, handling, packing, storing, shipping and disposing of all material consignments to be received in a particular batch, at an overall price determined from that total cost. All this can be done in a "batch mode" as previously described, without ever seeing or receiving the actual physical materials.

If the price quotation is accepted, the process can then be carried on into actually receiving, handling, packing, storing, shipping and disposing of all material consignments in the particular batch, at substantially that overall price. I prefer to incorporate both the quotation and the actual processing steps into practice of my invention, to the extent appropriate.

To initiate the batch mode, the material descriptions supplied by the prospective generator of wastes, i. e., prospective customer, can be typed by a word-processing operator or clerk-typist into a computer file. Alternatively if the descriptions are printed legibly in paperwork received from the generator of the wastes, the descriptions can be read from that paperwork into a computer file by an optical scanner.

Still another possibility is for the generator of the wastes to supply the information in computer-data form at the outset—on a computer disc, or by modem and telephone transmission, or by any other convenient means. For instance the information could be read from bar codes on the waste-material consignments.

As a more specific example, the batch-mode data could be read into a computer file from bar-coded labels such as those used in the Lawrence Livermore system discussed earlier—but with some expansion of the information carried in those codes. In any event, any of these various means of data entry can serve as the "identifying" step (b) recited above; the other steps of the procedure of my invention ape then applied to the data in the computer file.

It is especially worthy of note that if the quotation is not accepted, the amount of skilled labor expended without reward in generation of the batch quote is all but insignificant. The bidding firm is thus enabled to make a quotation without risking significant bidding cost.

Still another advantageous feature that I prefer to incorporate into practice of my invention relates to determination of a so-called "proper shipping name" or PSN. The proper shipping name is regulatorily established, and its use required, for each waste material based upon certain parameters of the material.

By virtue of my previously described selection of information elements to include in the hazardous-waste segregation, shipment and disposal profile extracted in step (f), it is possible to select a PSN based upon that profile without further processing. Actually the information needed to select a PSN is only a subset of that included in the profile.

Thus I prefer to include in the process of my invention the added step of selecting, by preprogrammed computer substeps, a proper shipping name for each specific consignment. This step preferably comprises the substeps of maintaining a computerized database of proper shipping names for each hazardous-waste segregation, shipment and disposal profile; and searching in the proper-shipping-name database for the profile extracted in step (f)—a procedure which works because the information in each profile is sufficient (actually more than sufficient) to establish the PSN.

PSN selection, somewhat serendipitously, can be associated with costing information. That is to say, I have noted that the factors determining the cost of the several waste handling steps, per net unit weight of waste material, is closely correlated with the factors determining the PSN.

Thus the material-database maintaining step (a) advantageously further comprises the substep of maintaining in the proper-shipping-name database sufficient information for associating with each proper shipping name a parameter related to overall handling cost. This parameter thus defines the cost of receiving, handling, packing, storing, shipping and disposing of at least one representative quantity of material having that proper shipping name. As before, I also prefer to incorporate the further steps of extending the cost, from the PSN database, for the given quantity of particular material; etc.

In the practice of the first aspect of my invention I also prefer that the container-field maintaining step (e) comprise the substep of including in each set of container-information fields a unique indication of the location of the corresponding particular one of the containers of the multiplicity. By virtue of this substep, hazard characteristics are associated with each container location.

It is then straightforward to cause, by preprogrammed computer substeps, printout from the computerized container-information fields—and the associated consignment records—of a tabulation of selected information corresponding to all materials stored in each container location, or in an interrelated array of the locations. Such a printout can be generated quickly whenever desired, and customized to the need at hand, for example an emergency involving some specified portion of a storage area; thus my invention also resolves the above-discussed need of firefighters or other emergency-response personnel for details about the distribution of waste characteristics within a waste-storage facility.

I have already pointed out that the labelling of hazardous wastes, preparatory to shipment and disposal, is advantageously integrated into the practice of my invention. In doing so I find it desirable to use the material entry found in step (c) or created in step (d) to print, by preprogrammed computer substeps, labels for affixing to both (1) the specific consignment and (2) the particular one container of step (g).

These labels are not only of the identification type, but also encompass certain warning labels that are required by statute, and whose appearance includes statutorily specified graphics and colors. To implement these requirements as well as those for identifying labels of an essentially textual kind, I prefer to include two further substeps in the procedure of the first aspect of my invention.

The first of these substeps is using the material entry, by preprogrammed computer operations, to synthesize a hazard-label profile for the consignment: this is different from the segregation, shipment and disposal profile already introduced, though as will be understood certain parameters are common to both. The second substep is causing, by preprogrammed computer operations responsive to the hazard-label profile, computer-controlled printing—onto a packaging instruction sheet—of designations of one or several hazard labels to be applied to a container that will receive the consignment.

These designations preferably take the form of miniature representations of the labels themselves, showing actual shape and major wording. Technicians can then very readily select (and apply to the container) the actual preprinted, larger, colored labels that match the miniature representations on the instruction sheet.

I emphasize that the actual hazard labels under discussion here are large and of a conspicuous graphical type, with distinctive shapes and bright colors. Recognition of these graphics and colors is part of modern job training for not only hazardous-waste managers but also transportation personnel (truck drivers, rail-freight and air-freight handlers, etc.) as well as firefighters and other emergency-response personnel.

Accordingly my invention, in facilitating reliable selection and application of the proper labels, does not merely facilitate statutory compliance—and is far from some sort of dry academic exercise. Rather, it constitutes a significant additional contribution to averting physical dangers that are inherent in moving hazardous wastes to their proper disposal sites.

As previously mentioned, the first alternative portion of the editing-or-creating step (d) can include manual revision of the material entry, if an entry found in step (c) does not precisely match the given consignment. When this is done after association of the material entry with a particular container (i. e., with sets of container-information fields for a particular container), I prefer to include in the programmed computer substeps an automatic procedure of validating that at least some information elements of the changed entry remain compatible with the hazard profile of the particular container record.

This automatically-validating step, preferably performed without being called by the operator, comprises automatically checking at least (1) the manually entered physical-state characterization, (2) certain manually entered parameters related to facility acceptance, and (3) the manually entered organic/inorganic categorization—i. e., an indication whether the material is organic or inorganic. If a discrepancy is found, the program alerts the operator and requires correction: either entry of new information elements, or association with a different container.

In practice of this first aspect of my invention, still other features are advantageously included to maximize the enjoyment of the benefits of the invention—and to further avert the physical dangers that arise in storage, handling and disposal of hazardous waste.

Many types of materials are considered to pose gradually increasing levels of hazard in the course of protracted storage. Accordingly the regulatory schemes now in force strictly limit the duration of temporary storage, particularly storage near workers, for different kinds of facilities. Such limitations often take the form of recitation of specific durations in the operating permits of waste-generating facilities and temporary waste-storage yards, etc.

To facilitate compliance, and specifically to aid in averting the physical dangers that have been considered in formulating such limitations, I prefer that the container-field-set creating step (h) comprise automatic entry into the new record, by preprogrammed computer steps, of the date on which the container-field-set creating step is performed.

I further prefer that the overall procedure comprise the subsequent step of periodically generating, by preprogrammed computer steps comparing the container-field-set-creating date with a current date, a printout of selected information related to all containers open for longer than a selected threshold period. That threshold period (and the periodicity of the printout-generating step) naturally can be selected in some logical relationship to the regulatorily established permit period—allowing personnel some time to effect removal of the materials.

Thus in case of a ninety-day permit, a forty-five-day list may be generated weekly; in case of a one-year permit, a ten-month list may be generated monthly; and so forth. As will appear, this part of the process is subject to a variety of practical variations for different types of facilities and different types of permits.

In best practice of my invention I also prefer that the material-database maintaining step (a) comprises constructing each entry with hazard parameters that include substantially only what is necessary for synthesizing the hazardous-waste segregation, shipment and disposal profile of the corresponding hazardous waste material. While, as a practical matter, this limitation may be somewhat difficult to observe strictly, I nevertheless consider it a worthwhile consideration to include at least as a goal—so as to minimize the size of the materials database and hence the time required for searching and related computer functions.

As previously explained, this first aspect of my invention is amenable to practice in either an on-line mode or a batch mode. I prefer that the specific sequence of some steps be varied in dependence upon the mode selected. In the on-line mode the sequence is this:

(1) for one particular specific consignment in the batch, a data-entry function is performed that comprises the identifying step (b);

(2) then for that same particular specific consignment, and substantially before repeating the data-entry function for any other consignment, a data-processing function is performed comprising the searching step (c), material-entry editing or creating step (d), profile-extracting step (f), container-set-finding step (g), new-container-set-creating step (h), and the entry-association-causing step (i);

(3) then, before performing the data-processing function with respect to any other specific consignment, the data-entry function is repeated with respect to the next specific consignment, if any, in the batch.

In the batch mode, by contrast—when all the specific consignments in the particular batch, of step (b), can all be identified substantially at once—the sequence is preferably this:

(1) for all specific consignments in the batch, first a data-entry function is performed that comprises repetitively executing the identifying step (b), the searching step (c), material-entry editing or creating step (d), for all of the consignments substantially before executing any of steps (g) through (i);

(2) then after completing the data-entry function for all of the consignments, a data-processing function is performed that comprises, for all the consignments, repetitively at least the container-set-finding step (g), container-set-creating step (h) and entry-association-causing step (i).

I prefer to make step (f) part of group (1); it may be in either. Once again the identifying step (b) is advantageously performed by receiving the list in data-processable form on a computer disc, or by automatic optical scanning of a pretyped bill of lading, or by telephonic data transmission, or like automatic means. Although the data-processing function (2) includes repetitive execution of steps (f) through (i), I prefer to program the computer so that the entire sequence including all the repetitions is performed in response to substantially a single instruction—e. g., one keystroke—to the computer system.

Next I shall discuss a second major aspect of my invention. As mentioned earlier, I prefer to integrate both major aspects together in a single procedure; however, certain elements of the two aspects have independent advantages and accordingly may be enjoyed separately.

In its second major aspect, my invention is a process for segregation, shipment, and disposal of hazardous waste. The process comprises these steps:

making relatively very costly professional-level judgments about several hazard parameters of each one of a large number of hazardous waste materials, to establish each of the hazard parameters;

for each of the large number of hazardous waste materials, collecting in a computerized database all the hazard parameters as established on the basis of the relatively very costly professional-level judgments;

subsequently identifying a large number of specific consignments of particular hazardous waste materials—the shipment or disposal of at least many of the particular materials in the specific consignments being statutorily designated or scientifically recognized, or both, as posing a significant physical danger to people, wildlife or the environment; whereby relatively very costly professional-level judgments are required to avert the significant physical danger for at least many of the specific consignments;

generally very inexpensively classifying each material consignment by reference to the computerized database of hazard materials, generally without making new relatively very costly professional-level judgments;

each consignment of each material being classified, in the classifying step, substantially consistently with all other consignments of like material and in accordance with professional-level judgments embodied in the database, notwithstanding general absence of new professional-level judgments in the classifying step; and substantially automatically establishing subsequent routing and handling for substantially each of the large number of consignments, on the basis of the classifying step, to generally very inexpensively avert the physical danger.

This enumeration of steps may constitute a definition or description of the second major aspect of my invention its most broad or general form. As with the first aspect, one can appreciate that even in this broadest or most general form this second aspect of my invention resolves the most crucial of the failings of the prior art, as discussed in the "PRIOR ART" section of this document.

In some sense this second aspect of my invention, rather than focusing on the possibility of extracting a "profile" as in the first aspect, centers more emphatically upon the function of investing just once in the generation of high-level professional judgments for each material, and then—so to speak—"freezing" those judgments for repetitive reuse. That reuse can be performed by competent people at an operational, rather than professional, level—e. g., technicians.

Since I have already pointed out that the two major aspects of my invention are preferably practiced in conjunction with each other, it will be understood that for each material, the hazard parameters considered together preferably include sufficient information for extracting a hazardous-waste segregation, shipment and disposal profile of that material.

Similarly the judgment-making step advantageously comprises the substep of including within the information for each hazardous waste material at least the same four primary information elements (A) through (D) enumerated earlier. In the subsequent classifying step the profile is preferably synthesized substantially by computerized automatic combination of at least those four elements; etc.

The judgment-making step preferably comprises consideration of each of the parameters by graduate and advanced-degree chemists having at least significant experience in hazardous-waste management. In this step, the chemists preferably have resort to at least two kinds of information source.

The first of these kinds includes substantially conventional reference materials relating to (1) physical characteristics, reactivity and compatibility of different chemicals, (2) regulatory requirements for segregation, shipping, storage and disposal of different chemicals and chemical classes, and (3) scope of permits issued to, and other factors controlling acceptance of different chemicals by, actually available disposal facilities.

The second kind of information source includes, at least from time to time, actual testing of chemical phenomena relating to some of the materials. Thus the judgment-making step is not greatly dissimilar to the process which, in the prior art manual processing, is carried out on an ad hoc basis for each consignment of material.

The prior-art process, however, is characterized, as already pointed out, by endless repetition of the same professional judgments over and over. Here each professional-level judgment is to be made, for each material, just once.

The classifying step preferably comprises generally routine classification of each material consignment by nonprofessional-level personnel. By this I mean personnel generally having no more than high-school-level knowledge of chemistry and without any experience requirement.

For ideal practice of my invention, the types of hazardous waste materials received in the classifying step are substantially not restricted in any way, and in particular are not restricted to materials for which hazard parameters are pretabulated in the computerized database. Yet for at least almost all the material consignments, the nonprofessional-level personnel preferably complete the classification based on the computer database substantially exclusively.

In event of a first receipt of a material not initially tabulated in the computerized database, the second major aspect of my invention preferably includes the additional steps of:

making new professional-level judgments about several hazard parameters of the untabulated material, to establish each of the hazard parameters for the untabulated material; and substantially automatically establishing and effectuating subsequent routing for the first receipt, on the basis of the new professional-level judgments.

The first of these two additional steps naturally is performed by the professional-level personnel, and the second by the operational personnel. Hence, as an integral part of my preferred procedure, the professional steps in only occasionally and only briefly—only as needed to deal with materials not previously considered.

At the same time, however, these new professional efforts are preferably used to expand the set of preestablished, "frozen" judgments. Thus preferably my procedure comprises two other additional steps:

for the initially untabulated material, adding to the computerized database the hazard parameters as established on the basis of the new professional-level judgments; and later using the added parameters to similarly substantially automatically classify any later received consignment of the initially untabulated material substantially consistently with the first receipt, and in accordance with professional-level judgments—notwithstanding general absence of new professional-level judgments in the later received consignment.

As can now be appreciated, my invention, considered on an overall operating basis, thus has a certain heuristic character. The hazardous-materials database progressively improves in comprehensiveness, especially as to materials that are encountered infrequently.

To enhance this beneficial effect, I prefer to arrange for exchange of information among different sites, customers, etc.—at least within a common geopolitical area where regulatory requirements are essentially uniform. I have found it convenient and effective to exchange such information by means of centralized accumulation of database modifications.

All of the foregoing operational principles and advantages of the present invention will be more fully appreciated upon consideration of the following detailed description, with reference to the appended drawings, of which:

Figure 1:
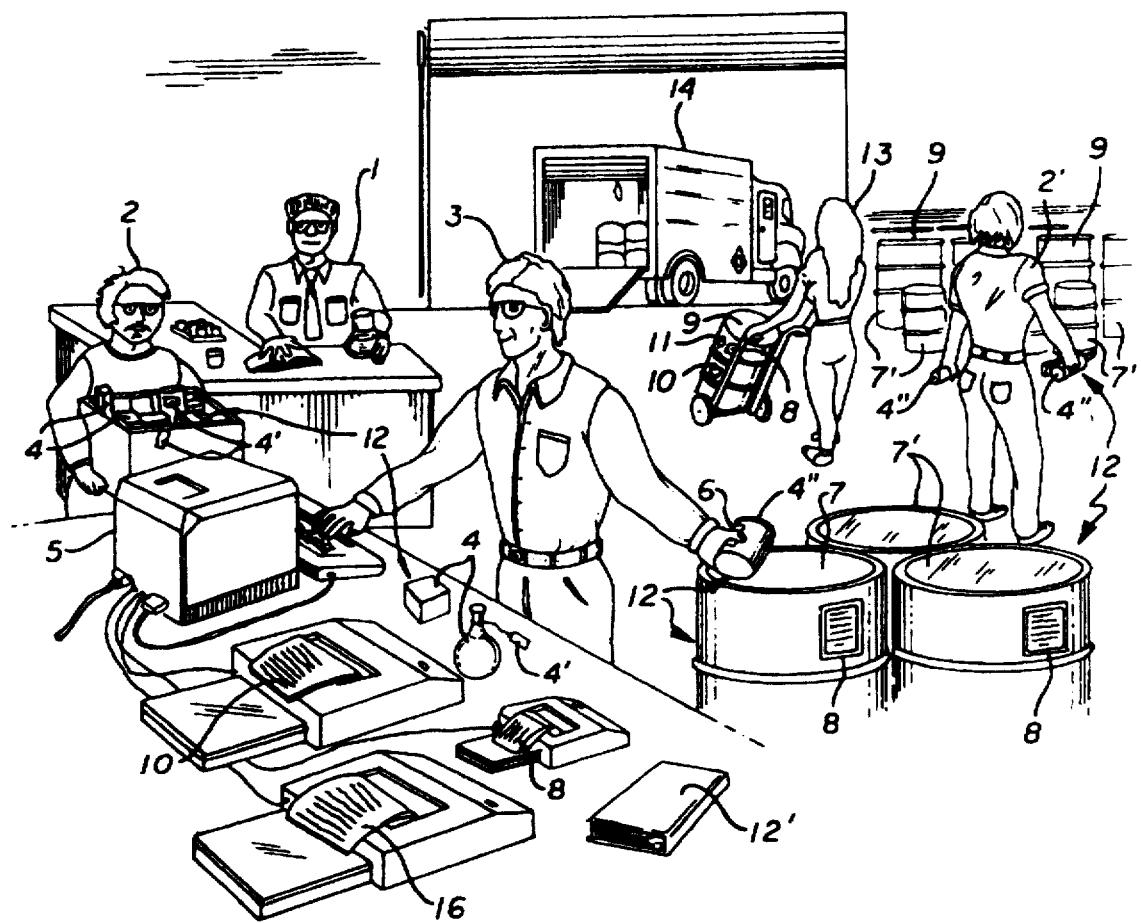
FIG. 1 is a pictorial representation of operation in on-line mode—which in the remainder of this document will generally be called "serial mode".

Notation has been selected to highlight the relationships between the master diagram of FIG. 5 and the detail diagrams of FIGS. 6, as follows. Each bubble used to represent a function in FIG. 5 has a reference numeral in the format of an integral number of hundreds—i. e., 100, 200, 300 and 400; and the next-level detail diagrams have reference numerals within the corresponding number series but formatted as integral numbers of tens.

Figure 5:
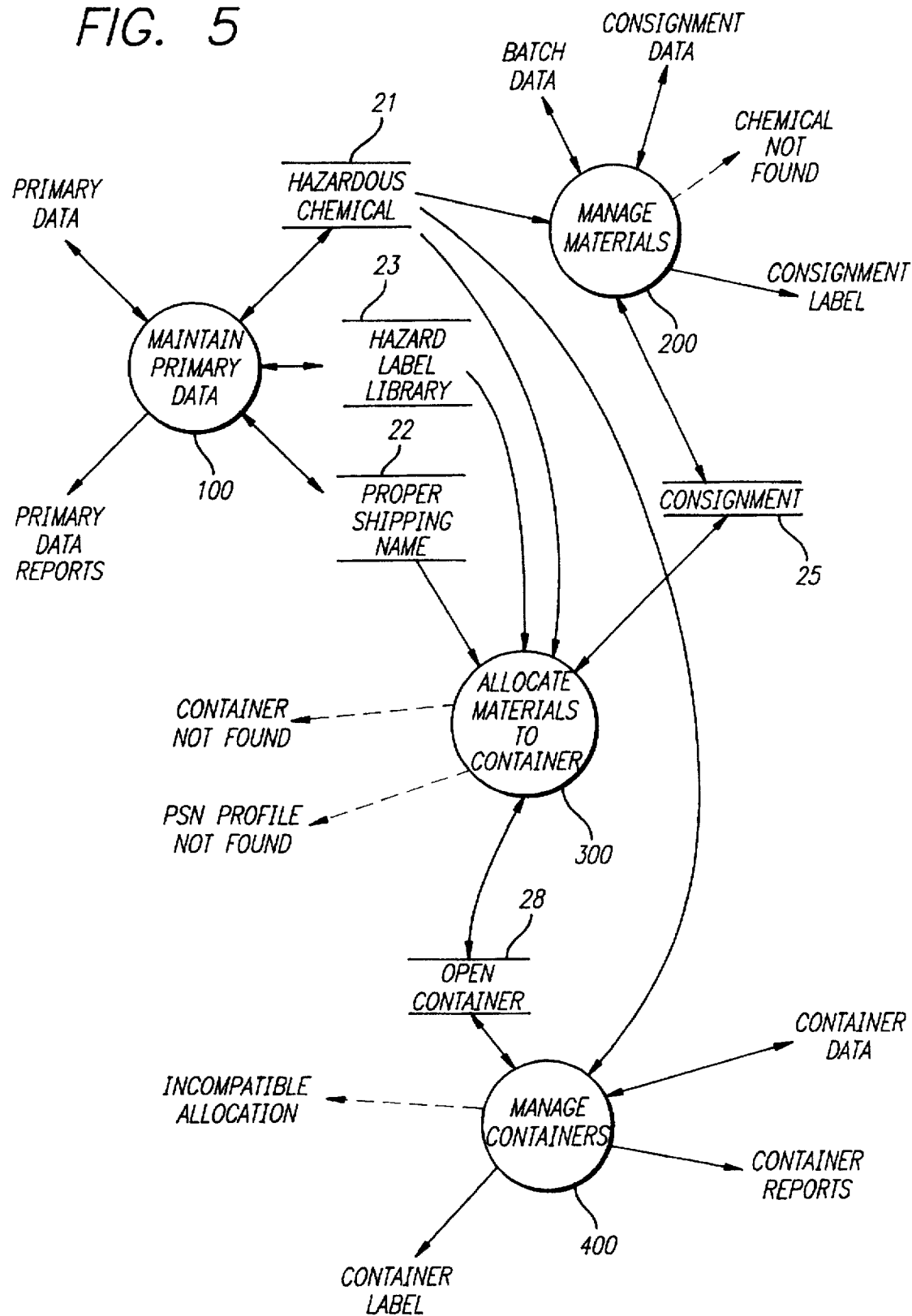
FIG. 5 is a master data-flow diagram for the serial mode, showing the dependencies of various data upon one another and illustrating the automatic data conversions performed by the preferred embodiments of my invention. Although the notation used in this diagram is self explanatory, particularly with aid of the accompanying narratives, clarification may be found in the same work noted above.

For instance the "manage materials" function 200 of FIG. 5 is detailed in FIG. 6 using functions 210, 220, . . . , 250. (Thus FIG. 6b might be titled "manage materials".) Further expansion to a level of greater detail is available by fine-detail elements formatted in units, e. g. numbered 221, 222, . . . .

FIG. 7a through 7i are representative printouts generated by the preferred embodiments of my invention. Throughout these illustrations, the term "drum" refers to a container, i. e., one of the larger outbound containers that contains one or more consignments. More specifically the printouts are:

FIG. 7a a container inventory,

FIG. 7b a hazardous-waste label for the outgoing container,

FIG. 7c two representative consignment labels,

FIG. 7d a list of open containers,

FIG. 7e a list of containers that have been open for longer than a specified period, FIG. 7f a list of closed containers, FIG. 7g a batch list or "materials packing list", FIG. 7h a summary of shipped containers, and FIG. 7i a manifest summary showing total item weight in a shipment sorted by PSN.

FIG. 8 is a representative computer-screen display of a container storage area, and showing location and number of a particular container to which a consignment is being allocated.

FIG. 9 is a representative printout, in rough schematic form, of a printout of hazards within a temporary storage facility, organized by area within the facility—and informally denominated "doghouse hazard distribution"—for reference use by emergency-response personnel.

Figure 10:
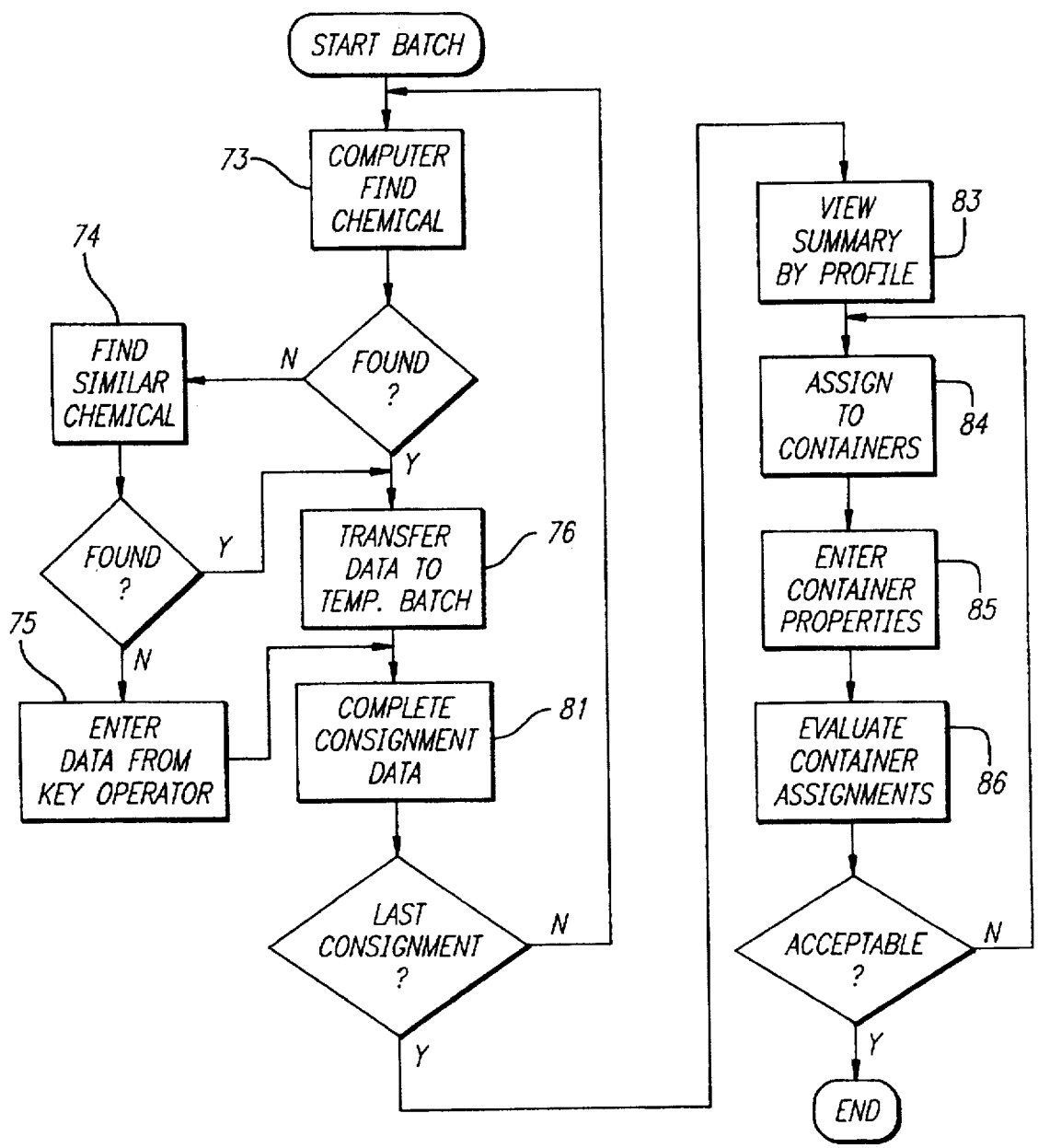

FIG. 10 are segments of a flow chart of batch-mode operation.

Figure 11:
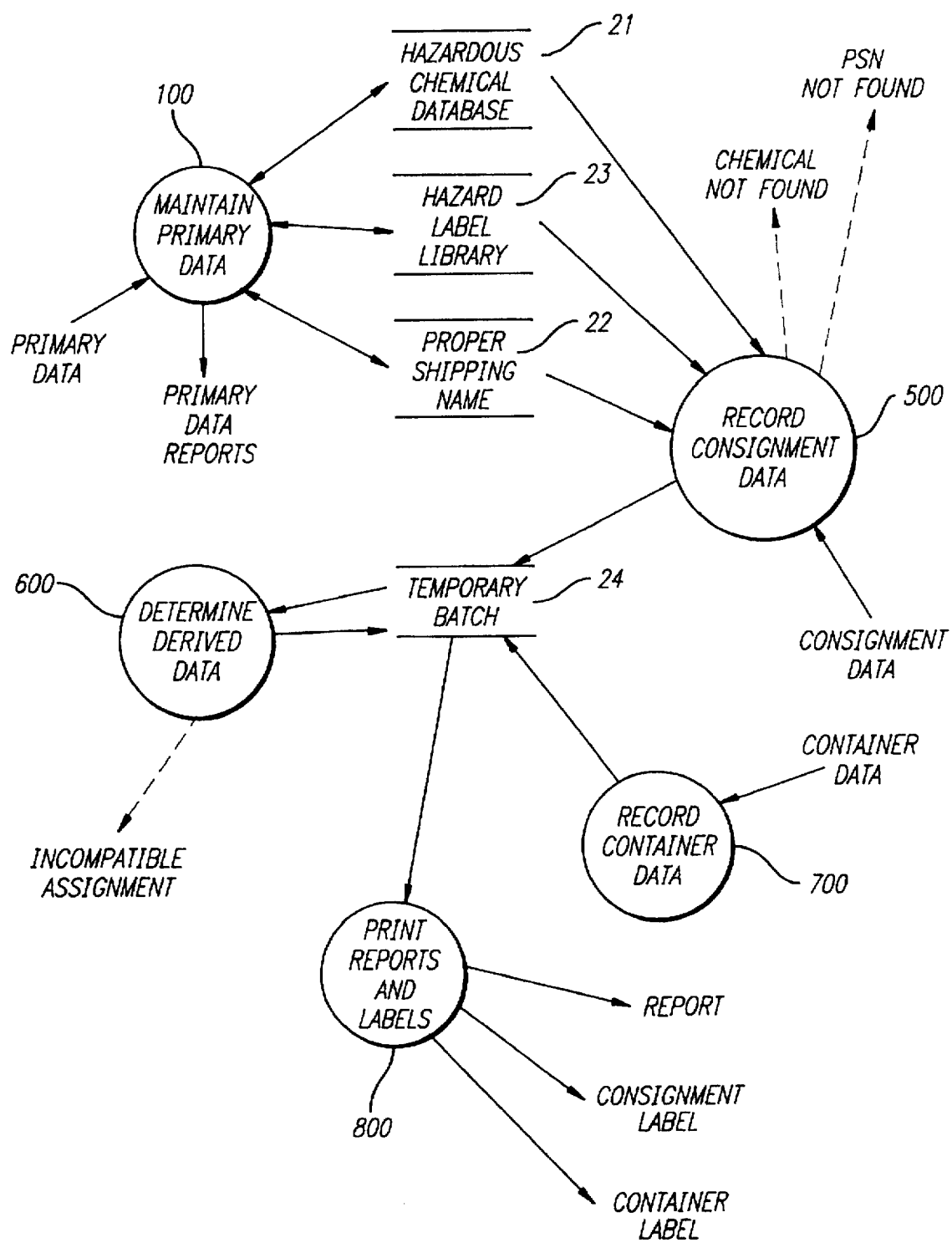
Figure 12A:
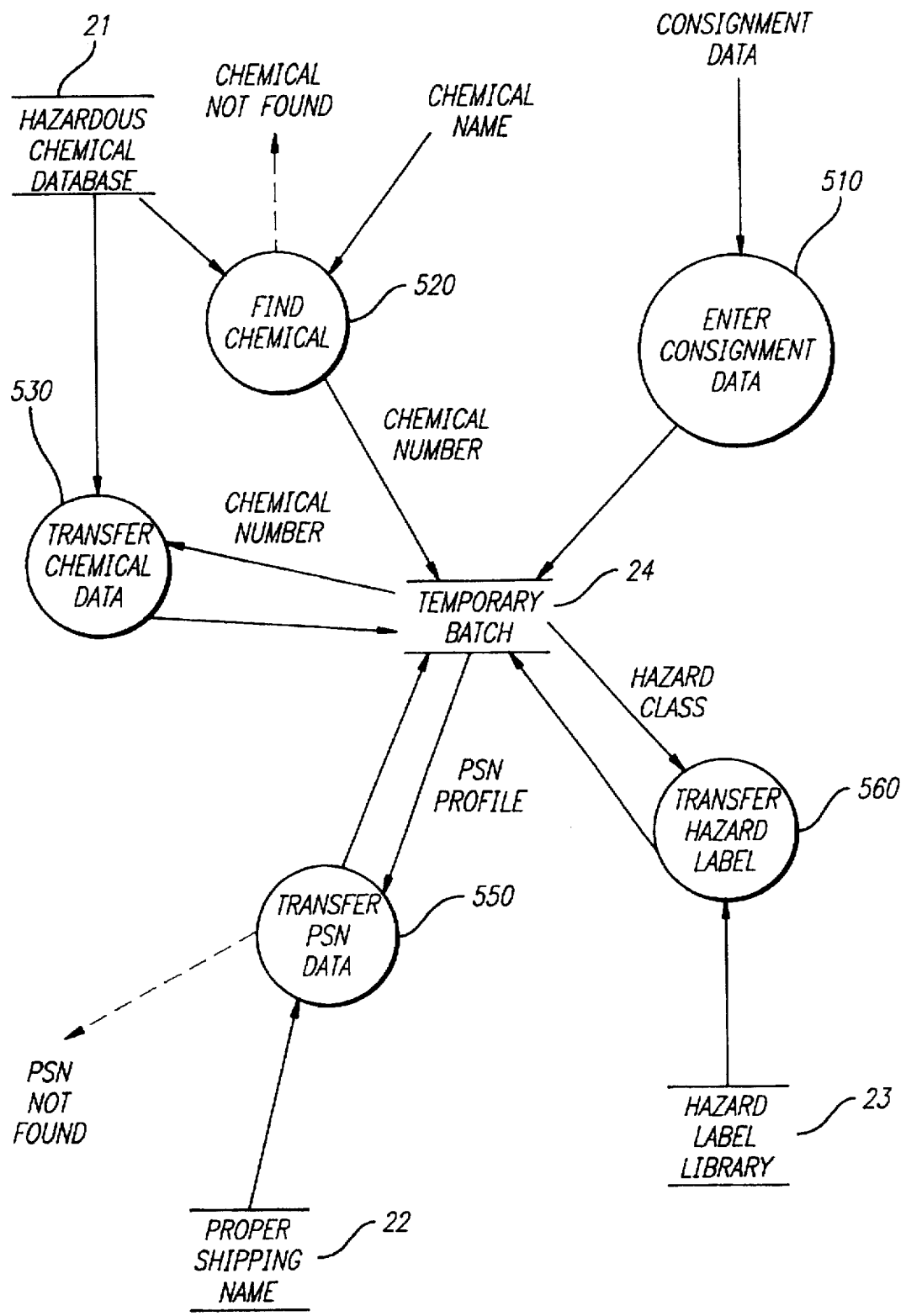
Figure 12B:
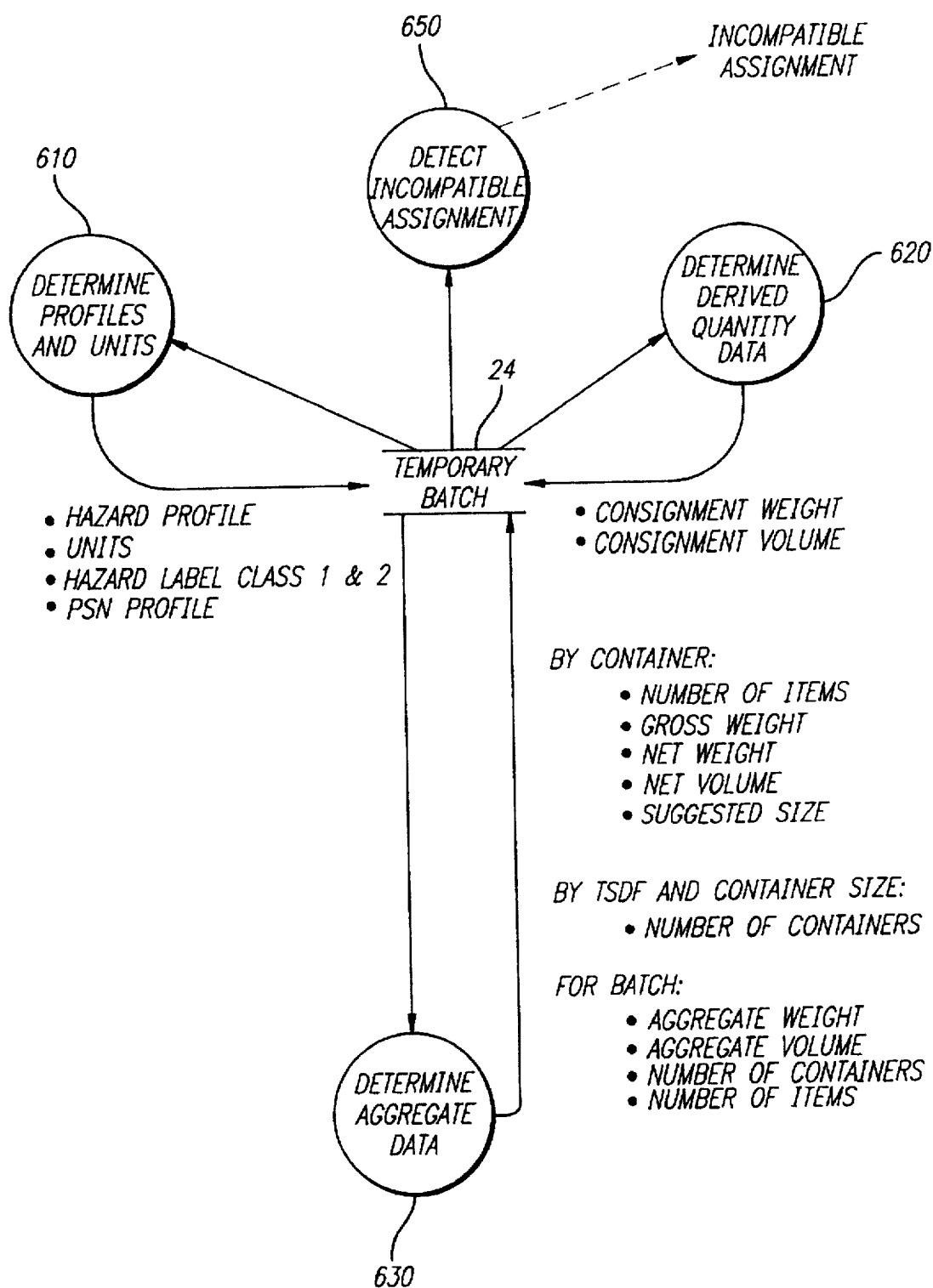
Figure 12C:
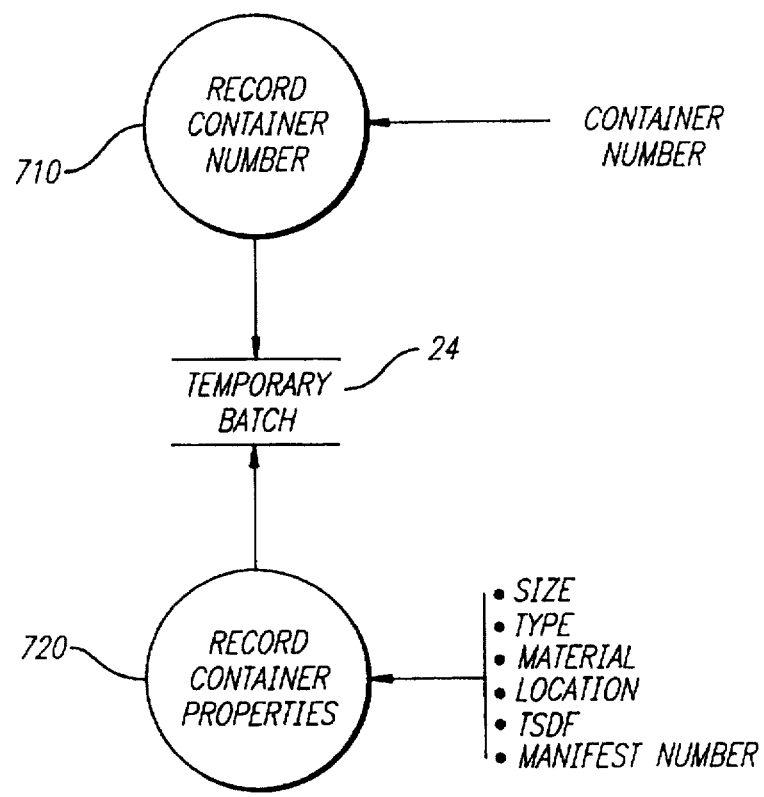
Figure 12D:
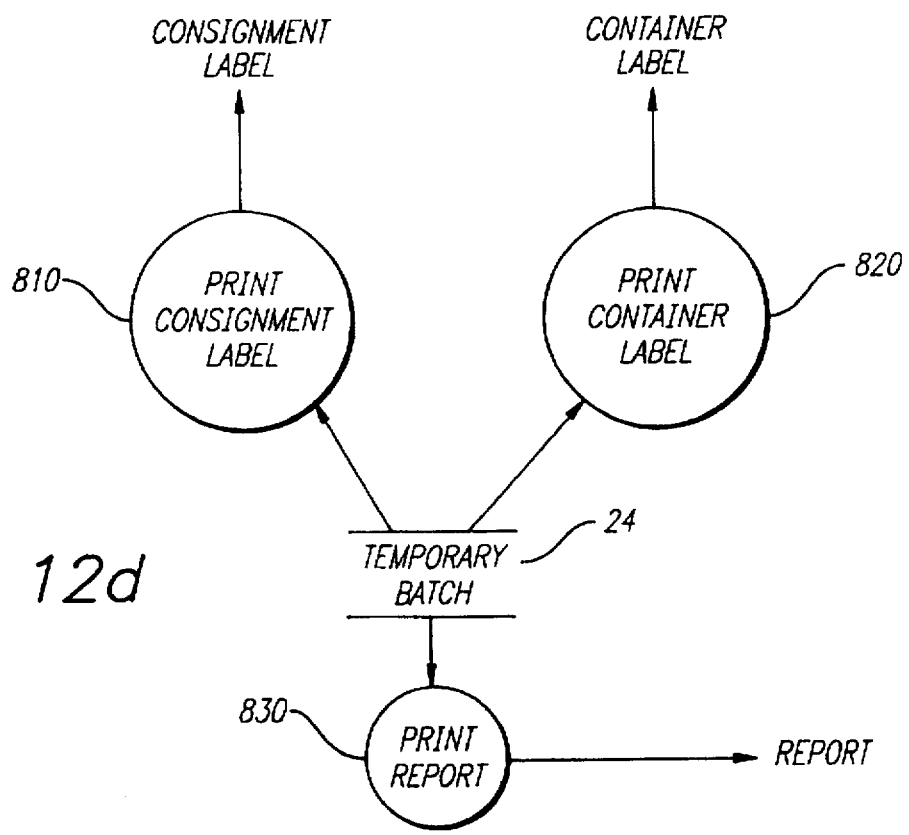

FIG. 11 is a master data-flow diagram analogous to FIG. 5, but representing the batch mode.

FIGS. 12a through 12d are detailed data-flow diagrams for the batch mode, analogous to the detail diagrams in FIGS. 6.

To facilitate correlation of the drawings with each other I have used a single reference number respectively for each component of the system, wherever it appears in the drawings.

In addition, the microfiche appendix includes these reference materials:

complete source code of the principal software written specifically for purposes of my invention, complete listings of all macros and scripts written specifically for purposes of my invention, complete pictorial representations of all screen layouts which in effect form (in the graphical-interface system used to implement my preferred embodiment) part of the source code, a listing of the entire PSN database contents at the time of this writing, and a representative first twenty pages of a present listing of the hazardous-chemical database contents.

As will be understood, I have no knowledge of the underlying code of the commercial programming or macro languages, or database systems, in which the software of my invention was written; accordingly that information is not presented in the appendix. Executable code, however, is available for purchase from producers of those languages or database systems as detailed below, so that any skilled person wishing to practice my invention can obtain that code by purchase on the open market.

DETAILED DESCRIPTION OF THE PREFERRED EMBODIMENTS

After reading this document, those skilled in the art will recognize that my invention is amenable to many possible embodiments and extensions, some of which will come to mind. To facilitate understanding, however, I shall describe in detail the specific embodiments I prefer.

These preferred embodiments are commercially practiced using a computer program which I have written and which is entitled "PackIT"—a trademark of International Technology Corporation. For ease of reference I shall hereinafter refer to this program as "the software of my invention" or sometimes just "the software".

1. Necessary Elements for Operation

Preferred embodiments of my invention are practiced by using a preferred combination of computer hardware, commercial computer software, and the above-mentioned software of my invention. The preferred embodiments require these hardware elements (all, unless otherwise stated, manufactured by Apple Computer, Inc., of Cupertino, Calif.) or equivalents:

Macintosh IIci computer, with extended keyboard and four megabytes of RAM and mouse;

hard disk, ten-megabyte or larger;

Fast Cache IIci cache accelerator card, manufactured by DayStar Digital, Inc., 5556 Atlanta Highway, Flowery Branch, Ga. 30542;

Image Writer printer, to print container labels;

DeskWriter printer, manufactured by Hewlett Packard Corporation of Palo Alto, Calif. (or LaserWriter printer, of Apple Computer, Inc.), to print packing lists, etc.; and CoStar label printer, marketed by CoStar Corp, 22 Bridge Street, Greenwich, Conn. 06830, to print individual package labels.

The preferred embodiments require the following commercial software elements.

FileMaker II, version 1.1v2, a product of Claris Corporation, 5201 Patrick Henry Drive, Santa Clara, Calif., is the primary commercial software employed for the serial mode of my invention.

Filemaker Pro, a successor product, is employed for the batch operating mode to take advantage of certain features not available in Filemaker II, and in principle could be used for both modes—but, because it is slower than Filemaker II, my recommendation is to use the latter for the serial mode.

Icon-It!, a product of Tactic Software, 11925 S. W. 128 Street, Miami, Fla. 33186, is used to generate certain special icons and to enable their use in a way analogous to the use of standard Macintosh and Filemaker icons.

Tempo II Plus and Tempo II+Tools, products of Affinity Microsystems, Ltd., 1050 Walnut Street, suite 425, Boulder, Colo. 80302, are macro programmers used to generate a complex sequence of mouse movements and keystrokes in response to a single preprogrammed-key command or to an icon selection through Iconit!. Such command sequences are an important part of the computer instructions of my preferred embodiment.

QuicKeys, a product of CE Software, Inc., Box 65580, West Des Moines, Iowa 50265, is another macro programmer, similar to Tempo II. It is used for the "print label and find packing sheet" macro (assigned to extended-keyboard function key F11) and other macros it calls—one or more of which require a command function that is not available in Tempo II.

MultiClip, a product of Olduvai Corporation, 7520 Red Road, suite A, South Miami, Fla. 33143, permits use of multiple clipboards for cut-and-paste operations. Such multiple clipboards are utilized in certain macro command strings, most notably the F11 macro mentioned just above.

INITPicker 2.0, a product of Microseeds Publishing, 7030-73 West Hillsborough Avenue, Tampa, Fla. 33634, controls the initialization sequence of the several software programs which are automatically loaded at startup.

(As will be familiar to those skilled in the art, when many complex programs are loaded together into the Macintosh computer, it is often necessary to fine-tune the initialization sequence to make them compatible. My invention is likely to require such routine trial-and-error tuning, whose precise nature will depend on the complete set of software applications which are included and perhaps on their version numbers, as well as the manufacturers' hardware variants.)

LabelWriter II+Software, also a product of CoStar Corp. (see above), is used to print individual package labels.

In addition, for operator convenience, file safety, fast response and convenient operation, a full-color monitor and this software are recommended:

Kolor, by Russ Wetmore, copyright 1989 by Apple Computer, Inc., and distributed free, generates color displays;

Adobe Type Manager and individual fonts particularly including Zapf Dingbat (as well as the more common Helvetica, Bookman, etc.), products of Adobe Systems Inc., speed printing and enhance type quality;

FastBack II, a product of Fifth Generation Syustems, Inc., Baton Rouge, La., permits convenient, regular hard-disk back up;

Multidisk, a product of AlSoft, Inc., permits hard-disk partitioning to isolate other applications on the machine from the software used in practice of my invention;

Excel, a product of Microsoft Corporation, permits analysis, display and printing of statistical data produced by my invention, including bar charts and other graphical presentations;

Disk Express, also a product of AlSoft, permits occasional optimization of the hard disk, including defragmentation, to maintain system operating speed;

Superlaser Spool, a product of Super Mac Technology, is a print spooler, to permit system utilization even during report printout;

Super Boomerang, a product of Now Software, Inc., 520 Southwest Harrison, suite 435, Portland, Oreg. 97201, is a file organizer;

SAM II, a product of Symantec Corporation, provides anti-virus protection; and

SUM II, also a product of Symantec, is a utility permitting disk repair and reclamation of lost files in some cases.

2. General Operation of the System

Before use in regular operations the system must be prepared by loading these primary data into the computer:

hazardous-chemicals database—name, description, and characteristics of known chemicals which may be encountered as waste;

proper-shipping-name database—the proper shipping name (PSN), together with important characteristics common to chemicals so classified, and data on conventionally-employed ways of handling such chemicals; and hazard-label library—pictorial representations of warning labels mandated for chemicals presenting certain specific hazards, together with identifying information.

(The PSN is a label designation which satisfies various government regulations controlling the identification of hazardous materials on shipping containers and manifests.)

All these primary data are generally entered by or under the supervision of a professional waste-management chemist, hereinafter referred to as a "key operator"—with considerably higher qualifications than the persons, hereinafter "operators", who employ the system in regular operations. Each site, such as the FIG. 1 serial-mode site, where my invention is employed generally requires the availability of one qualified key operator 1 to maintain the primary data, and to oversee the regular operators 3 and crew 2, 2', and deal with exceptional situations which may arise from time to time.

Once the regular operators have acquired a few weeks' experience, the key operator's participation is required only intermittently. For some purposes that function may be provided remotely, as for example by telephone, possibly aided by video link—though the key operator, in the process, may call upon an on-site operator to make certain specific observations or perform routine simple chemical tests.

Once the system and the personnel are thus placed in readiness, regular operation can begin. That process starts with the existence of a batch 12 of one or more various waste materials accumulated by a single generator. A generator may be, for example, a particular laboratory in a research facility or a particular manufacturing operation in an industrial facility.

The batch ordinarily is an aggregation of separate items or consignments, each most often (but not always) in one or more respective packages 4. Each consignment satisfies the following rules, which define the meaning of the term "consignment" in this document:

a consignment includes only one material, but this may be a solution or mixture of more than one chemical; and a consignment may include multiple packages or small containers, pieces etc., but each such package, container or piece must contain the same quantity of the material.

Often, or nearly always, at least an informal label 4' or the like attached to or associated with each consignment 4 identifies the waste material of that consignment. In addition the batch is usually documented by the generator, on a formal or informal paper form 12' which I shall call the "input itemization". (This title distinguishes it from another tabulation of the same items, prepared by my system in the course of operation as will be described shortly.)

At the beginning of the procedure the batch of consignments is not always physically presented to the operators, and in fact as will be seen is usually not even collected together in one place. The generator either— delivers the batch itself to the operators, usually piecemeal (in what I call the "serial mode" or "on-line mode" of operation), or provides to the operators a list, in any of several forms as mentioned earlier, of the consignments in the batch (in what I call the "batch mode").

With the batch itself thus arriving, or a batch listing thus at hand, the regular operator enters data and instructions on the computer keyboard and receives information and advice from the computer, in the form of cathode-ray-tube displays and of printed reports. Particularly important among these printouts are two types of labels, plus instructions to the operator specifying what hazard labels are to be affixed.

Serial-Mode Operations—I shall use the phrase "serial operator" both to mean collectively the people responsible for identification, packing, and shipment of hazardous waste materials generated at a particular site or sites—and more particularly to mean the regular operator 3 who exercises this line responsibility directly. Thus for various purposes, as will be clear from context, the key operator 1 and other crew members 2, 2' may or may not be regarded as part of the "serial operator".

As seen in FIG. 1, a serial operator 3 generally receives or gathers waste materials 12 from their sources by some suitable collection means 2. When received the materials are usually in diverse physical packages 4—which as illustrated usually move into and out of a staging area in a generally continuing manner.

Thus in particular the consignments usually are never all in the staging area at the same time, at least until the serial operation is complete. The serial operator 3, 2' accordingly deals with each consignment essentially to completion before moving on to the next. As illustrated, however, there is generally some slight lag or overlap in physical handling—i. e., moving materials into and out of the area.

Using the computer system 5 of my invention, the serial operator 3 identifies and classifies the materials, and affixes to each consignment (package or small group of 1packages) 4, 4' a suitable identifying label 6. As suggested in the illustration, the key operator 1 is always available in the background to deal with the progressively more rare occasions requiring resort to reference materials, chemical tests and professional-level judgment.

The serial operator 3 also allocates each package 4' to a suitable open shipping container 7 selected from a multiplicity of containers 7'. If no such suitable container 7 is open, the serial operator formally "opens" (or, figuratively speaking, "creates") an appropriate empty container 7.

In either event, the operator 3, 2' also places the consignments 4' into the containers 7, 7' physically. Typically and as suggested in the drawing the containers 7, 7' are relatively large drums, ranging from five to fifty-five gallons in capacity. As will be seen, however, my invention contemplates a more-general category of "containers".

The serial operator keeps track of consignments placed in each container, by directly associating the material entry for each consignment with a corresponding open-container computer record. In the process the serial operator may revise the entry by entering the number of packages or separate pieces in the consignment, and the quantity per package or piece, as mentioned earlier.

All the open-container records are accumulated in an open-container computer file. Eventually the serial operator declares each container "closed" and causes it to be sealed.

The serial operator also affixes to each closed container 9 a container shipping label 8 and packing list 10, and one or more hazard labels 11 if required. The shipping label and packing list, and instructions for affixing the hazard labels that may be needed, are all generated automatically by the computer system, from the information already assembled.

Usually the closed containers 9 are then stored for a time (typically one to three weeks). This delay allows for the shipping paperwork to be submitted for acceptance by one or more appropriate transfer, storage and disposal facilities (TSDF), among such facilities licensed to perform or arrange final disposal of the materials.

After that clearance has been obtained, the closed containers 9 are transported by suitable means 13, 14 to the TSDF. Thus typically while one batch 12 is being processed a crew member 13 may be removing closed containers 9 of one or more batches processed by operators 1, 2, 2', 3 on an earlier day.

Batch-Mode Operations—As said earlier, substantially all the same operations are performed in batch mode as in serial mode, but with some variations that are primarily internal to the computer system, and in a different sequence. Here as before the batch operator begins by finding in the hazardous-chemical database the material of the first consignment—but that material is usually identified from the generator-provided list, rather than by looking at the physical consignment.

Also as before the operator may modify the entry by entering the number of separate packages in the consignment, and the quantity per package, if multiple-package entries appear in the generator's list. In this case, however, the operator does not associate that material entry with a container record in an open-containers file, but rather with a different kind of computer file: a temporary batch file.

As mentioned above, sometimes the generator has already collected the materials together at a single staging area, but sometimes the generator intends to leave this step to be performed later by the operators. In the latter case the generator's list generally and preferably indicates to the batch operator where to find the consignment in the generator's facility—e. g., which building and laboratory, etc.

The operator accordingly uses that information to fill in corresponding fields (titled "division" and "location") in the temporary batch file. The operator repeats the lookup, edit and cumulation steps for each consignment in turn, until the entire batch is represented in the temporary batch file.

Next the batch operator instructs the computer to sort all the accumulated temporary-batch-file entries by hazard profile, and then to print out the resulting tabulation as a container inventory. This listing is without container identification numbers, but does contain computer-generated suggestions as to the container size and number of containers that could be used.

The operator studies each consignment and each group of consignments in this rearranged listing to determine whether the computer-suggested packaging represents the best practical allocation of the consignments into the containers. At this point the operator applies practical experience in deciding whether to override the simple arithmetical assignments or accept them.

For example it may be that a three-ounce consignment of a relatively innocuous material is the only thing tentatively allocated to a five-gallon shipping container (the smallest size). The operator considers whether greater economy and efficiency might be achieved by consolidating that consignment in a container that contains highly dangerous wastes whose shipment and disposal are very expensive. My software might be expanded to supply greater guidance in such situations, but doing so may not be cost effective as the operator can make such decisions easily and quickly.

In any event the operator works out the container assignments, allowing for overfills and underfills, and entering drum numbers into the computer to complete the sorted file. Next the operator instructs the computer to print out the sorted file with the inserted container numbers—i. e., a set of container packing sheets.

This printout can be used as the basis for a cost quotation to the generator. To that end my invention contemplates incorporation of cost information as well, and extension and totalling to further facilitate the bid process.

In some cases, however, the batch mode of operation is used merely for convenience and not for the purpose of preestablishing a bid. In particular, the batch mode offers generators a particularly convenient way of seeing to collection of wastes from a great variety of the generator's laboratories, etc., for disposal.

More specifically, the generator may receive disposal requisitions from operators of the many different labs. The generator may require laboratory operators to supply in such requisitions all the information needed for the generator's input to the batch system of my invention.

Using such requisitions the generator can very easily—indeed automatically, with relatively little added preparation—assemble the necessary input list. Providing this list to a service firm then is the only further step needed to arrange for specially trained disposal personnel of the service firm to physically visit all the different laboratories and so collect all of the hazardous wastes.

In such a case, then, preparation of a bid may not be necessary. The batch operator can proceed, whenever convenient, to complete the process.

Whether deferred until a bid is presented (and accepted) or not, the remainder of the batch process includes printing the container labels, and taking the labels and preprinted container packing sheets to a staging area—usually at the generator's facility. The remainder of the process also entails visiting all the individual subsites if necessary to pick up all the consignments and move them to the staging area, placing the consignments into the containers, and affixing the shipping labels and packing sheets to their respective containers.

Another part of the overall batch process is printing and affixing of small individual labels (sometimes familiarly called "bottle labels") to the individual consignments, respectively. This part of the process has been saved for presentation now because there are three different logical points in the process for printing of the consignment labels:

one at a time, when each individual consignment is found in the hazardous-chemical database and the corresponding material entry is copied into the temporary batch file;

as a batch, at the time the tabulation sorted by hazard profile is printed for use in container assignments—or at the immediate next step, when the packing sheets are printed; and as a batch, at the time the container shipping labels are printed.

If the batch process is used for bidding purposes the operator will usually prefer to print the consignment labels at this last-mentioned time. If the labels are printed earlier than that, they may themselves become waste if the bid is rejected.

Otherwise the selection between the first two points enumerated above is a matter of operator convenience. In fact a primary thrust of the batch-mode configuration of my invention is that nearly all of the operations can be individually scheduled and performed for operational convenience and efficiency.

Thus the different parts of processing for a single batch may be performed by different personnel and at widely separated times. For example, some functions of a particular batch process for a first generator can be performed before a serial-mode process for a second generator; and then the remainder of the functions for the first generator can be performed after that serial-mode process.

The same personnel can be used for both serial and batch modes—e. g., for the two different generators in the above example. The ability to perform batch-mode functions whenever convenient thus adds very greatly to personnel load-leveling and thereby to the overall versatility and economy of a practical operation.

Mixtures, Bulk Packing, and Recycling—In either serial or batch mode an operator must deal with consignment materials that occur in impure form, or in other words that are made up of more than one chemical. Under some circumstances even some consignment materials that are essentially pure when received by the operator are mixed together before shipping.

In addition, typically more than half the chemicals in a typical laboratory-waste batch are unused—that is, unused residuals of perfectly usable pure solvent or the like—and a significant fraction are entirely unopened. Even though the laboratory or other subsite that initially ordered such materials may have no further use for them, there is great motivation to avoid discarding them and to instead return them to useful status.

In practice of my invention I prefer not to make any particular software provisions for dealing with these three kinds of special situations, but rather simply deal with them as matters of data-entry and physical-packing techniques. I shall discuss those techniques here.

Some chemicals appear in solution. If the solution is aqueous, usually the water is disregarded and a consignment is entered by the solute name—and as in the liquid state. Such an approach may be used for some other materials that are substantially inert with respect to other materials in the same shipping container.

If other sorts of solutions and mixtures are encountered, the characterization of the consignment ideally should be tailored to include all the chemicals known to be in the mixture. If such a mixture is likely to be encountered frequently, the mixture entry can be absorbed back into the hazardous-chemicals database as already described.

To facilitate later reuse of such mixture entries, anyone practicing my invention is well advised to adopt some simple rules for the order, e. g., alphabetical order, in which diverse materials are consolidated into single entries. (In this regard it should be noted that often one cannot ascertain which member of a mixture accounts for the major fraction.)

Now turning to the second topic of this subsection: regulatory schemes permit mixing some types of materials (some common organic solvents, for example) together in a single container for disposal. Such a container is sometimes called a "bulk drum", "bulk container", "bulk pack", or "pour".

One convenient operating technique for making use of such "bulking" is to set aside all consignments of bulkable material, for the end of the batch. Then one or more bulk containers are formally opened in the usual manner, and then the contents of all the consignments are poured into those bulk containers—within the permissible chemical groups, of course, for each container.

The material quantity in each bulk container usually can be gauged, with adequate accuracy for bulk disposal, by observing the chemical level in the container. If preferred instead the quantities indicated in association with each of the original contributing consignments can be added arithmetically to find the total.

The operator then makes a single consignment entry for each entire shipping container, indicating simply that it is a "bulk pack", "pour" or the like. The single consignment entry is allocated forward to the shipping container in the usual manner, and the container formally closed.

In many cases neither the regulations nor the generator requires back-allocation of common "pours", and there is accordingly no need to make any accounting whatever of the initial individual consignments that contributed to each pour. If, however, such an accounting is desired or required the operator can provide it by simply reverting to the standard procedure of making a separate "pour" entry for each consignment—allocating all the poured consignments to the common shipping container in the usual way.

Turning to the third and final discussion of this subsection: my invention is readily practiced, without any software modification, in a preferred embodiment that provides full availability of waste materials for recycling. It must be recognized, preliminarily, that materials which have been shipped to a TSDF, and in some problematical situations even shipments that have been buried, can be retrieved.

Such requirements can arise because of a late realization that materials have been shipped (and buried) incorrectly. This may occur, for example, when the regulatory structure is changed, or when a generator has misidentified the contents of a consignment, or when an operator (or computer) has misread or miscopied that information.

Actual retrieval from landfill is not likely unless the materials involved are either extremely toxic (e. g., more radioactive than initially supposed) or extremely valuable, but in principle can be effectuated. This suggests the useful perspective that landfill "disposal" is merely a relatively more permanent form or category of storage.

With these considerations in mind it will now be appreciated that a straightforward extension is to establish a relatively less permanent form or category. My invention thus contemplates identifying a certain single shelf, bin, locker, etc., or a certain group of such structures, in a controlled-access storeroom as a "container".

Not all the containers in a given batch of materials need be so treated; some or most may be treated in the ways, already described, leading to handling that would be more traditionally recognized as disposal. Those consignments that are unopened or unused, however, can be computer-allocated to a so-called "container" that is defined as a shelf, bin or the like.

That structure is preferably in a storeroom as described above—but one that is at the generator's facility. The container packing sheets developed for each batch, and cumulating ones for containers that are bins, etc., can then be printed out and made available in printed form (and in computer-file form as well, or instead).

Such reference materials can then be back-integrated into the generator's inventory system for available chemicals. As to consignments that have been opened and partially used, the back-integration process preferably should so indicate, to alert those potential users for whom freshness or possible contamination from the atmosphere may be a consideration.

With relatively minor additional computer classification, at most, this recycling system can also encompass certain limited types of materials that have been not only opened but also partially exhausted. For example, for a great number of different etchant solutions or the like, secondary uses are appropriate even though certain foreign residue from an earlier primary use may be dissolved within a solution.

To clarify, consider a user who wishes to dissolve away a relatively thick layer of copper preliminary to an additional, finer chemical cleaning. To this user the preliminary acid solution may be perfectly acceptable even if it already contains a small amount of copper (or other metal) from some other process.

3. Description of Data Files

This section describes the fundamental database files employed in the software of my invention, together with the fundamental relationships among those files. Please refer to FIGS. 2 and 3, which present the underlying entity classes and relationships.

The software is organized around the following Filemaker database files.

The Hazardous-Chemicals Database 21 contains the name, description, and characteristics of known materials which may be encountered as waste. In addition to chemical compounds, the database contains many commonly-encountered physical variations and mixtures of such compounds. There is one record for each such material.

A record is created only when a new material is entered. Once entered, a record is never deleted unless it is determined to have been entered in error. For normal operation, my preferred embodiment requires specification of these data fields:

hazardous-chemical number (automatically assigned by the system; this field is a unique "key" for this database), chemical name(s), org-inorganic (organic or inorganic), hazard1 (primary hazard class—any of twenty-two standard text descriptions of hazards, stated in their entirety in the program listing in their entirety and exemplified by "poison B" and "oxidizer"), acid or base (if corrosive), physical state (solid, liquid or gas), hazard2 (secondary hazard class—any of the following five standard text descriptions of hazards: water react, poison B, flammable, corrosive, oxidizer), and note (any of twenty-one special conditions, stated in their entirety in the program listing and exemplified by "ENSCO special handing" and "cyanide USPCT").

Additional data fields which may be entered include:

three Code fields, RCRA1, RCRA2, and RCRA3—for data required under the Resources Conservation and Recovery Act (RCRA), RQ (reportable quantity, the size of spill which must be reported), EH (California "extremely hazardous" designation), IH (inhalation hazard), primary or preferred TSDF.

If a chemical is not found in the hazardous-chemicals database, the operator is to add a new entry to that database. To do so the operator may press the F6 key, causing the "add new chemical to DB" macro to automatically bring up the hazardous-chemicals database and position the cursor for entry of a new material at the bottom of the list.

The software automatically assigns the next available hazardous-chemical number in sequence, and automatically enters the current date in a date-entered field. To save typing, the system also enters certain other information. The operator may change any data, if necessary, and may add all data required for the computer to correctly and adequately categorize and research the chemical.

In order for the system to operate correctly, the operator must observe the following rule.

All "heavy metal" codes (also called "D" codes, D004 through D011) must be entered, when they apply, in the first RCRA-code field (RCRA1).

Any second and later codes entered should be concatenated after the first, using a comma-plus-space combination to separate each pair of codes in the concatenation.

These are the only codes for which the system ever conducts an automatic search. It searches in the first RCRA-code field only.

For most efficient operation, when entering information into the three RCRA-code fields the operator should observe the following rules also.

No more than one code should be placed in each of the other two (i. e., second and third) RCRA-code fields.

As implied by the previously stated rule, however, placement of more than one code in the first RCRA-code field is permitted; that field will accept as many codes as any single waste material can have—and they may be placed in any order.

The first "P" code should be entered in the second field, and the first "U" code in the third; if there are more than one "P" or "U" codes, those after the first in each category should be placed in the first RCRA-code field.

"F" codes then should be entered in any empty RCRA-code field or, if no field is empty, in the first RCRA-code field.

After the above entries, any remaining applicable "D" code(s) numbered below D004 should be placed in descending numeric order in the empty fields if any, respectively—with any still remaining then placed in the first RCRA-code field, together with the heavy-metal codes.

For compounds containing metals, other than those with a RCRA code D004 through D011, but which nevertheless the system should treat as heavy metals, the operator should add the notation "HM" in the "note" field. This is not necessary for compounds with RCRA codes D004 through D011.

The Proper-Shipping-Name File 22 contains information that is unique to a particular profile description, the "PSN profile," of a class of hazardous materials. There is one record for each unique such PSN profile. A record is created only when a new PSN profile is encountered for the first time, a rare occurrence.

Once entered, a record is never deleted unless it is determined to have been entered in error or the PSN profile is no longer valid because of a change in statute or regulations. For normal operation, my preferred embodiment requires specification of these data fields:

PSN profile—a unique "key" for this database, and proper shipping name (as determined by statute and regulation).

Additional data fields which may optionally be entered include:

hazard-label class 1 (identifier for a preprinted hazard label which must be placed on a shipping container), hazard-label class 2, container type, container size, container material, pack type (lab or bulk), UN/NA number (United Nations or North America number assigned for international shipping purposes), and California Waste Code (a code established by regulations of the State of California).

It is at times convenient to include fields which contain cost data, such as the nominal cost per unit quantity for disposal of the material. Such costs are often reasonably consistent for materials with a given PSN profile; hence these data simplify the preparation of cost estimates.

The Hazard-Label Library 23 contains pictorial representations of standard preprinted warning labels 11 (FIG. 1) required to identify materials presenting certain hazards during handling and shipping. There is one record for each such hazard label. The label names currently are: poison, flammable solid, oxidizer, flammable liquid, organic peroxide, dangerous when wet, poison gas, irritant, corrosive, ORM-A, ORM-B, ORM-C, ORM-E, and compressed gas.

A new record is created only when a new such label is defined by statute or regulation, a rare occurrence. Once entered, a record is never deleted unless it is determined to have been entered in error or the labelling requirements have been changed by statute or regulation. For normal operation my preferred embodiment requires specification of these data fields:

hazard class (describes the hazard, e. g. "flammable"), physical state (such as "solid"; this field when concatenated with the hazard class forms a unique "key" for this library), hazard label (the actual graphic representation of the label).

Additional, optional data fields may be entered to meet special needs.

The consignment File (also called the "open-drum finder" file) 25 contains one record for each consignment of materials processed. A new record is created when the consignment is entered into the computer system by the operator.

This file is usually used only transiently during processing. Records already processed and transferred to the open-conainer file (to be discussed shortly) must be deleted periodically (e. g., once per day) to prevent accumulation of a large number of unnecessary records which would slow operation of the system.

Some users may prefer to accumulate data in this file for periodic administrative reports summarizing the batches generated by one generator over a period, such as one month. In such cases the processed records would be deleted at the end of the month.

For normal operation, my preferred embodiment requires operator entry of these data fields:

hazardous-chemical name;

number of packages;

quantity per package; and batch number (also known as packing-list number).

Automatically entered by the software system, in addition, is:

item number (a serially-assigned number distinguishing this particular consignment from other consignments in the batch, and together with the batch number forming a unique "key" for this database).

In addition, numerous data fields are added to the record automatically by the software during processing, as will be described further below.

The Batch File (also called the "MPL login" file) 26 contains information that is unique to a particular batch of materials—that is, a collection of materials received at about the same time from the same generator and grouped together for administrative purposes. There is one record for each such batch.

A record is usually created when the first consignment in a new batch is ready to be processed. Once entered, a record is never deleted unless it is determined to have been entered in error. For normal operation, my preferred embodiment requires specification of these data fields:

batch number (also called "packing-list number", it forms a unique key for this database), and login date (automatically entered by software when a record is created).

Additional, optional data fields which may be entered include, for example:

batch name (name of responsible person), department, phone, and building.

The Open-Container File (also called the "open-drum database") 28 contains information that is unique to a particular open shipping container. There is one record for each such container.

A new record is created when a new container is formally "opened," ordinarily the first time a consignment of material is allocated to it. A record is deleted only after the data have been transferred to a corresponding record in the closed-container file and the container has been permanently sealed. My preferred embodiment requires specification of these data fields:

container number (or "drum number"—automatically assigned by the software in sequential order, and forming a unique "key" for this file);

date opened (automatically entered by the software); and date closed.

Additional data fields, such as container location, may optionally be entered for special purposes. In addition, numerous data fields are entered automatically by copying from the other databases, or are determined from other available data, as described further below.

The following such fields are repeating (multivalued) fields, which contain one value for each consignment allocated to the container: hazardous-chemical number, chemical mame, batch number, number of packages, quantity per package, reporting quantity, chemical weight, and TSD acceptance. The software enters one value (in some cases a null value, or "space saver") into each of these fields each time a consignment is allocated to the container.

The Closed-Container File (also called the "closed-drum database") 29 contains information that is unique to a particular closed shipping container. For each such container there is one record, created when an open container is closed. Once created, a record ordinarily is never deleted.

When a record is created, all data in the corresponding record of the open-container file are copied over to the new record. An exception is the hazard-label picture data, which are voluminous and need not be permanently stored in the closed-container file.

A closed-container file is created by using Filemaker to "clone" the open-container file, deleting the hazard-label field, and adding these necessary fields:

OK to ship, manifest number (shipping-manifest identifier), and date shipped.

Other fields of special interest may be included.

The Temporary Batch File 24 ("batchPackIT file") contains one record for each consignment of waste materials in a group of consignments that is processed as a single batch in batch-mode operations. It thus resembles in structure the consignment file described above, except that all the consignments in the file are in the same (temporary) batch.

A new record is created when the operator enters a new consignment into the computer system. This file is usually used only during processing of a particular temporary batch; when the batch processing is over, the entire file can be deleted.

The system can be used to support more than one temporary batch in process by using Filemaker to make and store "clones" of this file under different names. Such separate temporary batch files can be retained indefinitely, if preferred, to serve as a permanent database of processed batches; this technique may be useful for compiling long-term statistical data.

For normal batch operation, my preferred embodiment requires specification of these data fields:

item number (a serially-assigned number automatically assigned by the software, distinguishing each consignment from others in the batch—and forming a unique "key" for this file);

hazardous chemical name;

number of packages;

quantity per package;

location (also called "division"—gives the general location of a consignment); and cabinet (gives the specific physical location of a consignment, as by spatial coordinates).

The temporary batch file also contains the following fields which are actually attributes of the container entity set 27. All these fields except container number only have to be entered in the record of the first consignment which is assigned to the container.

container number (which embodies the "is in" relationship 37 in the batch mode), container location,

TSDF, manifest number (shipping manifest identifier), and date shipped.

Also, many fields are copied into this file from the hazardous-chemicals database, the hazard-label library and the proper-shipping-name file during batch-mode operations, as described below. In addition, a great many fields are derived automatically by Filemaker operations, as described below.

Lastly, other fields of special interest may be included as conditions warrant.

Several ad-hoc files are necessarily created during the operation of any Filemaker system. For example, many screens and reports are generated by first creating a special file for that purpose.

Even when a screen or report can be generated by applying a Filemaker layout directly to one of the above files, it is often convenient to create additional ad hoc fields, e. g. by concatenation or truncation of existing fields, as a part of the process of formatting the screen or report. Such files and such fields are omitted from the above description because their necessity and use are well known to those familiar with the operation of Filemaker, or similar database software.

The following paragraphs briefly describe the fundamental relationships among the entity sets corresponding to the data files. Please refer to FIGS. 2 and 3.

One hazardous chemical constitutes 31 zero or more consignments. One consignment is constituted by exactly one hazardous chemical, unless the material is one not in the hazardous-chemicals database and its data are entered manually for the consignment. This relationship is embodied by the hazardous-chemical-number field in the consignment file.

One consignment is in 32 exactly one batch. One batch may contain one or more consignments. This relationship is embodied by the batch-number field in the consignment file.

One proper shipping name requires 34 zero, one or two hazard labels. One hazard label is required by zero or more proper shipping names. This relationship is embodied by the hazard-label-class-1 and hazard-label-class-2 fields in the proper-shipping-name file.

One proper shipping name describes 35 zero or more consignments. One consignment is described by exactly one proper shipping name. This relationship is embodied by the proper-shipping-name field in the consignment file.

One consignment is in 37 zero or one containers. One container contains zero or more consignments. (Note that there are two kinds of containers, open containers 28 and closed containers 29.) This relationship is embodied by the container-number field in the consignment file, and also by the batch-number and item-number fields in the open-container and closed-container files.

One proper shipping name describes 36 zero or more containers. One container is described by exactly one proper shipping name. This relationship is embodied by the proper-shipping-name field in the open-container and closed-container files.

4. Serial Mode Operation

Figure 2:
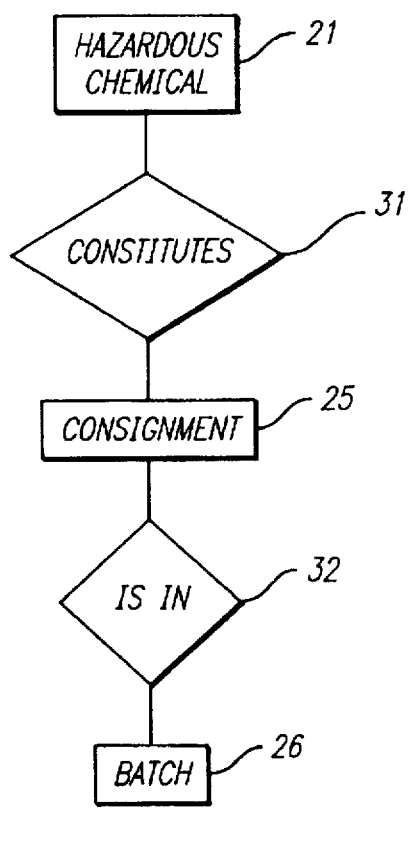
FIGS. 2 and 3 are entity-relationship diagrams showing the entity classes of eight databases used in my invention, and their relationships. The notation of these diagrams is explained in, e. g., Ward and Mellor, *Structured Development of Real-Time Systems* volume 1, chapter 10 (Prentice-Hall 1985)—wherein, however, the term "object" is seen in place of that used herein, "entity class".
Figure 3:
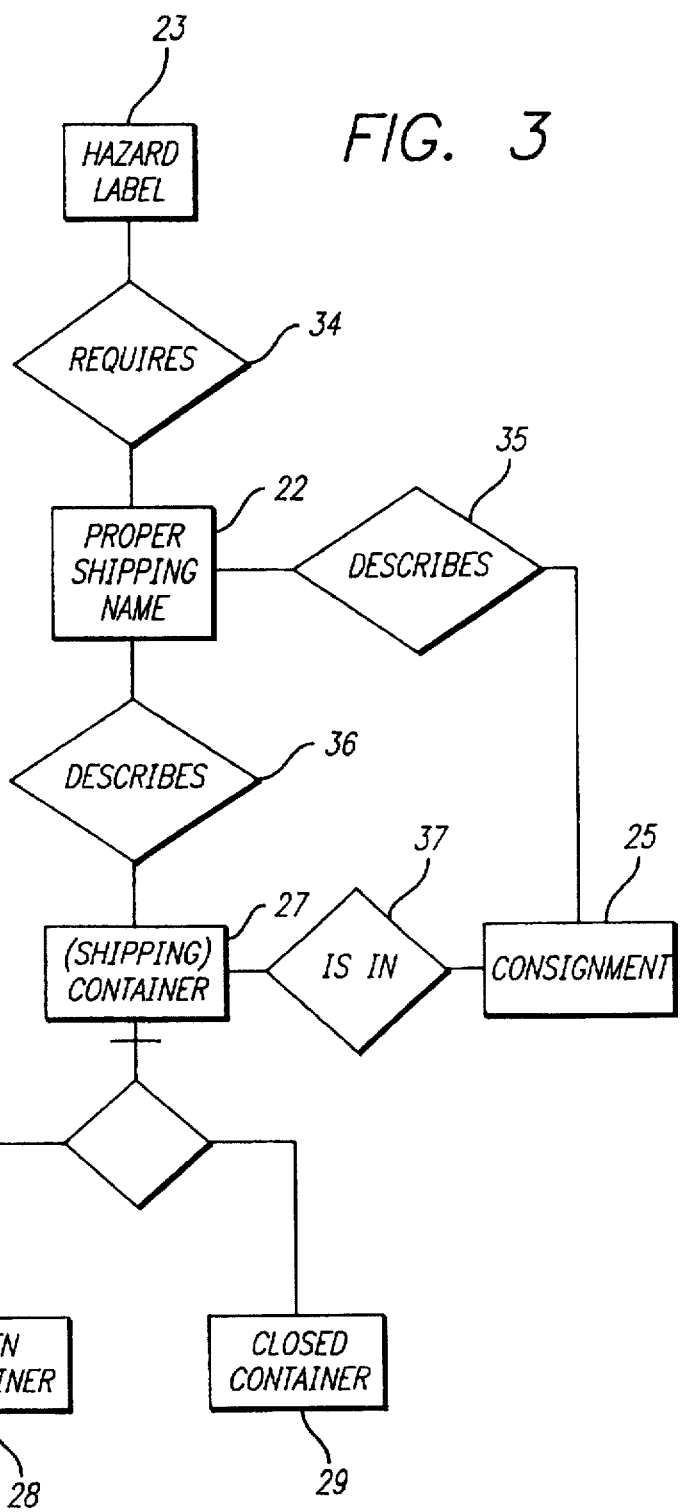
Figure 4A:
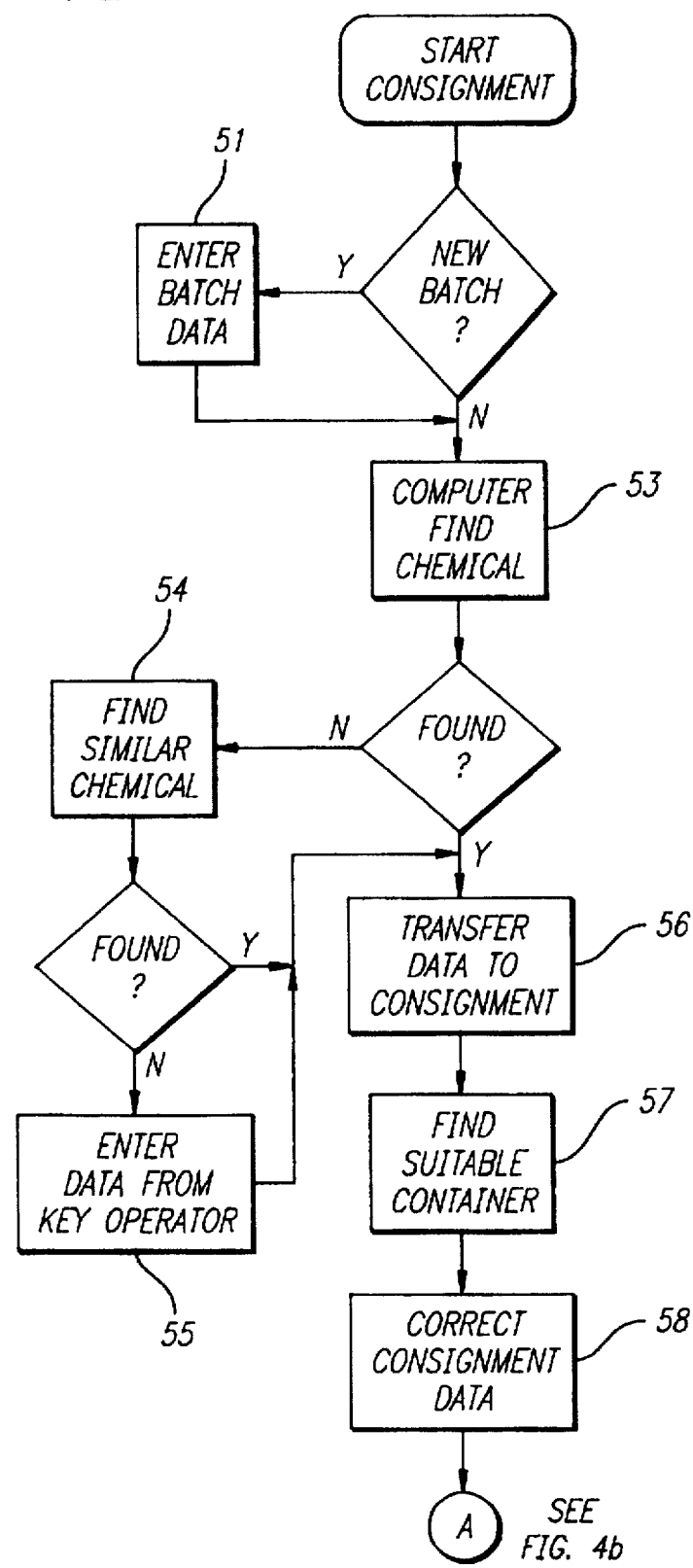
FIGS. 4a and 4b are segments of a flow chart of ordinary serial-mode operation.
Figure 4B:
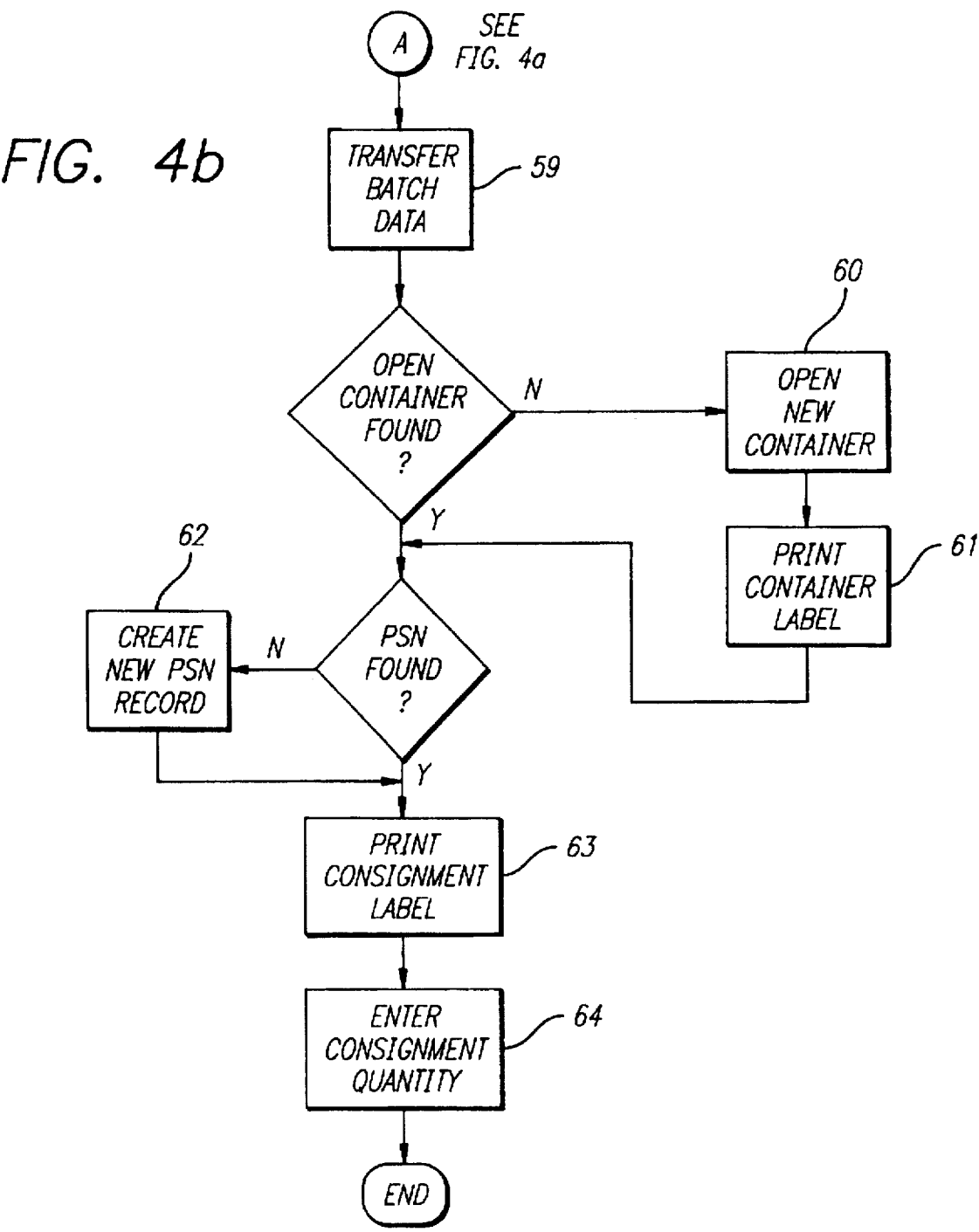

I assume the reader has studied the above analysis of data structure, referring to FIGS. 2 and 3. That analysis is essentially unidimensional—directed to data architecture—but this section is at least three-dimensional; it links:

data structure of FIGS. 2 and 3, procedural sequence of FIGS. 4a and 4b, and data dependencies of FIGS. 5 and 6, which themselves imply structure-sequence relationships.

This presentation also relates those groups of elements to:

the specimen printouts of FIG. 7, and the detailed code and code-equivalent screen layouts in the microfiche appendix.

Readers studying all five groups of materials receive a five-dimensional tour of the software. Whether the tour is taken in three dimensions or five, the text serves as guide.

The graphics and code, however, are self explanatory to a skilled programmer, particularly if studied in collaboration with a skilled technician in the hazardous-waste field. The text becomes redundant, serving mainly to orient the reader to relationships between the graphics and code. (Text therefore is minimized in the batch-mode presentation of section 5.)

Actual implementation of my software is implanted in the various file definitions, primarily using Filemaker's so-called "lookup", "relookup", "calculate", and "summary" functions. While specific instructions employed in the preferred embodiments of my invention appear in the microfiche appendix, general operation of these functions is described in Claris Corporation's documentation of Filemaker.

In reading the following description of the detailed operation of the system, please refer to FIGS. 2 through 7i.

Taking the consignments one at a time, the serial operator 3 determines what the material of each consignment is. This determination is based upon the informal consignment labelling 4' (FIG. 1) and the input itemization 12', and sometimes upon simple observation or knowledge of the generator's operations as well.

For each consignment the serial operator then performs the sequence of operations of FIGS. 4, as follows:

a. If this is the first consignment in a new batch, the operator enters 51, 210 batch descriptive data into the batch file ("materials packing list login"). The operator first obtains the entry screen either manually or by pressing key F10 to invoke the "new materials packing list" macro.

b. The operator looks up the chemical identification in the hazardous-chemicals database 53, usually by selecting the search ("?") icon or by pressing key F5, either of which invoke the "search hazchem DB" macro. That macro causes the software to accept the chemical's name from the operator and search 250 the hazardous-chemicals database for a matching name.

c. If the system does not find a matching name, the operator can search for the chemical or a closely-related chemical 54 either by manually scrolling through the hazardous-chemicals database or by performing a Filemaker search for a partial match to the chemical name, in either case using the scrolling and searching capabilities of Filemaker.

If several entries are found, it can be helpful to sort the entries by pressing the F14 key to invoke the "sort" macro. When searching, Filemaker finds records with names that match or begin with the characters being searched for. For example, in searching for "methyl" Filemaker will find "methyl alcohol", "methylamine", "chloro methyl", and "1,2- methylbenzene". "Dimethyl alcohol" would not be found since it does not begin with or match "methyl".

In searching for multiple words Filemaker searches for each word separately, finding records with words that begin with or match all the words which the operator types in the request, whether or not in the same order. For example, "meth chloride" will match "methyl chloride" and "chloride of Methylbenzene", but not "methyl bromide" or "dimethyl chloride."

d. In the rare case of finding neither the chemical nor any closely related chemical, the operator—probably in collaboration with the key operator—will have to research the new chemical's classification; and then enter 55 the data manually (and perhaps add it to the hazardous-chemicals database as well).

e. When a matching name, or the name of a closely-related chemical, is found the operator transfers 56, 240 the data from the found record in the hazardous-chemicals database to the consignment file, usually by selecting the "transfer" icon (which resembles a "recycle" symbol) or by pressing the F9 key, to invoke the "copy hazchem number to open drumfinder" macro.

As part of the same step the software also assigns the next available sequential item number to the consignment and determines 220 the following fields.

the hazard profile for the chemical, and units.

The hazard profile (hazardous-waste segregation, shipment and disposal profile) is determined as follows:

if the hazard1 field (primary hazard) is "corrosive" "oxidizer", "peroxide" or "nonRCRA", then concatenate the org-inorganic, hazard1, physical state, acid-base, hazard2, and note fields, in that order, separated by so-called "hard" spaces; and if not, then use the same concatenation just described but without the org-inorg field.

This same process is used for determining the hazard profile wherever it is determined.

The units field is set to "ml" if the physical state is "liquid", and to "gr" otherwise. Determined values are automatically redetermined if any of the dependent variables, such as physical state, is changed at any time.

f. In an automatic continuation of the software process, once the hazard profile has been determined, the software searches the open container file to find 57, 320 an open container with a hazard profile matching the profile of this consignment, and copies its container number ("drum number") into the consignment file.

(If none can be found, the procedure skips to point i below.)

g. The operator adds to or otherwise modifies 58, 270 this new record in the consignment file, using any deviating information determined about the consignment—such as perhaps that the material is in the form of a liquid solution rather than its usual solid form.

h. The operator enters 230 the batch number (packing-list number). By action of lookup instructions in the consignment file this entry causes the software to transfer 59 the fields of the corresponding record in the batch file into the consignment file.

(Alternatively, the system is sometimes configured with a lookup function in the consignment file which causes the batch number of a suitably designated "current" batch to be copied automatically into the consignment file, thereby triggering the lookup of the remainder of the batch data. This permits sequential processing of a number of consignments from the same batch without reentering each consignment batch number.)

i. If the software cannot find a suitable open container at step f, the operator selects a suitable empty container and formally "opens" it 60, 410. One way to do this is by pressing key F7 to invoke the "open new drum, print sheet, print label" macro.

The operator can then enter the size, type, and location of the new container into the open-container file. This macro also causes the system to print 260 a consignment label (FIG. 7c, and element of FIG. 1).

The operator can alternatively use any one of these macros instead:

"open new drum" (control-F7) opens a container without printing the label—which can be printed later when needed, "open bulk oil drum" (option-o) opens a container and sets up record for bulk packing of waste oil, "open dry waste (bulk) drum" (option-d) opens container and sets up the record for bulk packing of dry waste, "open halogen solvent drum" (option-h) opens a container and sets up a record for bulk packing of waste halogen solvents, and "open nonhalogen solvent drum" (option-s) opens a container and sets up a record for bulk packing of waste nonhalogen solvents.

As soon as the new container is "open" the software "finds" it 320 and the assignment of the current consignment to the new container is complete.

As soon as the system opens a new container, automatically as part of the same step a PSN profile for the container is determined 340 in the open-container file, based on the characteristics of the first consignment going into the container. The PSN profile is determined by concatenation of the following fields: hazard1, physical state, hazard2, acid-base, and note—in that order and using only hard spaces for separation.

When this newly determined PSN profile matches the PSN profile in a record in the proper-shipping-name file, the following fields are copied 360 from that file into the new open container record: container size, UL/NA number, container type, pack type, and container material. These recommended properties for containers with this PSN profile may then be manually corrected 270 by the operator if necessary.

If the system cannot find a matching PSN record, the operator creates 61 one with standard Filemaker commands. The operator then completes the process by pressing the command-F1 key to invoke the "redetermine" macro.

Also as soon as the new container is "open" the software automatically determines 340 a hazard-label class 1 by concatenating the hazard1 and physical-state fields for the first consignment. If the result matches the hazard-label-class field in any record in the hazard label library, then that hazard label—more precisely, the graphics data for a miniature picture of the label—are copied 380 from the hazard label library into the hazard-label-#1 field in the new open-container record.

Similarly, the software automatically determines a hazard-label-class 2 by concatenating the hazard2 and physical-state fields for the first consignment, and copying the corresponding picture into the hazard-label-#2 field. If, however, hazard2 is "water react" and either hazard1 is "flammable" or the physical state is "solid" then the system omits this step as no second hazard label should be used.

j. After opening a new container, the operator will usually print 61, 430 a container label (FIG. 7b, and element 8 in FIG. 1) by pressing the command-F4 key to invoke the "print drum label" macro. It is recommended practice at this time also to print 470 a draft container inventory report (FIG. 7a and 10 in FIG. 1) by pressing the F3 key to invoke the "print current record" macro.

The container label (FIG. 7b) can be affixed to the new container. The draft container inventory can be attached temporarily or otherwise kept with the container to be replaced by updated container-inventory reports (FIG. 7a) as additional consignments are added to the already-open container.

k. Immediately when the system "finds" a suitable open container for the consignment—whether it is a preexisting container or a newly-opened one—the system automatically, and as part of the same step, determines the content of the consignment label (FIG. 7c, and element in FIG. 1), placed in the "labelwriter" field of the record in the open-container file.

The label should include the following data, in order: container number, batch number, hazardous-chemical number, hazard profile, chemical name, and item number. When a consignment label is printed it contains that information.

l. The operator causes the system to print 63, 260 the consignment label (FIG. 7c, and in FIG. 1) and to switch to the inventory display for the container to which the consignment has been allocated. Usually these functions are initiated by selection of the "into file" icon with the mouse or by actuation of the F11 key to invoke the "print label and find drum inventory" macro.

Additional consignment labels can be printed 260 by use of key F4 invoke the "print individual chemical label" macro, in case the operator wishes to label each package in the consignment separately. Preferred practice, however, is to bag or tape them together and apply a common label.

m. The operator enters 64 the number of packages and the quantity per package for the consignment. The quantity is in milliliters for all liquids and in grams otherwise.

This completes the description of the fundamental process performed by the operator and software together for each consignment. The following additional functions are carried out as necessary.

Closing Containers—Each open container is eventually sealed and marked closed 420 by entering the current date into a "date closed" field in the open-container file. At this time the operator must print 470 a final container-inventory report 10 to affix to the container for shipping, if this has not already been done.

Periodically the operator invokes the "archive closed drums" macro by pressing key F8, which causes the software to copy 450 all records with closed dates from the open-container file to the closed-container file. After verifying that the data have been successfully copied, the operator very carefully deletes these records from the open-container file using the Filemaker "delete multiple" function.

Tracking Containers—The operator can maintain the location of containers by entering new values of the location (building) and cabinet (physical coordinates) fields in the open- or closed-container file, as appropriate, each time the container is relocated.

Shipping—The status of closed containers can be tracked by entering a mark into the "OK to ship" field to authorize shipment and by entering the "date shipped" and "manifest number" fields when the container is shipped.

At each point in the process the system software automatically checks 460 for compatibility between the consignments assigned to each container and the classification of the container itself, and alerts the operator whenever the transfer, storage and disposal facility specified for the container is incompatible with the TSDF copied earlier from the hazardous-chemicals database. Incompatibility is determined by a process specified in the program listing for the open-container file ("open drums DB"), and the result appears in a field called "TSD Accept?Present."

The software also automatically determines 460 whether the drum is legally barred from deposit in a landfill. It does this by testing whether the RCRA2 code begins with "P" or the RCRA3 code begins with "U" and, in either case, putting a check mark in the "land ban" field.

The software also automatically estimates 460 the gross weight, in pounds, of each container by aggregating the weights of the individual consignments in it, based on the given quantities in grams and milliliters. Using standard Filemaker functions, the operator can straightforwardly produce a very great variety of useful additional derived and summary fields from the data in the container files.

Producing Reports—The software of my invention can print 110, 130, 150, 470 a substantial number of predefined report formats. In most cases these correspond to Filemaker "scripts," which can be selected by name from the Filemaker scripts menu. The script names are generally the same as the corresponding report names.

Each report can also be printed by using standard Filemaker functions, without use of scripts, and indeed reports can be modified or even entirely new reports produced for special purposes using the standard capabilities of Filemaker. The preferred embodiments of my invention include the following predefined reports.

The Hazardous-Chemicals Database Report (microfiche appendix) 110 can show the complete contents of that file, with one line per record. It is only occasionally printed in its entirety, but it is frequently useful to perform some selection and perhaps sort operations to produce a partial printout for a class of chemicals of momentary special interest.

The Container Inventory Report (FIG. 7a), generated 470 from the open-container file, provides a header with basic information on a particular container and one line per consignment describing each consignment. The header includes a pictorial representation of up to two hazard labels: a drum handler uses this to select the required preprinted color labels 11 to be affixed to the container.

The final container-inventory report 10, listing all the contents of the sealed container, is also affixed to the container before shipment, as required by law. It can run to as many as three pages.

The Open-Container List (FIG. 7d) contains one line per open container record. By using standard Filemaker functions it can, when desired, be sorted by container number, hazard profile, or location, to satisfy various waste management needs. This report is generally printed 470 out about once each day.

The Old-Container Report (FIG. 7e) lists only containers which have been open for more than a predetermined time, such as forty-five days. It is important that containers approaching the end of the storage time permitted by the facility's license receive special attention. This report is typically printed 470 about once weekly.

The Closed-Container Report (FIG. 7f) is a general inventory document and very heavily used. It provides a quick and comprehensive reference for finding materials in the generator's yard or staging area—e. g., the earlier-closed drums 9 of FIG. 1—in the regular, frequent routine of selecting containers for shipment or other handling.

The Batch Report or "materials packing list" (FIG. 7a), is primarily for the generator's use. With associated cost data, in particular, it permits the generator to allocate costs back to the originating laboratories or other subsites.

Cost allocation is an increasingly important function modernly, since the cost of disposal has become a much more significant consideration than it was only a few years ago. Disposal cost now may make the difference between profit and loss in a commercial operation, or between under- and over-budget conditions in an academic or other nonprofit organization.

The Manifest Summary (FIG. 7i) is a listing of containers to be placed in a given vehicle (e. g., truck or rail car), or group of vehicles. It presents information that must be copied to the actual shipping manifest, and presents that information in a format very similar to the manifest format.

The Container Shipping Summary (FIG. 7h) is used mainly as a preliminary to preparation of the manifest summary just discussed. The container shipping summary lists containers ready for shipment to a given TSD; from these, staff can select containers for a given outbound vehicle.

The Location Map or "doghouse floor plan" (FIG. 8) is considered part of the preferred embodiments of my invention, but the graphics are not prepared by the software of my invention. Rather such a diagram should be prepared for every storehouse or other staging area, identifying by a very short character code each location within that area.

When shown on the computer screen in my system, only the drum number and location are displayed from the data developed by my software. These two parameters appear near the upper right corner of the illustration. All the rest of the drawing is simply stored in the computer as a graphic, and the parameter values are overlaid in that corner as shown.

That portion of the illustration is omitted from printouts of the location map. Those paper copies are only for general reference in teaching or reminding workers of the physical pattern in which the codes have been assigned within the area.

The "Doghouse" Hazard-Distribution Report (FIG. 9) is an emergency printout for the assistance of emergency-response personnel. It is generated quickly in event of a fire, earthquake, severe spill or the like.

In such situations hazardous-waste disposal personnel who are familiar with the generator's recent waste-generation patterns—or others who happen to be at the site when the emergency begins—sometimes are able to see which container or containers are involved in the problem. That information, or at least the involved sector of the "doghouse", is used as input to generate the hazard-distribution report.

The container and/or sector information appear on the hazard distribution (FIG. 9) as "designated container(s)" and "sector(s)". The sections of the report summarize the hazards in—

(1) the designated sector, (2) the adjacent portion of the facing sector (or sectors), and (3) along the main approach paths—in FIG. 8, the laboratory door at the left end of the drawing and the shipping door at the right end.

This information, viewed in conjunction with the graphic of FIG. 8, allows firemen or other emergency personnel to evaluate the several possible courses of action. In some cases, it may be determined from FIGS. 8 and 9 in conjunction that a reasonably safe approach to the focus of the problem may be made through one or another route.

The example of FIG. 9 is constructed to suggest that approach through the laboratory door might be effected safely, but that approach through the shipping door would be extremely unwise. Study of the two drawings will clarify how these conclusions might be reached.

It is crucial to recognize, however, that other information in the open-container and closed-container files should also be taken into account—as it is possible that severe hazards are posed by stored material that is adjacent to neither the focal area nor the possible approach routes. Thus in some cases, for example, the only reasonable choice may be to evacuate the subsite, or the entire facility, or even its neighborhood.

5. Batch-Mode Operation

The reader is assumed to be familiar with both the data structure (subsection 3) and the multidimensional serial-mode presentation (subsection 4). The latter is very important to understanding this section, for two reasons.

First, subsection text exemplifies how graphics and code together convey a full picture of the software workings. With that understood, the current presentation relies primarily on the graphics and code, with less comment.

Second, some software modules work identically in serial and batch modes. Subsection fully explains those.

Materials to be studied as to batch-mode operation are:
again, data structure of FIGS. 2 and 3,
procedural sequence of FIG. 10, and
data dependencies of FIGS. 11 and 12a through 12d;
and in addition, for fuller understanding:
specimen printouts shown as FIG. 7, and
detailed code and screen layouts in the appendix.

To carry out the details of batch-mode operation, the operator employs the software of my invention to perform the following steps. Please refer to FIGS. 10a, 10b, 11 and 12a through 12d.

a. The following steps b through f are performed for each consignment in the batch. The functions 73, 74 and 75 are essentially identical to the functions 53, 54 and 55, respectively, shown on FIG. 4a and already described in subsection 4, and are carried out in the same way—but on the temporary batch file instead of the consignment file.

b. The operator looks up 73 the chemical identification in the hazardous-chemical database, by entering the name of the chemical and letting the software search 520 for a matching name.

c. If the system does not find a matching name, the operator can search 74 for the chemical or a closely-related chemical manually.

d. If neither the chemical of interest nor any closely related chemical is found, the operator obtains the data from the key operator—and enters 75 the data.

e. When a matching name, or the name of a closely-related chemical, is found the operator transfers 76, 530 the data from the found record in the hazardous-chemicals database to the temporary batch file, usually by pressing key F13, to invoke a "copy IT number to batchPackIT" macro. As part of the same step the software also assigns the next available sequential item number to the consignment and determines 610 these fields:
the hazard profile for the chemical, and
units.

f. The operator completes entry 81, 510 of the consignment data by entering the number of packages and unit quantity and, as at 58 in FIG. 4a, incorporates into this new record in the temporary batch file any deviating information available—and may add other optional data as before.

g. As soon as consignment data are copied or entered into the temporary batch file, the software automatically executes the program in the temporary-batch-file code and determines 600 certain data fields which can be derived from others. This includes automatic determination 610 of the hazard profile, units, PSN profile, and hazard-label classes 1 and 2, in a manner identical to that already described in subsection 4.

Figure 6A:
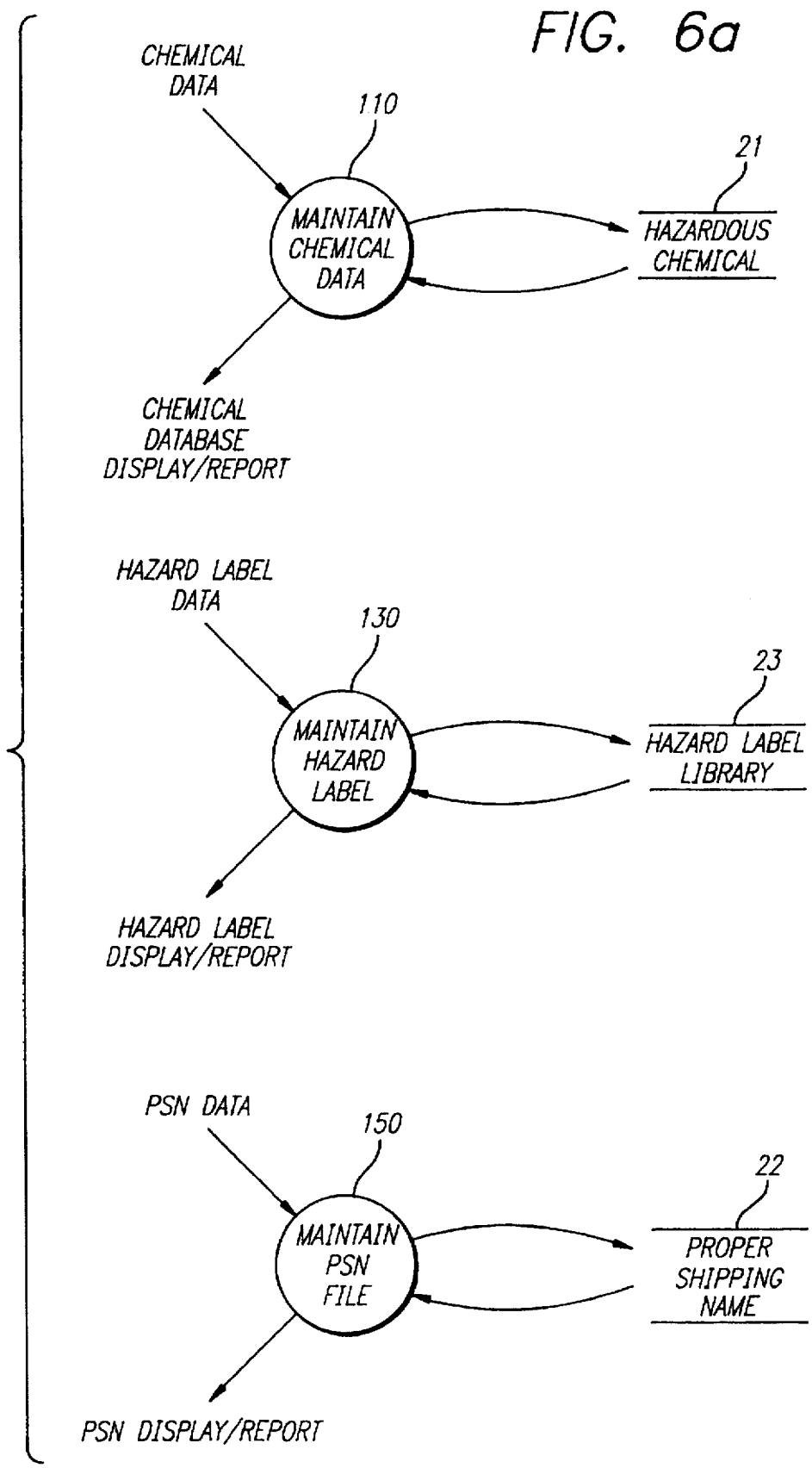
FIGS. 6a through 6d are similar data-flow diagrams for the serial mode. Each of these drawings illustrates internal details of one of the four major functions of FIG. 5.
Figure 6B:
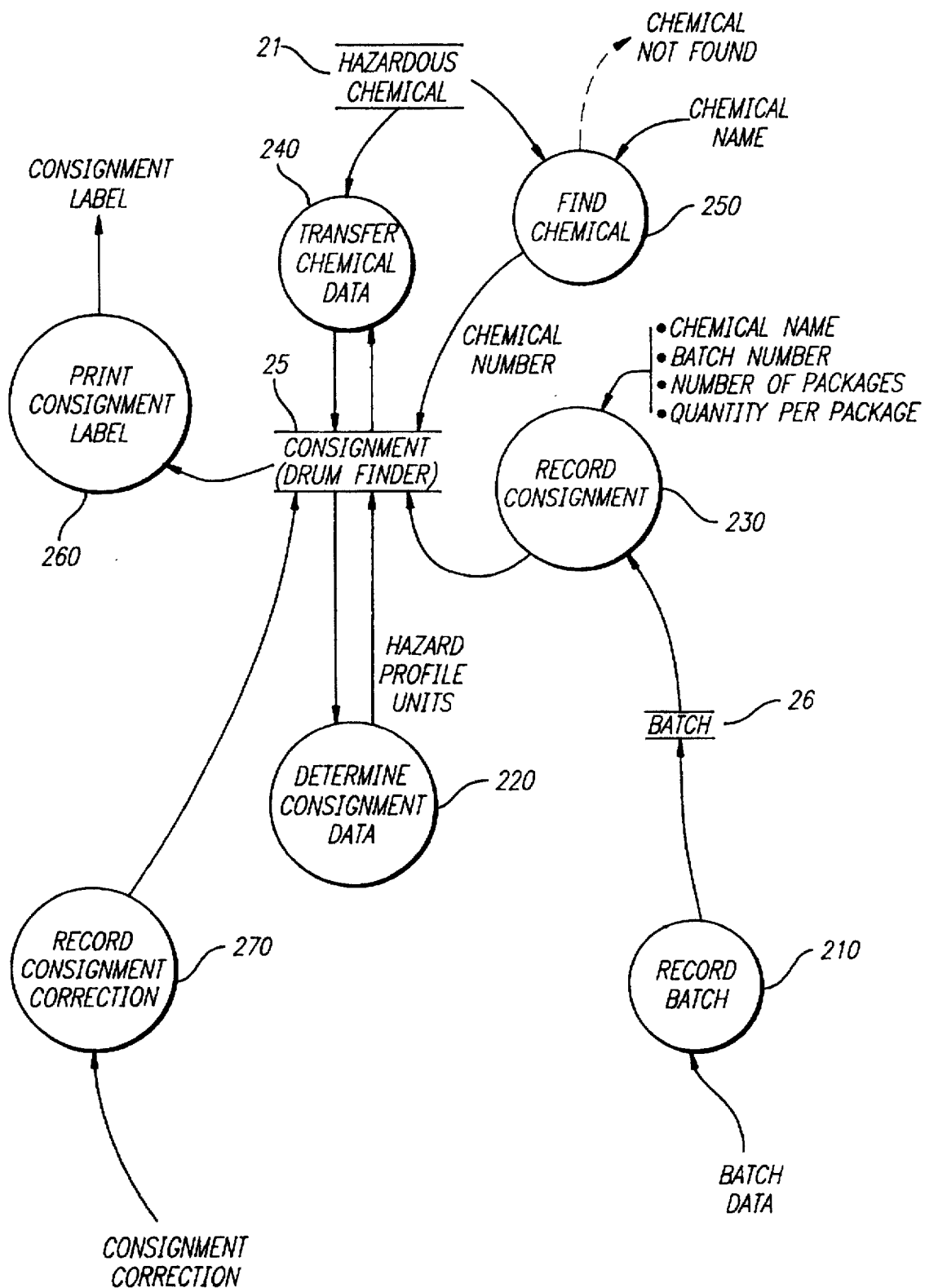
Figure 6C:
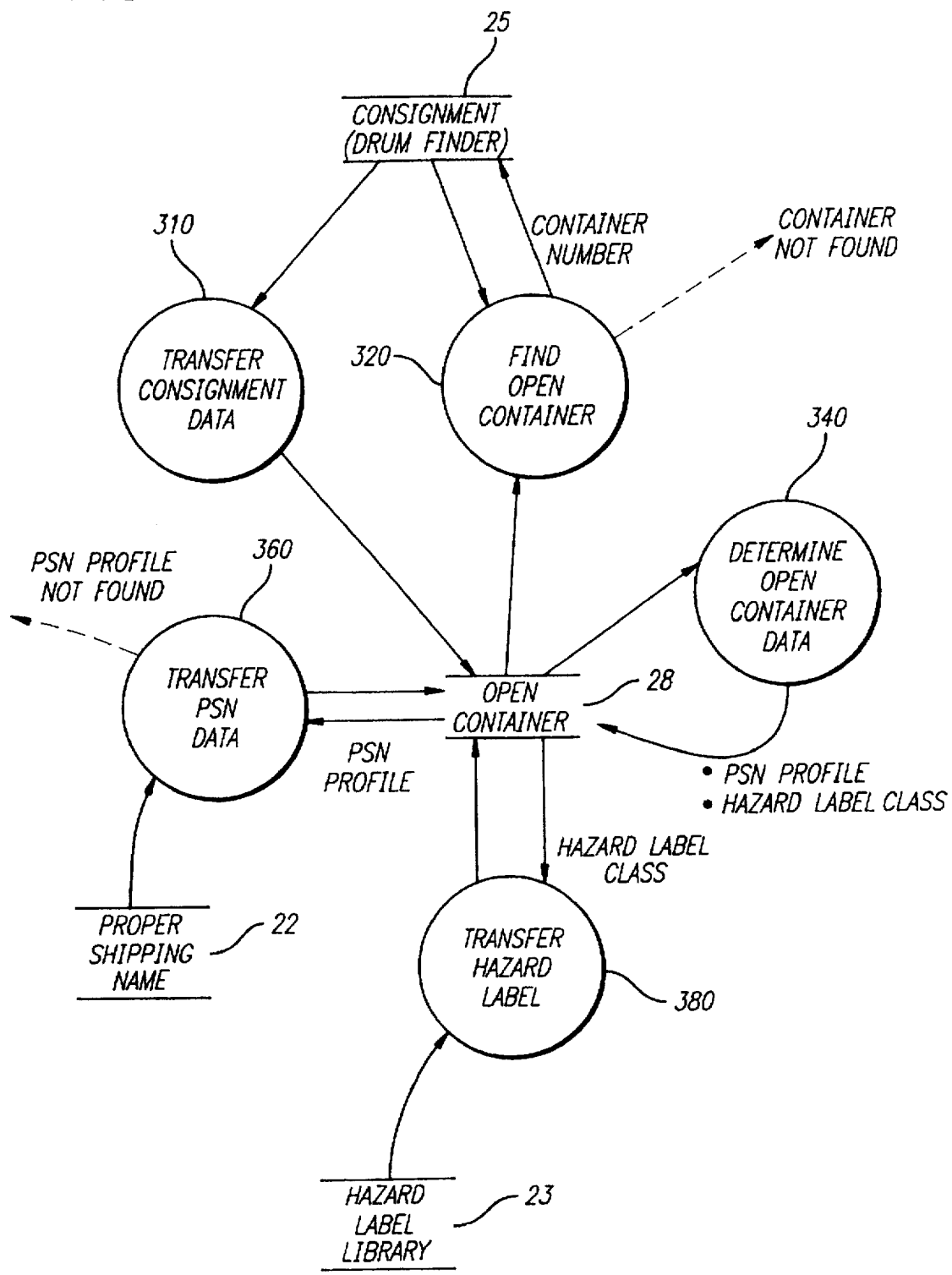
Figure 6D:
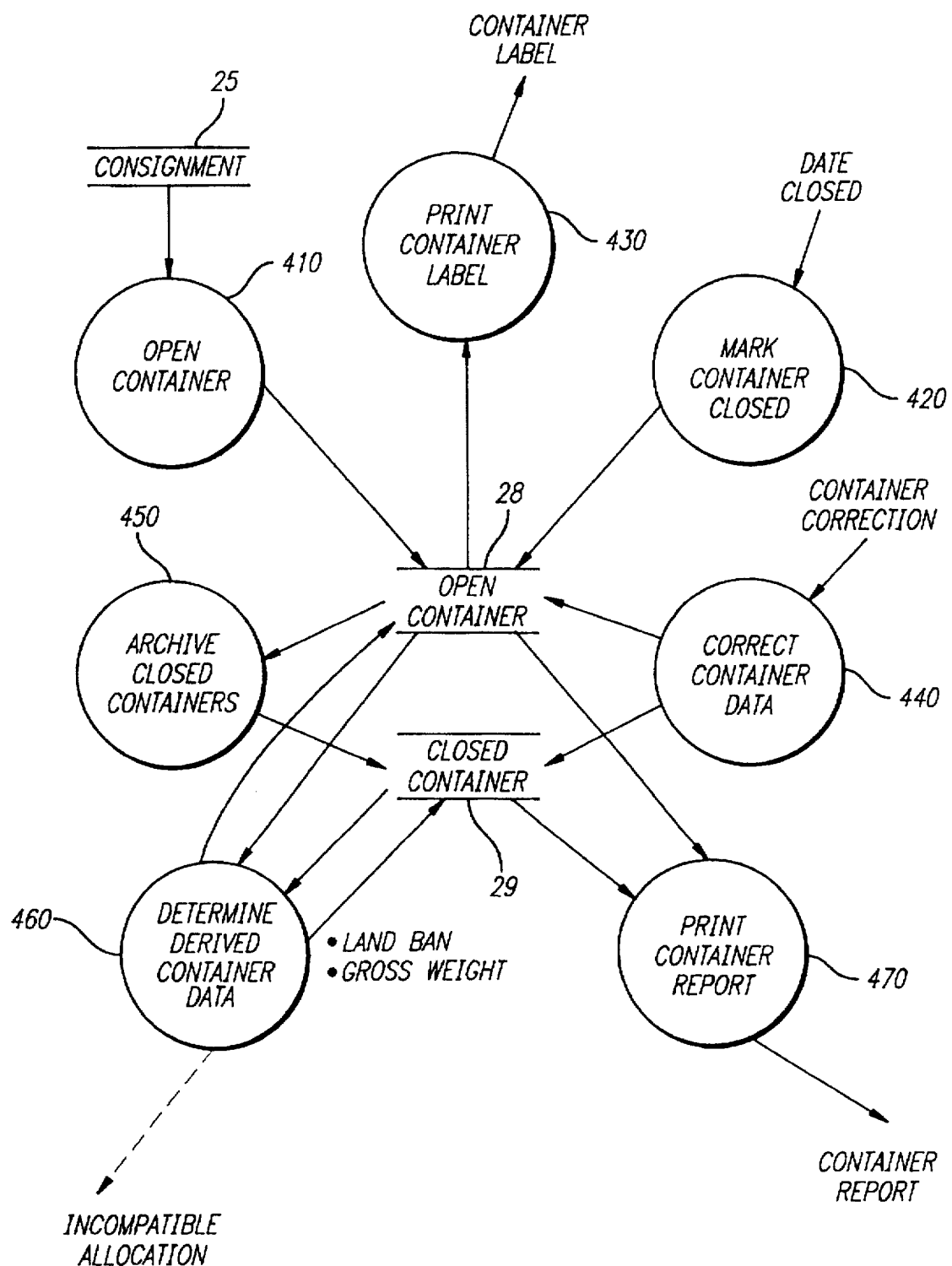

In addition, when these fields have been determined, the software automatically, as part of the same step, transfers 550, 560 the corresponding records from the PSN file and hazard-label library, exactly as in 360 and 380 on FIG. 6c (also explained in subsection 4). Further, as part of the same continuing step the software determines 620 the aggregate weight and volume of each consignment.

h. The batch mode is unlike the serial mode 320 in that the software provides no automatic assignment of consignments to containers. Instead at this point the operator causes Filemaker to display 83 the consignments in the temporary batch file, sorted and aggregated by hazard profile.

This step is performed using a layout, created by straightforward Filemaker Pro techniques. This layout preferably includes the total number of items and the aggregate weight (pounds or grams) of material for each unique hazard profile.

Guided by this display, the user can estimate, as a trial value, the number of containers needed for each hazard profile group.

i. The operator then assigns 84 each consignment to a unique container number, by entering 710 a container number in each record of the temporary batch file. This can be done most conveniently while displaying the temporary batch file sorted by hazard profile.

j. Once container numbers have been assigned, the software automatically, as part of the same step, determines 630 a number of aggregate measures of the containers, including: container net weight, container net chemical volume, container gross weight, number of items (consignments) per container, and suggested container size. Weights and volumes are estimated based on specified quantities and reasonable assumptions about the average densities of typical materials.

The suggested container size is set to five gallons if the estimated volume is less than 1.2 liters, thirty gallons if the estimated volume is less than 8.4 liters, and "more than thirty gallons" otherwise. Based on such estimated aggregate data the operator then enters 85, 720 properties of each container such as container type, container size, container material, and TSDF.

Such properties may have been previously copied 530 or 550 from the hazardous-chemicals database or the proper-shipping-name file, if usual suggested such properties have been made available from either of those sources. If so, and if they are acceptable, they need not be entered at this point.

k. If the content assigned to each container is not completely acceptable 86 at this point, the operator returns to step h above, performing all the subsequent steps as necessary until the arrangement is satisfactory at this point. The aggregate data determined 630 by the software are also very useful in evaluating the particular configuration of containers reached and in estimating the cost and time associated with subsequent processing of the batch.

After the container properties and TSDF have been entered, the software also automatically determines 630 aggregate data by TSDF—including the number of containers of each size scheduled to ship to each TSDF, a parameter that is very useful for estimating cost of transportation. In addition, the temporary batch file can be programmed to determine 650 incompatibility between the contents of any container and the acceptance rules of the TSDF to which it is assigned, as is done 460 in the container files in the serial mode.

This completes the description of the detailed procedure of batch-mode processing as a controlled sequence. At any point which is convenient during or after this process, however, the operator can print 800 any of the labels and reports which can be produced in the serial mode.

Since the container label and many of the reports are produced from the container files in the serial mode, however, and the container files have one record per container while the temporary batch file has one record per consignment, such a label and such reports must be generated by separate and distinct Filemaker layouts in the batch mode, and these may best be accessed by distinct scripts or macros as well.

6. Audio Interface

My invention contemplates incorporation of an audio interface, to enhance efficiency and ease of use by the regular operator—particularly in serial mode. An audio interface and straightforward additional programming would allow the operator to activate each of the three major icons—"search", "open drums database", and "print label"—by voice command.

This refinement is readily implemented with technology now available, including the straightforward programming needed to recognize these three phrases. A preferred embodiment may make use of monosyllabic abbreviations such as "drum", "search" and "print".

Incorporation of an audio interface represents a significant improvement because the operator often is limited by the number of physical, manual operations that can be performed simultaneously. Thus the operator often is moving one or several consignment items from place to place, requiring use of both hands.

Ability to call out to the computer system instructions to start operational sequences of the computer would thus enable the operator to initiate those sequences while continuing to move the items.

Ideally, material names could also be called out to the system by spelling out the names, one character at a time. Such a system would require somewhat more-sophisticated programming for recognition of letters and numbers—probably with specialized pronunciations for some characters that may be difficult to recognize.

Nevertheless implementation would be essentially straightforward using available techniques, within the present capability of artisans skilled in voice-recognition computer programming.

It will be understood that the foregoing disclosure is intended to be merely exemplary, and not to limit the scope of the invention—which is to be determined by reference to the appended claims.

I claim:

1. A process for segregation, shipment and disposal of hazardous waste; said process comprising the steps of:

(a) maintaining a computerized database of hazardous waste materials, said database comprising, for each material in the database, at least one entry that includes sufficient information for synthesizing a hazardous-waste segregation, shipment and disposal profile for that material;

(b) identifying a specific consignment of a particular hazardous waste material that has been received, or is to be received, in a given quantity in a particular batch of hazardous waste materials;

(c) then searching the database for a material entry that is substantially related to the particular material of the specific consignment identified in step (b);

(d) then, if such a material entry is found in step (c), editing said information in that entry if necessary to create a customized material entry corresponding more precisely to the particular material identified in step (b); and if no such entry is found in step (c), creating a new material entry, for said particular material, in said computerized database of step (a);

(e) maintaining a multiplicity of computerized sets of container-information fields for a multiplicity of particular containers, respectively, wherein each set of container-information fields includes a hazardous-waste segregation, shipment and disposal profile of materials placed or to be placed in one corresponding container of the multiplicity;

(f) then extracting, by preprogrammed computer substeps, a hazardous-waste segregation, shipment and disposal profile from said information in the material entry found in step (c) or created in step (d);

(g) searching said computerized sets of container-information fields, by preprogrammed computer substeps, for a particular set of container-information fields that corresponds to a particular one container, of said multiplicity, in which to place said particular material identified in step (b); wherein said container-information-field set searching step comprises searching for a particular set of container-information fields whose hazardous-waste segregation, shipment and disposal profile is compatible with that of said entry found in step (c) or created in step (d);

(h) then, if no such particular set of container-information fields is found, creating a new one of said computerized sets of container-information fields for a new container to be added to said multiplicity; and (i) then causing the found or created material entry, together with a representation of said particular quantity, to be associated, by preprogrammed computer substeps, with said particular set of container-information fields, found in step (g) or created in step (h), for said particular one container.

2. The process of claim 1, further comprising the step of:
physically applying the association, caused in step (i), to control physical segregation, shipment and disposal of said specific consignment identified in step (b).

3. The process of claim 2, wherein:
said applying step comprises physically placing the particular consignment in said particular container.

4. The process of claim 3, wherein:
said applying step further comprises physically shipping and disposing of at least some contents of said particular container in accordance with said hazardous-waste profile maintained in step (e) for said particular container.

5. The process of claim 2, wherein said applying step comprises:
physically placing the particular consignment in said particular container; and
later selectively either removing the particular consignment from said container for recycling, and returning that consignment to active use; or disposing of said particular consignment.

6. The process of claim 5, wherein:
in event of said selective disposing, said applying step further comprises physically shipping and disposing of at least some contents of said particular container in accordance with said hazardous-waste profile maintained in step (e) for said particular container.

7. The process of claim 2, further for use in labelling of hazardous wastes preparatory to shipment and disposal, and wherein:
said applying step comprises, after said extracting step (f), using the material entry found in step (c) or created in step (d) to print, by preprogrammed computer substeps, shipment-and-disposal-controlling labels for affixing to both (1) said specific consignment and (2) said particular one container of step (g).

8. The process of claim 7, wherein said applying step further comprises:
physically affixing said labels to said specific consignment and to said one container respectively; and
physically shipping and disposing of at least some contents of said particular container in accordance with and responsive to said shipment-and-disposal-controlling affixed labels.

9. The process of claim 7, wherein the material-entry using step comprises the substeps of:
using said material entry, by preprogrammed computer operations, to synthesize a hazard-label profile for the specific consignment; and
causing, by preprogrammed computer operations responsive to said hazard-label profile, computer-controlled printing—onto a packaging instruction sheet—of pictorial designations of one or several shipment-and-disposal-controlling hazard labels to be affixed to a container that will receive the specific consignment.

10. The process of claim 9, wherein said applying step further comprises:
physically affixing said packaging instruction sheet, bearing said pictorial designations of hazard labels, to said container that will receive the specific consignment; and
physically shipping and disposing of at least some contents of said container that will receive the specific consignment:
in accordance with and responsive to said affixed packaging instruction sheet, and
in accordance with and responsive to said pictorial designations of said shipment-and-disposal-controlling hazard labels.

11. The process of claim 1, wherein:
the material-database maintaining step (a) comprises the substep of including within said information for each hazardous waste material at least these information elements: (A) the physical state of the material, (B) a primary hazard class of that material, (C) an indication whether the material is organic or inorganic, and (D) if the material is corrosive an indication whether the material is acidic or basic; and
the extracting step (f) comprises synthesizing the hazardous-waste segregation, shipment and disposal profile by combining, by means of said preprogrammed computer substeps of step (f), at least said information elements (A) through (D).

12. The process of claim 11, wherein:
the material-database maintaining step (a) further comprises the substep of also including within said information for each hazardous waste material a secondary hazard class of that material, if that material has a secondary hazard class; and
the extracting step (f) further comprises also combining into the profile said at least one secondary hazard class, if said material has a secondary hazard class.

13. The process of claim 11, wherein:
the material-database maintaining step (a) further comprises the substep of also including, within said information for each hazardous waste material, identification of one or more facilities, if any exist, that accept said material; and
the extracting step (f) further comprises also combining into the profile said at least one facility-related parameter.

14. The process of claim 11, wherein:

the material-database maintaining step (a) further comprises the substep of including, with said information for each hazardous waste material, a special-handling designation if any is applicable.

15. The process of claim 14, wherein the special-handling designation is selected from the group consisting of:

ENSCO special handling
cyanide
sulfide
bromine
alkali metal
water reactive
batteries
pyrophoric
Class C carcinogen
stench
polymerizable
asbestos
wood box
cyanide—USPCI
USPCI
SSI
mercury
BDT
perchloric<50%
perchloric 50–72%
PCB.

16. The process of claim 14, further for labelling of hazardous waste, and:

wherein said material-database maintaining step (a) also comprises incorporating within said information for each hazardous waste material additional information elements that are regulatorily required for labelling of hazardous waste; and further including the additional steps of (1) using said additional elements, that are required for labelling, in computerized generation of one or more labels for said hazardous waste, and (2) applying said one or more labels thereto.

17. The process of claim 16, wherein:

said additional elements required for labelling comprise at least one of these additional information elements: (A) one or more so-called "RCRA codes" established under the Resources Conservation and Recovery Act, (B) California "EH" or "extremely hazardous" designation if applicable, (C) "RQ" or "reportable quantity" established under the Resources Conservation and Recovery Act, (D) reactivity, and (E) "IH" or "inhalation hazard" designation if applicable.

18. The process of claim 1, further comprising the additional steps of:

also maintaining or creating a particular computerized set of batch-information fields for said particular batch mentioned in step (b); and causing the found or created material entry, together with a representation of said particular quantity, to be associated, by preprogrammed computer substeps, with said particular set of batch-information fields, for said particular batch.

19. The process of claim 1, wherein:

each set of container-information fields is in the form of a group of fields in a container-information record, into which one or more material entries can be inserted; and each set of batch-information fields is in the form of a group of fields in a batch-information record.

20. The process of claim 1, further comprising the additional step of:

based upon the hazardous-waste segregation, shipment and disposal profile extracted in step (f), and by preprogrammed computer substeps, selecting a proper shipping name for the specific consignment.

21. The process of claim 20, wherein said proper-shipping-name selecting step comprises the substeps of:

maintaining a computerized database of proper shipping names for each hazardous-waste segregation, shipment and disposal profile; and searching in said proper-shipping-name database for the profile extracted in step (f) or a subset of the elements thereof.

22. The process of claim 1, wherein the container-field maintaining step (e) comprises the substep of:

including in each said set of container-information fields a unique indication of the location of the corresponding particular one of said containers of the multiplicity;

whereby hazard characteristics are associated with each container location.

23. The process of claim 22, further comprising the subsequent step of:

causing, by preprogrammed computer substeps, printout from said computerized container-information fields and consignment records associated therewith, of a tabulation of selected information corresponding to all materials stored in each said location or in an interrelated array of said locations.

24. The process of claim 1, wherein the first alternative portion of said editing-or-creating step (d) comprises the substeps of:

if such a material entry is found in step (c), manually revising that material entry; and then automatically, by preprogrammed computer steps, validating that at least some information elements of the changed entry remain compatible with the hazard profile of said particular container record.

25. The process of claim 24, wherein:

said automatically-validating step comprises automatically checking at least (1) manually entered physical-state characterization, (2) manually-entered parameters related to facility acceptance, and (3) manually entered organic/inorganic categorization.

26. The process of claim 1:

wherein the container-field-set creating step (h) comprises automatic entry into said new record, by preprogrammed computer steps, of the date on which said container-field-set creating step is performed; and further comprising the subsequent step of periodically generating, by preprogrammed computer steps comparing said container-field-set-creating date with a current date, a printout of selected information related to all containers open for longer than a selected threshold period.

27. The process of claim 1, wherein:

the material-database maintaining step (a) comprises constructing each entry with hazard parameters that include substantially only what is necessary for synthesizing said hazardous-waste segregation, shipment and disposal profile of the corresponding hazardous waste material.

28. The process of claim 1, in an on-line mode for use when said specific consignments in said particular batch, of step (b), can only be identified substantially one at a time or a few at a time, and wherein the sequence of some of said steps is restricted thus:

for one particular specific consignment in the batch, a data-entry function is performed that comprises said identifying step (b);

then for that same particular specific consignment, and substantially before repeating said data-entry function for any other consignment, a data-processing function is performed comprising said searching step (c), material-entry editing or creating step (d), profile-extracting step (f), container-set-finding step (g), new-container-set-creating step (h), and entry-association-causing step (i);

then, before performing said data-processing function with respect to any other specific consignment, said data-entry function is repeated with respect to the next specific consignment, if any, in the batch.

29. The process of claim 1, in a batch mode for use when said specific consignments in said particular batch, of step (b), can all be identified substantially at once, and wherein the sequence of some of said steps is restricted thus:

for all specific consignments in the batch, a data-entry function is performed that comprises repetitively executing said identifying step (b), said searching step (c), and said material-entry editing or creating step (d), for all said consignments substantially before executing any of steps (g) through (i);

then after completing said data-entry function for all said consignments, a data-processing function is performed that comprises, for all said consignments, repetitively executing at least the container-set-finding step (g), new-container-set-creating step (h), and entry-association-causing step (i).

30. A process for segregation, shipment and disposal of hazardous waste; said process comprising the steps of:

making relatively very costly professional-level judgments about several hazard parameters of each one of a large number of hazardous waste materials, to establish each of said hazard parameters particularly preformatted for use in the substantially-automatically-classifying and automatically-establishing steps recited hereunder;

said relatively very costly professional-level judgments generally requiring attention of an advance-degreed chemist or like professional scientist;

for each of said large number of hazardous waste materials, collecting in a computerized database said preformatted hazard parameters as established on the basis of said relatively very costly professional-level judgments;

subsequently identifying a large number of specific consignments of particular hazardous waste materials;

shipment or disposal of at least some of said particular materials in said specific consignments being statutorily designated or scientifically recognized, or both, as posing a significant physical danger to people, wildlife or the environment; whereby said relatively very costly professional-level judgments are required to avert said significant physical danger for at least many of said specific consignments;

finding said preformatted hazard parameters in said computerized database for generally each of said large number of specific material consignments, without making new relatively very costly professional-level judgments;

substantially automatically classifying generally each of said consignments on the basis of said found preformatted hazard parameters;

generally each consignment of each material being classified, in the classifying step, substantially consistently with all other consignments of like material and in accordance with professional-level judgments embodied in said database, notwithstanding general absence of new professional-level judgments in said finding step; and substantially automatically establishing subsequent packaging, routing and handling in accordance with regulatory requirements for generally each of said large number of consignments, on the basis of the classifying step, to generally very inexpensively avert said physical danger.

31. The process of claim 30, further comprising the step of:

physically applying said established packaging, routing and handling, to control actual physical packaging, routing and handling of each of said large number of consignments in accordance with and responsive to said automatically establishing step.

32. The process of claim 30, wherein:

for each material, said hazard parameters considered together include sufficient information for extracting there-from a hazardous-waste segregation, shipment and disposal profile of that material; said profile for each material being extracted from but distinct from the entire collective information in said database for the same material;

one of said collecting and classifying steps comprises extracting the profile of at least one material for which parameters are collected in the database in the collecting step; and the classifying step comprises classifying each consignment by reference to the profile.

33. The process of claim 32, wherein:

the judgment-making step comprises the substep of including within said information for each hazardous waste material at least these information elements: (A) the physical state of the material, (B) a primary hazard class of that material, (C) an indication whether the material is organic or inorganic, and (D) if the material is corrosive an indication whether the material is acidic or basic;

in said subsequent classifying step, a hazardous-waste segregation, shipment and disposal profile is synthesized substantially by computerized automatic combination of at least said information elements (A) through (D); and said packaging-routing-and-handling establishing step is performed on the basis of said profile.

34. The process of claim 30, wherein:

said judgment-making step comprises consideration of each of said parameters by graduate and advanced-degree chemists having at least significant experience in hazardous-waste management; said chemists having resort to:

substantially conventional reference materials relating to (1) physical characteristics and compatibility of different chemicals, (2) regulatory requirements for segregation, shipping, storage and disposal of different chemicals and chemical classes, and (3) scope of permits issued to, and other factors controlling acceptance of different chemicals by, actually available disposal facilities, and at least from time to time, actual testing of chemical phenomena relating to some of said materials.

35. The process of claim 34, wherein:

said finding step comprises generally routine finding of said preformatted hazard parameters in said computerized database, for generally each material consignment, by nonprofessional-level personnel generally having no more than high-school-level knowledge of chemistry and without any experience requirement.

36. The process of claim 35, wherein:

the types of hazardous waste materials received in the classifying step are substantially not restricted in any way, and in particular are not restricted to materials for which hazard parameters are pretabulated in the computerized database; and for at least almost all said material consignments, said nonprofessional-level personnel complete the classification based on said computer database substantially exclusively;

and further comprising the additional steps, in event of a first receipt of a material not initially tabulated in the computerized database, of:

making new professional-level judgments about several hazard parameters of said untabulated material, to establish each of said hazard parameters for said untabulated material; and substantially automatically establishing and effectuating subsequent routing for said first receipt, on the basis of said new professional-level judgments.

37. The process of claim 36, further comprising the additional steps of:

for said initially untabulated material, adding to the computerized database the hazard parameters as established on the basis of said new professional-level judgments; and later using said added parameters to similarly substantially automatically classify any later received consignment of said initially untabulated material substantially consistently with said first receipt, and in accordance with professional-level judgments, notwithstanding general absence of new professional-level judgments in finding preformatted hazard parameters for said later-received consignment.

* * * * *